(12) United States Patent
Harwath et al.

(10) Patent No.: US 11,536,905 B2
(45) Date of Patent: Dec. 27, 2022

(54) ABRASIVE JET CLEAVE AND CLEAN SYSTEM

(71) Applicant: COMMSCOPE TECHNOLOGIES LLC, Hickory, NC (US)

(72) Inventors: Frank A. Harwath, Hickory, NC (US); Darius Pavilionis, Hickory, NC (US)

(73) Assignee: CommScope Technologies LLC, Hickory, NC (US)

(*) Notice: Subject to any disclaimer, the term of this patent is extended or adjusted under 35 U.S.C. 154(b) by 0 days.

(21) Appl. No.: 17/019,870

(22) Filed: Sep. 14, 2020

(65) Prior Publication Data

US 2021/0373237 A1 Dec. 2, 2021

Related U.S. Application Data

(63) Continuation of application No. 16/469,384, filed as application No. PCT/US2017/065985 on Dec. 13, 2017, now Pat. No. 10,775,562.

(60) Provisional application No. 62/553,571, filed on Sep. 1, 2017, provisional application No. 62/433,287, filed on Dec. 13, 2016.

(51) Int. Cl.
  *G02B 6/25* (2006.01)
  *B24C 1/04* (2006.01)
  *B24C 3/32* (2006.01)
  *G02B 6/26* (2006.01)
  *G02B 6/38* (2006.01)

(52) U.S. Cl.
  CPC ............... *G02B 6/25* (2013.01); *B24C 1/045* (2013.01); *B24C 3/32* (2013.01); *G02B 6/262* (2013.01); *G02B 6/3863* (2013.01)

(58) Field of Classification Search
  CPC . G02B 6/25; G02B 6/262; G02B 6/38; G02B 6/3863
  See application file for complete search history.

(56) References Cited

U.S. PATENT DOCUMENTS

| | | |
|---|---|---|
| 4,931,120 A | 6/1990 | Christoff |
| 4,976,390 A | 12/1990 | Gee et al. |
| 5,904,614 A | 5/1999 | King |
| 6,074,100 A | 6/2000 | Rowland et al. |
| 7,089,624 B2 | 8/2006 | Malevants et al. |
| 8,977,085 B2 | 3/2015 | Walsh et al. |
| 9,089,931 B1 | 7/2015 | Carberry et al. |
| 10,775,562 B2 * | 9/2020 | Harwath .............. G02B 6/3833 |

(Continued)

FOREIGN PATENT DOCUMENTS

| | | |
|---|---|---|
| JP | 2001-038308 A | 2/2001 |
| WO | 2013/117598 A2 | 8/2013 |

OTHER PUBLICATIONS

Gharbia, Y. et al., "Loose abrasive blasting as an alternative to slurry polishing of optical fibre end faces", International Journal of Machine Tools and Manufacture, 43: 1413-1418 (2003).

(Continued)

*Primary Examiner* — Tina M Wong
(74) *Attorney, Agent, or Firm* — Merchant & Gould P.C.

(57) ABSTRACT

A process for terminating an optical fiber with a ferrule includes the steps of: (a) providing an optical fiber and ferrule with an end of the optical fiber extending beyond a surface of the ferrule; and (b) directing a jet comprising an air-abrasive mixture at the end of the optical fiber to cleave the end of the optical fiber from the remainder of the optical fiber.

14 Claims, 33 Drawing Sheets

(56) References Cited

U.S. PATENT DOCUMENTS

| | | |
|---|---|---|
| 2003/0190875 A1 | 10/2003 | Grabbe |
| 2004/0099121 A1 | 5/2004 | Itano et al. |
| 2006/0067628 A1 | 3/2006 | Suzuki et al. |
| 2008/0172951 A1 | 7/2008 | Starling |
| 2011/0204116 A1 | 8/2011 | Barnes et al. |
| 2012/0018481 A1 | 1/2012 | Hall et al. |
| 2013/0183001 A1 | 7/2013 | Ott |
| 2015/0116700 A1 | 4/2015 | Meek et al. |
| 2017/0336574 A1 | 11/2017 | Koshinz et al. |
| 2018/0236627 A1 | 8/2018 | Xin et al. |
| 2020/0041722 A1 | 2/2020 | Harwath et al. |

OTHER PUBLICATIONS

International Search Report and Written Opinion of the International Searching Authority for corresponding International Patent Application No. PCT/US2017/065985 dated Mar. 29, 2019, 12 pages.

Raju, F. et al., "Fibre Glass Cutting By Using Abrasive Jet Machining and Analysis of Process Parameters", International Journal of Computer Trends and Technology (IJCTT), 4(7): 2274-2278 (2013).

Sharma, A., "Advanced manufacturing Process: Advanced Machining Processes; Abrasive Jet Machining", Department of Mechanical and Industrial Engineering, Indian Institute of Technology, 18 pgs, admitted as prior art as of Aug. 11, 2017.

Srikanth, D. et al., "Abrasive Jet Machining—Research Review", International Journal of Advanced Engineering Technology, V(II): 7 pgs (2014).

\* cited by examiner

ABRASIVE JET CLEAVE AND CLEAN SYSTEM

CROSS-REFERENCE TO RELATED APPLICATIONS

This application is a Continuation of U.S. patent application Ser. No. 16/469,384, filed on Jun. 13, 2019, now U.S. Pat. No. 10,775,562, which is a National Stage Application of PCT/US2017/065985, filed on Dec. 13, 2017, which claims the benefit of U.S. Patent Application Ser. No. 62/433,287, filed on Dec. 13, 2016, and claims the benefit of U.S. Patent Application Ser. No. 62/553,571, filed on Sep. 1, 2017, the disclosures of which are incorporated herein by reference in their entireties. To the extent appropriate, a claim of priority is made to each of the above disclosed applications.

TECHNICAL FIELD

The present invention relates generally to optical fibers, and more particularly to the processing and termination of optical fibers in fiber optic cables.

BACKGROUND

Termination of fiber optic cables is a predominantly manual process. This is largely due to the fragile nature of the glass fibers, and the mix of materials and processes required to form a stable interface. In other words, the process of gluing the small diameter fiber within a tight tolerance zirconia ferrule, cleaving it without damage, and polishing it to a defect-free surface involves a great deal of care, and multiple steps. Efforts to automate the process, and eliminate the craft necessary to achieve good performance, have been generally unsuccessful.

Traditionally, cleaving of the optical fiber is performed using a scribe tool with a sapphire, ruby or carbide tip. A careful operator has to scribe the fiber just above the cured epoxy and gently pull the tip of the fiber parallel to the fiber axis without producing a crack. When not done properly, this resulting crack often makes the termination unusable. This operator has to be one of the more careful and conscientious people in the factory, and may perform this same repetitive job for much or all of an entire shift. If a crack does result from the scribing procedure, the connector needs to be cut off and the entire process needs to be redone. On breakout cables with many fibers, cracks can create other problems. If breakouts are at precise lengths, all ends would need to be redone.

After the cleave, a manual denubbing process takes place to take the fiber stub down to the epoxy, so that it does not crack during the epoxy removal step. This step can be time consuming and very operator dependent. The connector end face can also be deformed if the procedure is not done properly, and such deformation is typically undetected until testing. With a manual cleave, traditional machine polishing requires four to five steps using silicon carbide, diamond and silicon dioxide lapping films with rubber pads after the denubbing—epoxy removal, multiple geometry end face forming, and the final—to reform the geometry of the connector.

A new cleaving technique, using a CO2 laser, largely automates the process. The operator simply places the connector into the laser cleaver, the laser scans across the fiber and epoxy bead, and it cleaves both together. The human factor is eliminated from the cleaving and denubbing steps. However, laser cleavers tend to expensive, and also may introduce a radiation hazard. Additionally, laser cleaves operate at relatively high temperatures and can require shielding to prevent damage to portions of an optical fiber near the laser cleave location thereby adding to system complexity.

In view of the foregoing, it may be desirable to propose additional cleaving techniques.

SUMMARY

Aspects of the present disclosure relate to an abrasive jet cleaving system that allows optical fibers to be efficiently and systematically cleaved at relatively low temperatures (e.g., at room temperature). In certain examples, abrasive jet cleaving systems in accordance with the principles of the present disclosure allow optical fibers to be cleaved in a manner that is fast, does not require expensive consumables, and has a low incidence of optical fibers being damaged (e.g., cracked) during the cleaving process.

Aspects of the present disclosure also relate to an abrasive jet cleaving system capable of simultaneously cleaving an optical fiber and removing epoxy from the end face of a ferrule without damaging the end face of the ferrule.

A further aspect of the present disclosure relates to an abrasive jet cleaving system capable of generating relatively high connector yields for both single-mode and multi-mode optical fibers.

Still another aspect of the present disclosure relates to an abrasive jet cleaving system capable of: 1) cleaving an optical fiber that projects from a ferrule without damaging the optical fiber or the ferrules; and/or 2) removing epoxy from the face of the ferrule as the optical fiber is cleaved; and/or 3) leaving enough glass of the optical fiber projecting from the end face of the ferrule after the cleaving process to allow for a final polish; and/or 4) removing any burs, edges, or sharp structures from the optical fiber and the ferrule; and/or 5) preparing and processing the end of the optical fiber to a level of precision where only a single final polish step is needed to finalize processing of the optical fiber. It will be appreciated that after the final polish step, the end face of the optical fiber is sufficiently free of scratches and other imperfections so as to be capable of passing standard insertion loss testing protocol and/or standard return loss protocol.

Still another aspect of the present disclosure relates to an abrasive jet cleaving system capable of implementing angle cleaves on optical fibers. In some examples, the angled cleaves are angled 5-15 degrees from perpendicular with respect to a central axis of the optical fiber being cleaved, or about 7-9 degrees from perpendicular relative to the central axis of the optical fiber being cleaved. In one example, a mask is used to define the angle of the angled cleave.

Other aspects of the present disclosure relates to an abrasive jet cleaving system that allows the end of an optical fiber to be provided with precision specialized shapes such as concave shapes, flat shapes, convex shapes, and surface texturing. In certain examples, abrasive jet cleaving systems in accordance with the principles of the present disclosure can be used to machine specialty structures into the optical fibers such as diffraction grading structures, attenuators, optical filters, and optical polarizing structures.

Still other aspects of the present disclosure relate to abrasive jet cleaving systems used in combination with one or more masks to shape, cleave or otherwise process an optical fiber.

Certain aspects of the present disclosure also relate to an abrasive jet cleaving system for cleaving an optical fiber supported by a ferrule. In one example, the system uses abrasive material that is softer than the material of the ferrule and harder than the material of the optical fiber. In certain examples, the abrasive jet cleaving system uses abrasive materials that are friable upon contact with the ferrule and/or the optical fiber.

In certain examples, abrasive jet cleaving systems in accordance with the principles of the present disclosure use pressurized air to propel the abrasive material along an abrasive jet stream. In one example, an abrasive jet nozzle of the cleaving system is positioned with its tip located less than or equal to 10, 9, 8, 7 or 6 mm from an optical fiber desired to be cleaved during cleaving.

Other aspects of the present disclosure relate to an abrasive jet cleaving system having an abrasive jet nozzle with a cone angle in the range of 3-12 degrees, or in the range of 4-11 degrees, or in the range of 5-9 degrees.

Aspects of the present disclosure also relate to an abrasive jet cleaving system that generates an abrasive jet stream used to cleave an optical fiber that protrudes from a ferrule. During the cleaving operation, a central axis of the abrasive jet stream is offset from a face of the ferrule and the abrasive jet stream impinges upon an end face of the ferrule at an angle no greater than 12 degrees. In certain examples, during the cleaving operation, residual adhesive is removed from the end face of the ferrule by the abrasive jet stream, and the central axis of the abrasive jet stream does not intersect the adhesive during the adhesive removal process.

In one aspect of the present disclosure, an air based abrasive jet cleaving process is applied to optical fiber stubs protruding from the end faces of ferrules having end faces that are already curved, domed or otherwise pre-shaped with a final desired shape. During the abrasive jet cleaving process, the glass of the optical fiber is cleaved without damaging it, and any residual epoxy on the ferrule end face is completely removed from the surface of the ferrule end face. Additionally, after cleaving, enough glass of the post-cleaved optical fiber projects from the ferrule end face to perform a polish that will produce a very fine, optical grade surface finish. In one example, the projection length of the post-cleaved optical fiber is in the range of 2-60 microns, or in the range of 2-30 microns, or in the range of 2-10 microns. Preferably, the polish step is formed in a single step requiring only one single polishing operation. Preferably, after cleaving, imperfections in the tip of the optical fiber have an average depth less than 3 microns, or 2 microns or 1 micron, or no imperfections in the glass protrusion have a depth greater than 5 microns, or 4 microns, or 3 microns, or 2 microns, or 1 micron.

Another aspect of the present disclosure relates to an abrasive jet cleaving operation in which a pressurized air stream containing abrasive material is used to safely cleave optical fibers without leaving any sharp edges. The air stream including abrasive material also removes all adhesive (e.g., epoxy) on the surface of the ferrule, and cleans up the surface of the post-cleaved optical fibers so that it is ready for final polish. It will be appreciated that one or multiple abrasive jet streams can be used. It will also be appreciated that the optical fiber being cleaved can be in motion or fixed and that the streams of abrasive material can be in motion or fixed. The abrasive jet processing arrangement can be configured to process multiple optical fibers in a single pass. Aspects of the present disclosure also can utilize abrasive particle streams directed from multiple directions. Aspects of the present disclosure can also utilize multiple stations to present multiple abrasive types to the process, if required. Such additional stations could use finer abrasive material to further increase the quality of the optical fiber end faces after cleaving which can eliminate the need for subsequent polishing in certain circumstances. In certain examples, the abrasive jet streams can be set at different angles relative to the optical fibers and/or the end faces of the ferrules to increase the aggressiveness of the abrasive stream against the work piece (i.e., the optical fiber and/or the ferrule end face). Angling can be effective in processing certain types of optical connectors such as angled physical contact (APC) type connections that require the end face of the optical fiber to be angled to a non-perpendicular angle relative to the central axis of the optical fiber.

In certain examples, cleaving stations can include fixture arrangements having more than one abrasive jet nozzle. In certain examples, the abrasive jet nozzles of the given station can be offset from one another. In certain examples, the abrasive jet nozzles can face in opposite directions. In certain examples, one abrasive jet nozzle can be positioned above the optical fiber desired to be cleaved and the other abrasive jet nozzle can be positioned below the optical fiber desired to be cleaved.

Another aspect of the present disclosure relates to a cleaving operation using a pressurized air stream containing abrasive material to cleave an optical fiber. In certain examples, the abrasive material in the air stream has an average particle size less than 12, 10, or 8 microns. In certain examples, the abrasive material is an alluvial material. In other examples, the abrasive material has sharp edges. In other examples, the abrasive material includes garnet. In still other examples, the abrasive material includes alluvial garnet. In certain examples, the abrasive material includes alluvial garnet having an average particle size less than or equal to 12 microns, or less than or equal to 10 microns, or less than or equal to 8 microns. In certain applications, after the optical fiber has been cleaved, the surface is sufficiently smooth so that the average depth of any imperfections provided in the cleaved surface are less than or equal to 12 microns, or less than or equal to 10 microns, or less than or equal to 8 microns.

In certain examples, abrasive jet fiber processing in accordance with the principles of the present disclosure includes processing the optical fiber with a pressurized air stream containing abrasive material that is friable. In certain examples, the abrasive material has a hardness on the Mohr scale that is softer than the material of the ferrule and harder than the material of the cladding and the core of the optical fiber being cleaved.

Aspects of the present disclosure also relate to fiber optic processing operations using a pressurized air stream containing abrasive material to process an optical fiber in which the average size of the particles of the abrasive material is no larger than 8 microns.

Aspects of the present disclosure also relate to fiber processing operations using a pressurized air stream containing abrasive material directed from an abrasive jet nozzle having a discharge opening with a cross-dimension less than or equal to 0.05 inches, or less than or equal to 0.04 inches, or less than or equal to 0.03 inches, or less than or equal to 0.02 inches. The different abrasive jet discharge nozzles having different shaped or sized discharge openings can be used depending upon the desired processing application. For example, abrasive jet discharge nozzles having round transverse cross-sectional profiles, oval transverse cross-sectional profiles, fan-shaped transverse cross-sectional profiles and rectangular transverse cross-sectional profiles can be used.

Aspects of the present disclosure relate to fiber optic processing techniques using a pressurized air stream containing abrasive material which is directed at an optical fiber and which has an exit velocity measured at an abrasive jet nozzle discharge opening in the range of 80 to 180 meters per second.

Aspects of the present disclosure also relate to a fiber optic processing operation where a pressurized air stream containing abrasive material is used to process optical fiber. The processing can include cleaving, shaping, cleaning, polishing, texturing, or shaping. Example abrasives can include fine grit abrasives such as aluminum oxide, silicon carbide, garnet, cerium oxide, sodium bicarbonate and silicon dioxide.

In one example of the present disclosure, an abrasive jet fiber processing system is used including tooling in which only one dimension of motion is controlled while the others are adjustable but then fixed during processing runs. In this example, the abrasive jets can be mounted on non-motion controlled mounts and the optical fibers being processed can be held within nests that move across the abrasive jet streams to prepare the optical fiber end faces for either a subsequent single step polishing process or for further abrasive jet processing that can eliminate polishing entirely. Of course, other aspects of the present disclosure relate to more complicated control systems that allow for multi-dimensional and multi-rotational movement of either or both the fiber holdings fixture and the abrasive jet nozzles to provide for more complicated processing operations such as processing concave optical shapes, flat optical shapes, convex optical shapes, diffraction gratings, attenuators, and other structures. The abrasive jet streams can be oriented perpendicular to the central axis of an optical fiber being processed or at an oblique angle relative to the optical fiber. Additionally, motion control can allow the abrasive jets to follow the contours of the workpiece (e.g., the dome of a ferrule) or create its own specific contours by motion not just across the surface being processed but toward and away from it which, would briefly alter the abrasive streams effect on the workpiece by relaxing or intensifying it to selectively cut shallower or deeper. In certain examples, positional accuracy can be monitored by the use of vision systems, sensors, position sensors, rotary encoders, or other encoders, or other position control technology.

In certain examples, during processing, the abrasive stream density and/or the particle speed can be varied to selectively increase or decrease the aggressiveness of the abrasive jet stream to selectively cut deeper or shallower into the workpiece. Similarly, shallower or deeper cuts can be generated by using motion recipes. For example, the abrasive jet nozzle can slow down or dwell over areas where it is desired to make deeper cuts as compared to other areas. The aggressiveness of the abrasive stream can also be varied by varying the impingement angle of the abrasive stream against the workpiece. More direct impingement angles tend to be more aggressive in cutting as compared to less direct impingement angles. In one example, the abrasive media stream can be made more aggressive when processing the center of an optical fiber as compared to processing the edges of the optical fiber. In this way, material is removed at a higher rate at the central region of the fiber where more material exists due to the round cross-sectional shape of the optical fiber. The result in profile after processing can be more uniform rather than having a "bell curve" type shape.

In certain examples, the workpiece holding fixture (e.g., the cleaving fixture) can be designed to take advantage of the stream properties such as eliminating sharp edges to create more laminar flow over the workpiece. Also, grooves can be cut into the fixture to channel the abrasive material to portions of the workpiece that need more aggressive streams. In certain examples, grooves can be made with masking in place for the creation of diffraction grating and filtering applications.

In certain examples, different nozzle types can be used for different applications. Smaller nozzles can be used in processes that require finer cuts such as for diffraction gratings. For larger sweeps or straight cuts rectangular nozzles are useful. Fan-type nozzles can be employed for more uniform surface finishes that can be used for attenuators or for preparation for optical coatings.

Various abrasive materials within the air stream will affect optical surfaces differently. For finer surfaces it is desirable to use small alluvial abrasives that are partially friable such as garnet or silicon dioxide. For workpieces requiring more aggressive cuts materials such as aluminum oxide, silicon carbide or tungsten can be used. In certain examples, larger particle sizes at lower velocities can provide finer surface finishes as well. In certain examples, alluvial abrasive can be used for fine surface finishes. Friable and semi-friable media provide for gentle removal of material.

In certain examples, the workpiece holding fixture can be designed to intensify the abrasive stream in specific areas of the workpiece or it can be made to accommodate secondary tooling such as stream masks. The stream masks can limit the areas to which the abrasive stream is applied and can be useful in creating diffraction gratings for use as an optical filter.

Aspects of the present disclosure relate to an abrasive jet cleaving system where abrasive media is directed toward an optical fiber from opposing directions. The streams can be positioned in-line or staggered during processing. The streams can be directed at the optical fiber simultaneously or staggered in time. The abrasive streams can be oppositely positioned and in-line with one another, or oppositely positioned and staggered relative to one another.

Aspects of the present disclosure also relate to an air-based abrasive jet processing technique in which a fiber is cleaved and the post-cleaved fiber has a specific geometry and sufficient glass height so that a subsequent final polish process (e.g., a polishing process using a final polishing film) can be used to attain the required surface geometry and surface finish to pass all the required testing (e.g., insertion loss for multi-mode insertion loss and return loss for single mode fiber). The cleave can be an angled cleave for an APC connector or a straight cleave for a UPC connector. In other examples, the air-based abrasive jet cleaving process itself can both cleave the optical fiber with either a straight or angled cleave, and polish the fiber tip to a surface finish that passes all required testing (e.g., insertion loss and return loss) thereby eliminating the need for a subsequent polishing operation using polishing films or the like. Such an air-based abrasive jet cleaving process can include one or more abrasive jet fiber processing stations.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples disclosed herein are based.

DETAILED DESCRIPTION

Figure 1A:
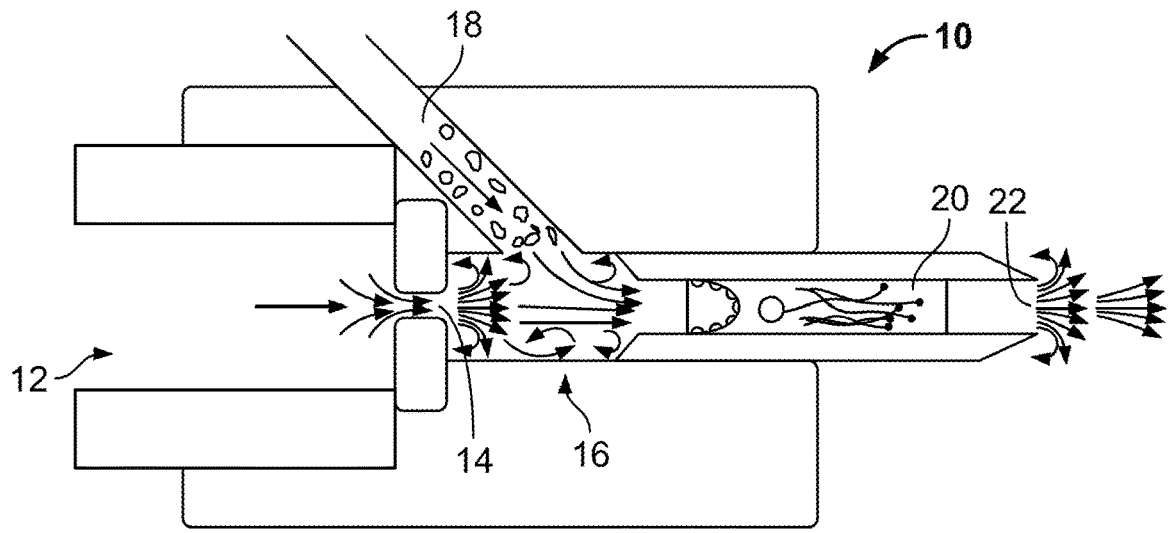
FIG. 1A is a schematic diagram of a jet machining apparatus according to embodiments of the invention.

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the above description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Abrasive jet machining is quite common these days to cut large, intricate parts out of sheets of metal. A similar process can be used to machine glass; however, when machining glass with an abrasive jet, the working fluid is air rather than water-based.

Aspects of the present disclosure relate to methods for processing optical fibers using abrasive jet machining operations. In some examples, the abrasive jet machining operations involve processing optical fibers by exposing the optical fibers to a pressurized stream including abrasive media. Preferably the pressurized stream includes a mixture of pressurized gas (e.g., air) and abrasive media. However, in other examples in accordance with the principles of the present disclosure, the pressurized stream can include a mixture of pressurized liquid (e.g., water) and abrasive media.

A typical optical fiber includes an optical core surrounded by a cladding layer. The optical core and the cladding layer have different indexes of refraction that are selected to cause light to propagate through the optical fiber via total internal reflection. Often the core and the cladding layer each have a glass construction. Optical fibers can include single mode optical fiber and multi-mode optical fibers. Generally, single mode optical fibers have smaller cores than multi-mode optical fibers. For example, a traditional single mode optical fiber has a core with a diameter in the range of 8-10 microns and a cladding layer with an outer diameter in the neighborhood of 125 microns. In contrast, multi-mode optical fibers transitionally have cores with diameters of about 50 microns or about 62.5 microns, and cladding layers with outer diameters of about 125 microns. FIG. 33A shows an example single mode fiber 472 having a core 91 surrounded by a cladding layer 92. Aspects of the present disclosure are applicable to processing both single mode and multi-mode optical fibers.

With an abrasive jet machining process, a glass fiber (i.e., an optical fiber) of a fiber optic cable can simultaneously be cleaved and rough-polished, and excess epoxy resin can be removed in the same process. This process can improve cleaving efficiency (i.e., it produces fewer damaged fibers), reduce labor (fewer cycles and reduced time per cycle), reduce consumables (i.e. polishing films), and eliminate cleaning between process stages. The polishing process can be completed in a single step for both single mode and multi-mode optical fiber. In addition, the cost of abrasive jet machining equipment may be as little as 10% to 20% of the cost of a laser cleaver, without any radiation hazard or issues relating to high temperatures.

Figure 1B:
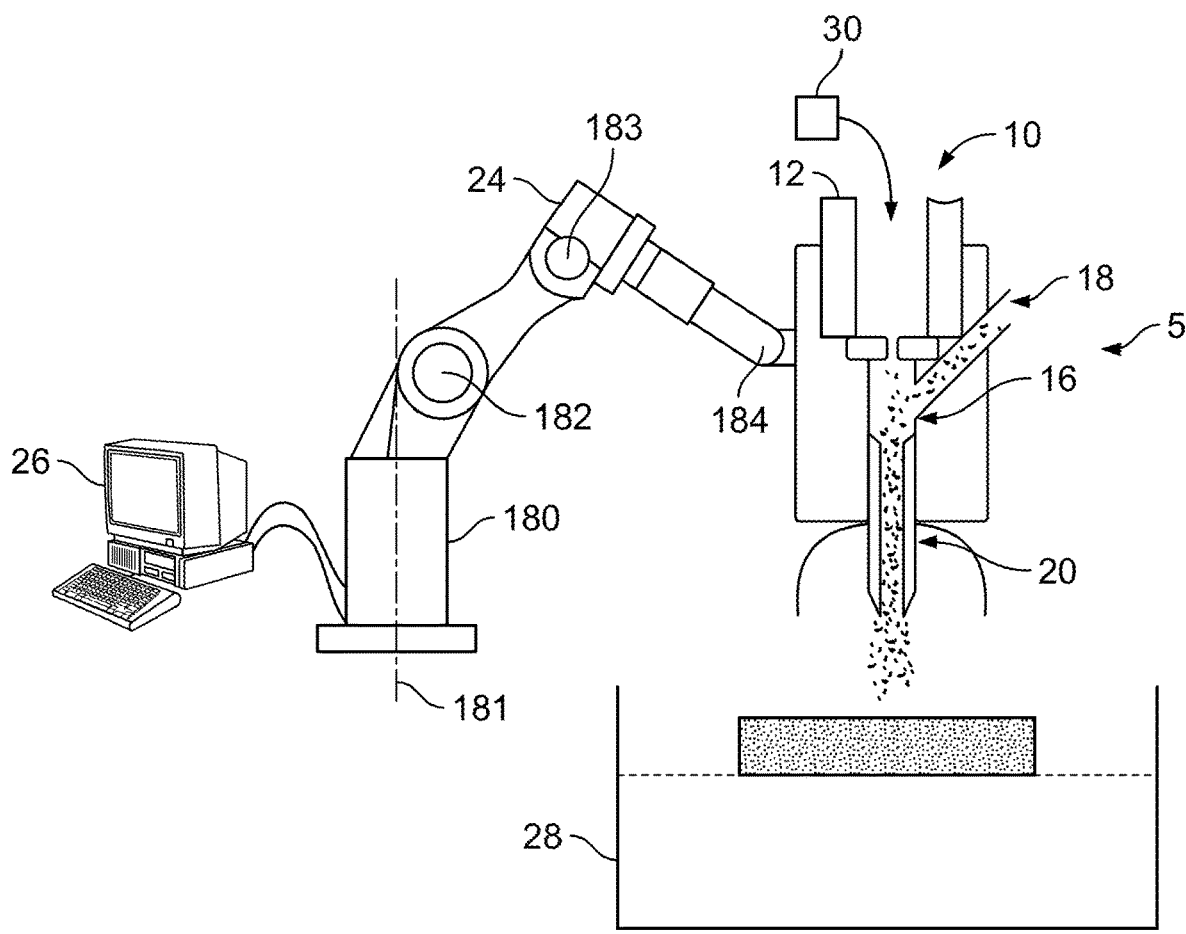
FIG. 1B is an enlarged schematic diagram of a cutting head of the jet machining apparatus of FIG. 1A.

A schematic diagram of a cutter head 10 of an abrasive jet machining apparatus 5 is shown in FIGS. 1A and 1B. The cutter head 10 includes a manifold 12 that is fluidly connected to a high-pressure air source (not shown) and to an orifice 14 that leads to a mixing chamber 16. An inlet 18 feeds from a source of air and abrasives (not shown) into the mixing chamber 16, wherein the high pressure air is combined with the air/abrasives mixture. A mixing tube 20 leads from the mixing chamber 16 to a nozzle 22, where the air and abrasives are discharged at high pressure to a workpiece, such as the end of an optical fiber.

The cutter head 10 can be moved manually, or may be controlled via a robotic manipulator 24 (e.g., robotic arm), such as a CNC or x-axis device (see FIG. 1A). A processor 26 may operatively control the manipulator 24. A catcher tank 28 may be positioned beneath the workpiece (in this instance a ferrule holding optical fiber(s)) to catch excess and/or spent abrasive. Often a fixture (not shown) may be used to hold the optical fiber during processing.

The cutter head 10 and abrasive jet apparatus 5 are merely exemplary of abrasive jet machinery. Those skilled in this art will appreciate that other configurations of abrasive jet equipment may also be suitable for use with this invention.

The air-abrasive mixture may be applied to the optical fiber at a pressure and velocity that is appropriate for abrading the optical fiber as desired. As an example, the pressure of the mixture exiting the nozzle 22 may be between about 60 and 100 psi. Also, the impact angle of the jet relative to the surface of interest may vary, as may the expansion angle of the jet as it leaves the nozzle 22.

The abrasive employed in the air-abrasive mixture may be any abrasive suitable for abrading the optical fiber. Exemplary abrasives include silicon carbide, aluminum oxide, cerium oxide, tungsten, garnet, silicon dioxide, and glass beads. The abrasives may be of any number of different particle sizes, with a particle size range of between about 1 and 27 µm being typical. Particle velocity upon contacting the optical fiber may be between about 80 and 180 m/s. Other processing parameters, such as nozzle diameter, length:diameter ratio of the mixing chamber, abrasive particle size distribution, concentration of particles, and nozzle inlet geometry may also be selected to enhance cleaving and polishing.

Other information regarding abrasive jet machining techniques may be found in M. J. Jackson and J. P. Davim (eds.), Machining with Abrasives (DOI 10.100/978-1-4419-7302-3_9, Springer Science+Business Media, LLC 2011), which is hereby incorporated herein by reference in its entirety.

Figure 2A:
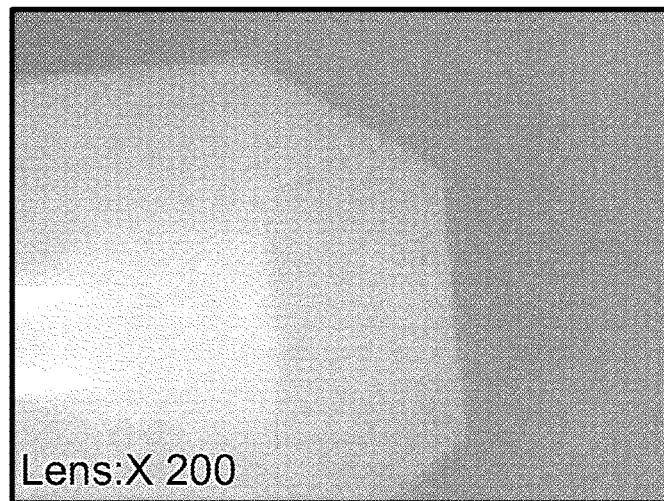
FIGS. 2A and 2B are greatly enlarged photographs of an optical fibers cleaved with a jet machining apparatus as in FIGS. 1A and 1B.
Figure 2B:
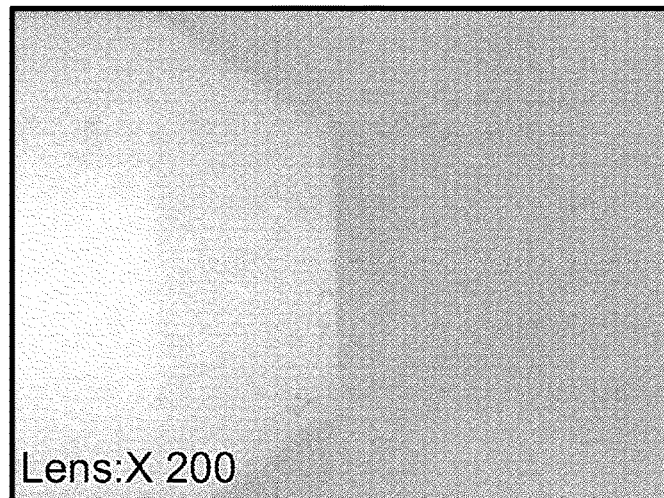

FIGS. 2A and 2B show two fibers that were prepared with abrasive jet machining techniques. In the processing of these fibers, the abrasive jet machining parameters shown in Table 1 below were used.

TABLE 1

| Abrasive | Silicone carbide |
| --- | --- |
| Air pressure at nozzle | 100 psi |
| Particle velocity | 150 m/s |
| Impact angle | 0 degrees |

Figure 3A:
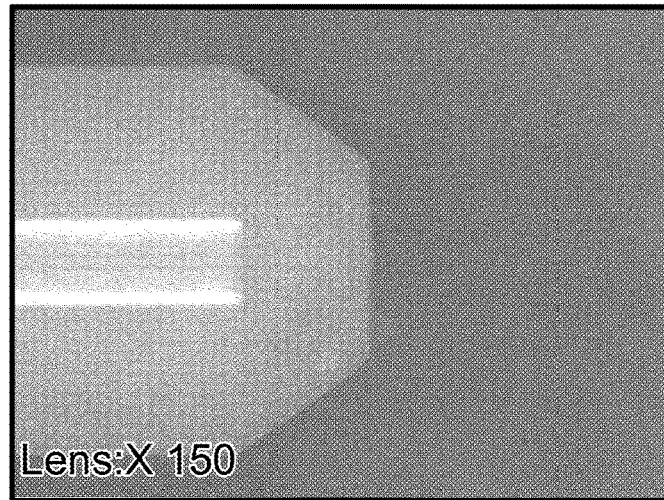
FIGS. 3A and 3B are photographs of two single mode fibers that were polished during the cleaving process with abrasive jet machining.
Figure 3B:
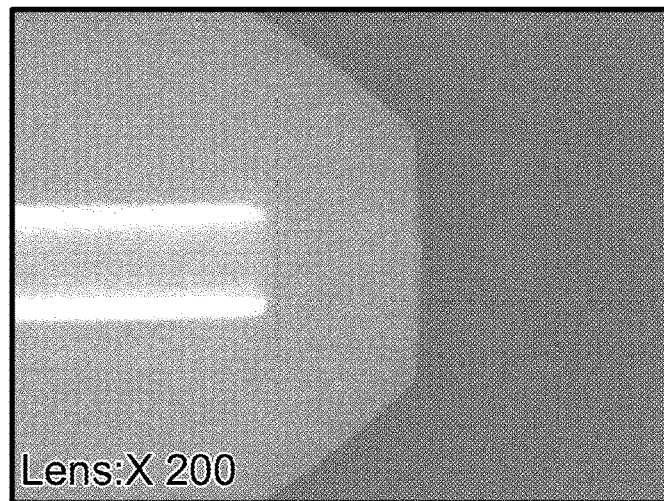
Figure 4A:
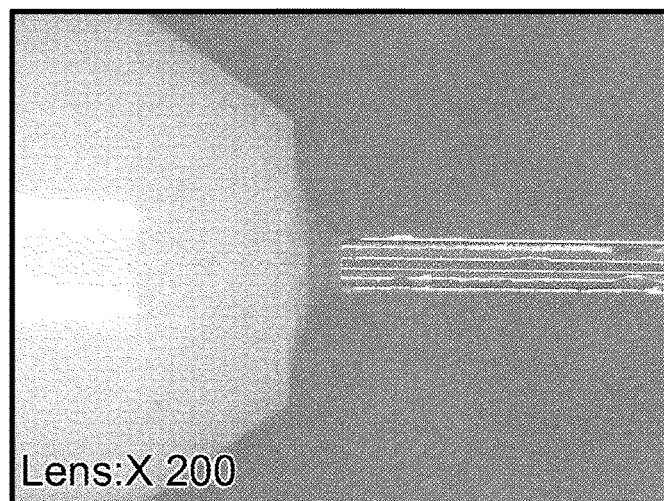
FIGS. 4A and 4B are photographs of a multimode fiber prior to cleaving (FIG. 4A), and a multimode fiber after cleaving with abrasive jet machining (FIG. 4B)
Figure 4B:
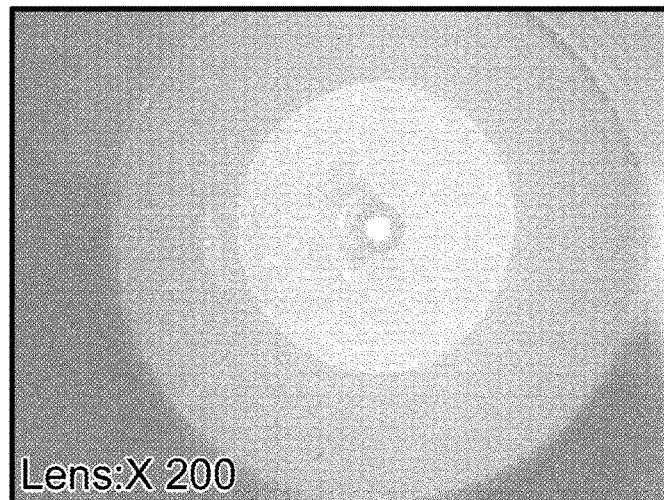

FIGS. 3A and 3B show two single mode fibers that were polished during the cleaving process with abrasive jet machining. FIGS. 4A and 4B show a multimode fiber prior to cleaving (FIG. 4A), and a multimode fiber after cleaving with abrasive jet machining (FIG. 4B). It can be seen that acceptable cleaving and polishing results can be achieved with abrasive jet machining, which as noted above can automate a tedious manual process at a lower cost and with less hazard than laser cleaving.

Figure 5:
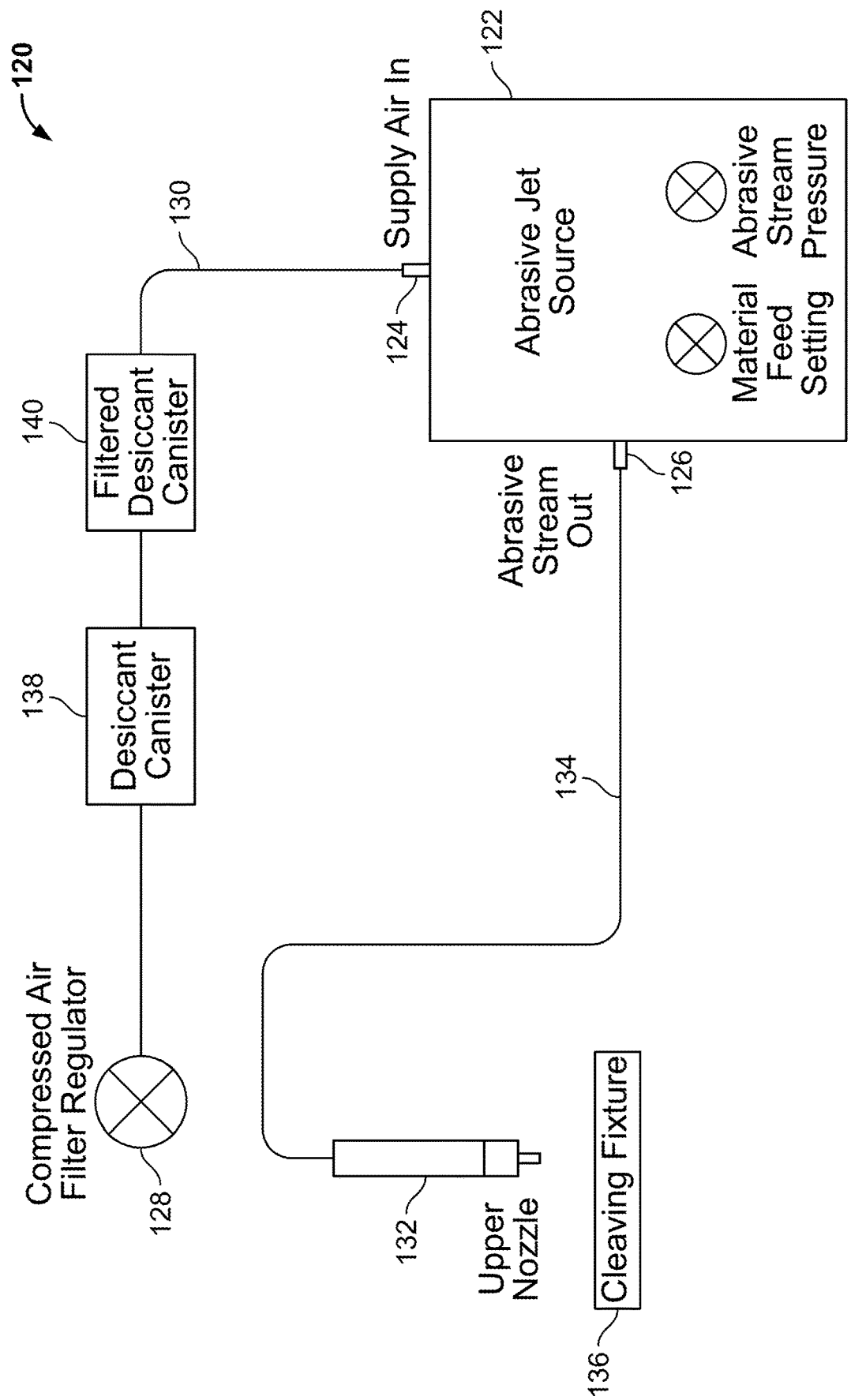
FIG. 5 is a schematic depiction of an abrasive jet system in accordance with the principles of the present disclosure for processing optical fibers.

FIG. 5 schematically depicts an abrasive jet system 120 in accordance with the principles of the present disclosure. The abrasive jet system 120 is configured for processing optical fibers. Processing can include cleaning, shaping, texturing, cleaving, polishing, smoothing, final polishing, contouring, removing sharp edges and burs, patterning, material removal, abrading, machining, structuring, creating angled surfaces, creating facets, creating grooves, creating convex or concave surfaces, creating lenses, creating attenuating surfaces, creating light polarizing or light filtering structures, removing adhesive such as epoxy, removing residue materials, creating diffraction gratings, preparing surfaces for receiving coatings and the like.

In one particular example, the abrasive jet system 120 can be used to cleave optical fibers supported within ferrules. In certain examples, adhesive material such as epoxy is used to secure an optical fiber within a ferrule. Often, epoxy residue remains at an end face of the ferrule adjacent the location where the optical fiber protrudes outwardly from the end face of the ferrule. In certain examples of the present disclosure, the abrasive jet system 120 is adapted to cleave the optical fiber and also remove residual adhesive (e.g., epoxy) from the end face of the ferrule.

Ferrules processed in accordance with the principles of the present disclosure can include single-fiber ferrules and/or multi-fiber ferrules. Single-fiber ferrules often have a cylindrical configuration with a single optical fiber secured by adhesive within a central axial passage of the ferrule. Multi-fiber ferrules support a plurality of optical fibers. The optical fibers are often arranged in rows within the multi-fiber ferrules. Example materials for manufacturing ferrules include metals (e.g., stainless steel, copper, aluminum, brass, etc.), ceramics (e.g., alumina, zirconia, etc.) and polymeric materials (e.g., thermo-plastics such as polyphenylene sulfide or other plastics). Example ferrules include LC ferrules, SC ferrules, FC ferrules, ST ferrules, and MTP/MPO ferrules. At the time the cleaving process takes place, it is common for the ferrules to have already been incorporated into corresponding fiber optic connector bodies. Therefore, systems in accordance with the present disclosure can be configured to hold the fiber optic connector bodies and/or the ferrules during the cleaving process.

While a preferred application of aspects of the present disclosure is for cleaving ferruled optical fibers, it will be appreciated that the abrasive jet system 120 can also be used to process (e.g., cleave) non-ferruled optical fibers. For example, bare, non-ferruled optical fibers can be cleaved using the abrasive jet optical system 120 in preparation for mechanical or fusion splicing. Additionally, the abrasive jet system 120 can be used to process (e.g., cleave) optical fibers corresponding to ferrule-less fiber optic connectors. Example ferrule-less fiber optic connectors are disclosed by PCT Publication No. 2013/117598, which is hereby incorporated by reference in its entirety.

Referring to FIG. 5, the abrasive jet system 120 includes an abrasive jet source 122 for generating an abrasive jet stream that includes a mixture of pressurized air and abrasive material. The abrasive jet source 122 includes an air inlet 124 and an abrasive stream outlet 126. The air inlet 124 is coupled to a source of compressed air 128 (e.g., an air compressor, a tank including compressed air, or the like) by a flow line 130. The flow line 130 can include a conduit or conduits such as tubing, hoses or pipes. The abrasive stream outlet 126 is coupled to an abrasive jet nozzle 132 by a flow line 134. The flow line 134 can include a conduit such as a tube, hose or pipe. The abrasive jet nozzle 132 is positioned adjacent to a cleaving fixture 136 for holding a work piece desired to be processed (e.g., cleaved) by the abrasive jet system 120. During processing of the work piece, the abrasive jet nozzle 132 is configured to direct the stream of air and abrasive material at a feature of the work piece to achieve a desired processing result.

It will be appreciated that the flow of air provided to the abrasive jet source 122 can be varied to vary the flow characteristics of the abrasive jet stream generated by the abrasive jet source 122. In this regard, the source of compressed air 128 can be configured to vary and/or control the air pressure and/or the air flow rate provided to the abrasive jet source 122 via the flow line 130. Thus, the source of compressed air 128 can be adapted to provide air flow and/or air pressure regulation. Additionally, air filtration can be provided for filtering particulates from the air stream before the air stream is provided to the abrasive jet source 122.

It is also desirable for the air provided to the abrasive jet source 122 to have a relatively low moisture content to prevent clumping of abrasive material within the abrasive jet source 122. Limiting the moisture content of the air provided to the abrasive jet source 122 also reduces process variability and ensures a consistent and predictable abrasive jet output stream. In certain examples, one or more air drying devices can be used in combination along the flow line 130. For example, as shown at FIG. 5, first and second desiccant devices 138, 140 are positioned along the flow line 130. In one example, the first desiccant device 138 can include a desiccant canister that may include a bed of desiccant material (e.g., zeolites, activated alumina, silica gel or like water absorbing materials) through which the air stream is passed to draw moisture vapor from the air. The second desiccant device 140 can include a dehumidification membrane that may include a hydrophobic material capable of filtering water vapor from the air stream as the air stream passes through the membrane.

Figure 6:
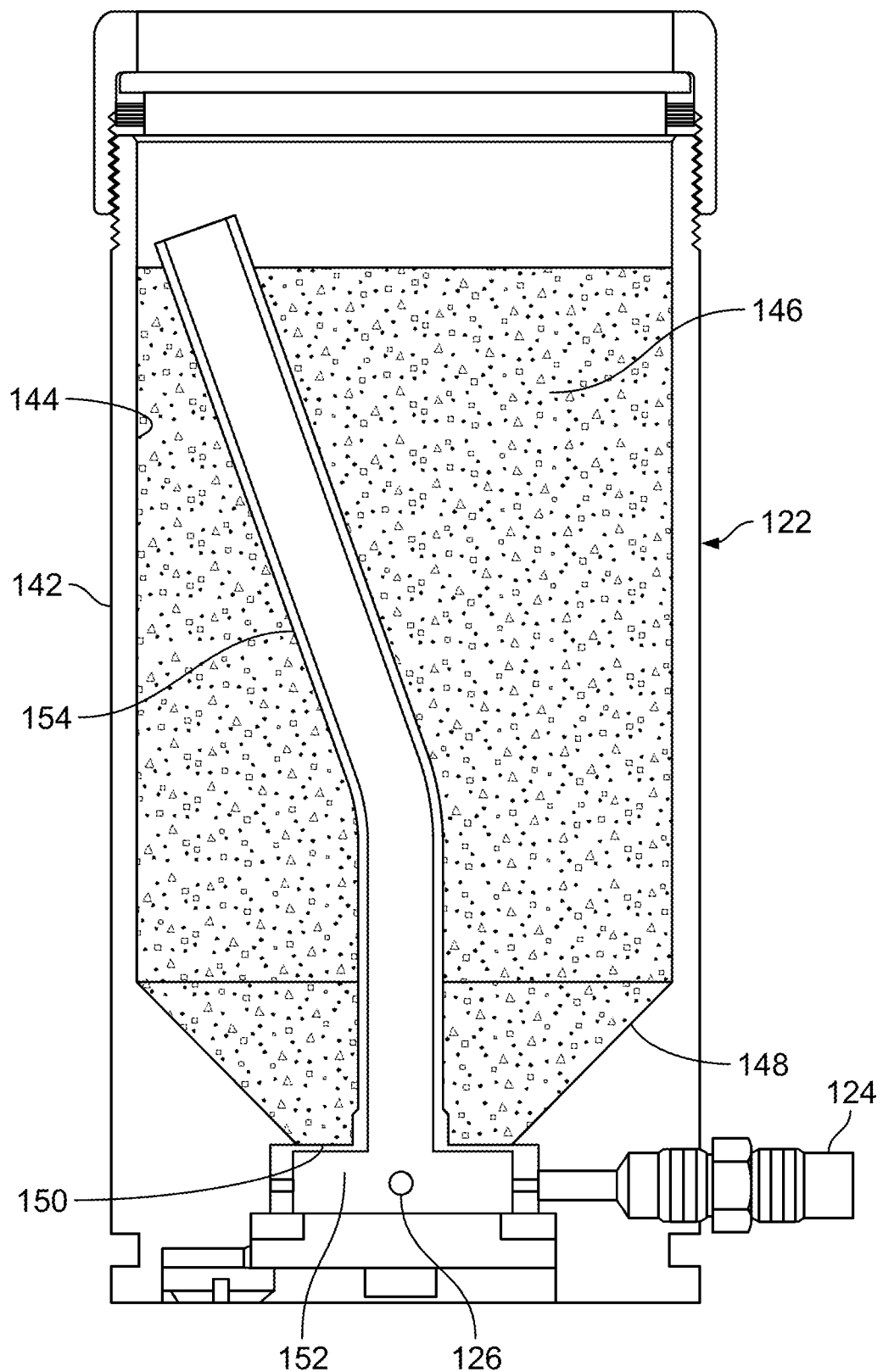
FIG. 6 depicts an example abrasive jet source that can be used as part of the abrasive jet system of FIG. 5.

FIG. 6 illustrates an example configuration for the abrasive jet source 122. The abrasive jet source 122 includes a container 142 (e.g., a vessel, a housing, a canister, etc.) defining a reservoir 144 for holding abrasive material 146. A lower end of the reservoir 144 includes a funnel 148 which guides the abrasive material 146 toward an orifice plate 150. The orifice plate 150 is positioned above a chamber 152 in fluid communication with the air inlet 124 and the abrasive stream outlet 126. An air tube 154 extends from the chamber 152 through the abrasive material 146 to a top region of the reservoir 144. The air tube 154 functions to equalize the air pressure between the chamber 152 and the top region of the reservoir 144 so that the feed rate of the abrasive material 146 into the chamber 152 is not affected by a pressure differential. It will be appreciated that different orifice plates 150 with different orifice sizes can be interchanged depending upon desired feed rates of the abrasive material and the type of abrasive material being used.

In operation of the abrasive jet source 122, the abrasive material 146 from the reservoir 144 sifts through the orifice plate 150 into the chamber 152. Within the chamber 152, the abrasive material 146 mixes with compressed air from the air inlet 124 and the mixture of compressed air and abrasive material 146 is discharged through the abrasive stream outlet 126 and the flow line 134 to the abrasive jet nozzle 132. In certain examples, the container 142 can be vibrated at different rates/speeds to vary the rate that the abrasive material 146 flows through the orifice plate 150. In certain examples, agitating members (e.g., balls such as a stainless steel balls) can be included within the reservoir 144 along with the abrasive material 146 to prevent clumping and to encourage the abrasive material 146 to flow through the orifice plate 150.

The cleaving fixture 136 of the abrasive jet system 120 can be configured to hold one or more work pieces while such work pieces are processed by the abrasive jet system 120. In certain examples, the fixture 136 can hold 1, 2, 3, 4, or more work pieces. As indicate above, each of the work pieces preferably includes at least one optical fiber. In certain examples, the work pieces can include only optical fibers. In other examples, work pieces can include ferrules supporting optical fibers. In still other examples, the work pieces can include fiber optic connectors that include optical fibers. The fiber optic connectors can include ferrules supporting optical fibers or can be ferrule-less fiber optic connectors having optical fibers that are not supported by ferrules. The fiber optic connectors can be single-fiber optical connectors or multi-fiber optical connectors. Example fiber optic connectors can include SC connectors, LC connectors, FC connectors, FT connectors, ST connectors, and MPO/MTP connectors. The fixture 136 can include structure for retaining the work pieces. Example structures can include clamps, pockets, slots, receptacle, latches or other structures. The structures can be configured to hold optical fibers and/or ferrules supporting optical fibers and/or fiber optic connectors.

It is preferred for the abrasive jet system 120 to provide for relative positional adjustment and/or relative movement between the abrasive jet nozzle 132 and the fixture 136. For example, in certain examples, the fixture 136 can be moved relative to the nozzle 132, or the nozzle 132 can be moved relative to the fixture 136, or both the nozzle 132 and the fixture 136 can be movable relative to one another. In certain examples, the relative movement can include linear movement and/or pivotable movement and/or arcuate movement. The movement or positional adjustment can be accomplished manually or can be automated through the use of drive mechanisms. The drive mechanisms can include robotics, linear actuators, multi-axis linear actuators, motors, linear bearings, X-Y-Z tables, pivotal joints, universal joints, universal couplings, linear bearings, tracks, rack and pinion drives, linear actuators, pneumatic or hydraulic cylinders, hydraulic or pneumatic motors, stepper motors, servo-motors, robotic arms, and the like. Sensing equipment such as proximity sensors and encoders can also be used to monitor the relative positions of the fixture 136 and the nozzle 132. In certain examples, the fixture 136 and/or the nozzle 132 are each movable along a respective first axis, and/or a second axis, and/or a third axis. In certain examples, the fixture 136 and/or the nozzle 132 are each pivotably movable about respective first axes, and/or second axes, and/or third axes.

Figure 8:
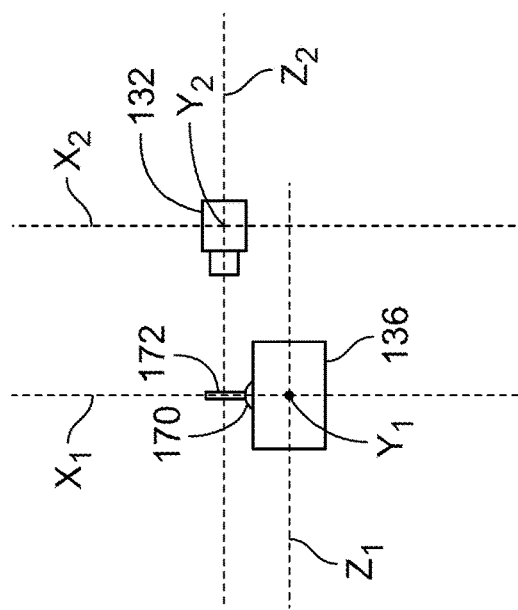
FIG. 8 illustrates the fixture and nozzle of FIG. 7 from a perspective perpendicular to the perspective of FIG. 7.
Figure 7:
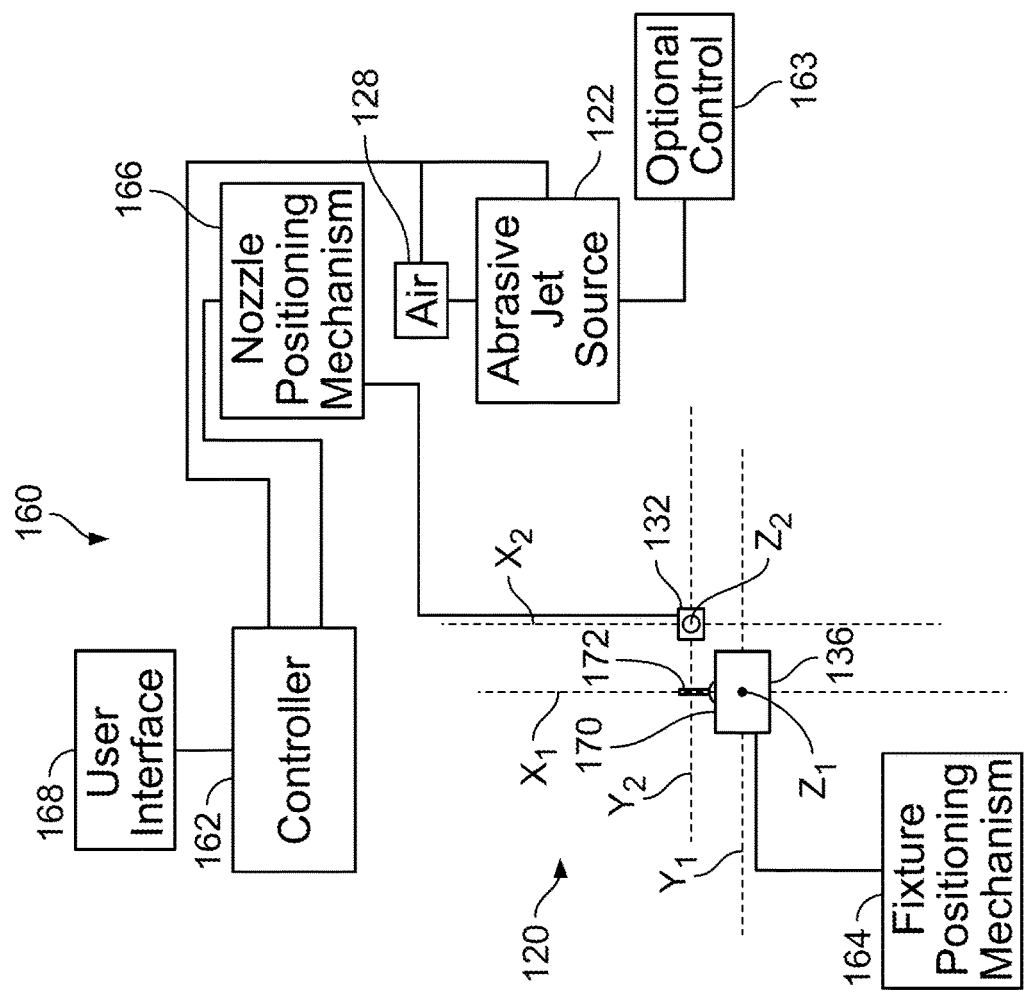
FIG. 7 schematically depicts an example motion control system for controlling the abrasive jet system of FIG. 5, an example fixture and nozzle are depicted from a first perspective.

FIGS. 7 and 8 show an example control system 160 for the abrasive jet system 120. The control system 160 includes a controller 162 that interfaces with a fixture positioning mechanism 164, a nozzle positioning mechanism 166, the source of compress air 128 and the abrasive jet source 122. A user interface 168 allows an operator to interface with the controller 162. Example user interfaces can include one or more input structures such as keyboards, touch screens, buttons, dials, toggles or other control elements that can be manipulated by an operator to allow the operator to input commands, data or other information to the controller 162. The controller 162 can include software, firmware and/or hardware. Additionally, the controller 162 can include digital or analog processing capabilities and can interface with memory (e.g., random access memory, read-only memory, or other data storage means) that stores algorithms, control models, empirical data or other information that can be accessed for use in controlling operation of the abrasive jet system 120. In certain examples, the controller 162 can include a programmable logic controller, a laptop computer, a desktop computer, one or more microprocessors or like structures.

In certain examples, the controller 162 can be used to control or modify operating parameters of the system 120 such as air pressure, air flow rate, the feed rate of the abrasive material 146 into the air stream, the positioning of the nozzle 132 and the positioning of the fixture 136. In certain examples, the controller 162 can vary parameters such as the air speed of the abrasive jet stream or the abrasive loading of the abrasive jet stream in real time to provide different operating effects and characteristics. Additional control elements can also be provided. For example, supplemental control of the abrasive jet source can be provided with an optional controller 163 such as a foot pedal, toggle switch or other structure for turning the abrasive jet source on and off. Similarly, supplemental controllers can be provided for operating the fixture positioning mechanism 164 and the nozzle positioning mechanism 166. Furthermore, either or both of the fixture positioning mechanism 164 and the nozzle positioning mechanism 166 can include positioning capabilities that are automated or manual.

Referring to FIGS. 7 and 8, the fixture positioning mechanism 164 can be a three-axis positioning system (e.g., an X-Y-Z table, a programmable or robotic arm, or other devices) capable of moving the fixture 136 along an axis $X_1$, and axis $Y_1$ and an axis $Z_1$. It will be appreciated that the axes $X_1$, $Y_1$ and $Z_1$ are perpendicularly oriented relative to one another. The fixture 136 is shown holding a fiber optic connector having a ferrule 170 supporting an optical fiber 172. The optical fiber 172 has an end portion that protrudes outwardly from the ferrule 170. The axis $X_1$ can be coaxially aligned with a central axis of the optical fiber 172. In certain examples, the fixture positioning mechanism 164 can also be configured to pivot or rotate the fixture 136 about the axis $X_1$ and/or the axis $Y_1$ and/or the axis $Z_1$.

The nozzle positioning mechanism 166 also can include a three-axis positioning system (e.g., an X-Y-Z table, a programmable or robotic arm, or other devices) capable of moving the nozzle 132 along an axis $X_2$, and axis $Y_2$ and an axis $Z_2$. The axes $X_2$, $Y_2$, and $Z_2$ are perpendicularly oriented with respect to one another. The axes $X_1$, $Y_1$, and $Z_1$ are respectively parallel with respect to the axes $X_2$, $Y_2$, and $Z_2$. In certain examples, the nozzle positioning system 166 can also pivot or rotate the nozzle 132 about the axis $X_2$ and/or the axis $Y_2$ and/or the axis $Z_2$. In the depicted example, the axis $Z_2$ is coaxial with a center axis of the nozzle 132.

With regard to relative movement between the fixture 136 and the nozzle 132, the motion can operate in three ways. First, the fixture 136 can remain fixed and abrasive jet nozzle 132 can be moved relative to the fixture 136. Second, the abrasive jet nozzle 132 can be fixed and the fixture 136 can be moved relative to the abrasive jet nozzle 132. Third, both the abrasive jet nozzle 132 and the fixture 136 can be moved relative to one another at the same time.

In certain examples, the nozzle positioning mechanism 166 or the fixture positioning mechanism 164 can include a robotic arm such as the robotic arm 24 shown at FIG. 1b. The robotic arm 24 can have an articulated design with multiple pivot points. In certain examples, the robotic arm 24 can have a base 180 that pivots about a vertical axis 181 the robotic arm 24 can also include multiple articulated segments connected at pivot axes 182, 183, and 184. Optionally, portions of the segments can telescope relative to one another to extend or retract the segments. The robotic arm 24 can be controlled by the controller 162 and can move the nozzle or the fixture along a programmed path that may include linear movement, arcuate movement and/or pivotable movement.

Referring back to FIGS. 7 and 8, during a cleaving operation, the fixture 136 can be moved along the axis $X_1$ or the nozzle 132 can be moved along the axis $X_2$ to adjust a distance the optical fiber 172 is cleaved with respect to an end face of the ferrule 170. Thus, adjustment along the axes $X_1$, $X_2$ can be used to control an offset spacing of the cleave location with respect to the end face of the ferrule. It will be appreciated that the offset spacing of the cleave location also affects the degree in which the jet stream impinges upon the end face of the ferrule. Movement of fixture 136 along the axis $Z_1$ or the nozzle 132 along the axis $Z_2$ can be used to adjust the distance between the end of the nozzle 132 and the optical fiber 172. Such adjustment adjusts the cutting intensity of the abrasive jet stream with respect to the optical fiber and the size of the area impinged upon by the stream. Movement of the fixture 136 along the axis $Y_1$ allows the optical fiber 172 to be scanned across the abrasive air stream of the nozzle 132 while movement of the nozzle 132 along the axis $Y_2$ allows the abrasive jet stream to be scanned across the optical fiber 172.

It will be appreciated that positioning systems of the type described above can be used to implement abrasive jet fiber processing operations in accordance with the principles of the present disclosure. The complexity and type of positioning system utilized can vary depending upon the type of abrasive jet fiber processing desired. For some operations such as cleaving operations, a relatively simple positioning system can be used. Such a positioning system may include automated movement of the nozzle 132 or the fixture 136 along only one axis with the ability to manually position the nozzle or the fixture to achieve a desired cleave height and spacing between the fiber desired to be cleaved and the nozzle. Additionally, the nozzle or the fixture may be capable of being manually pivoted to adjust the angular orientation between the optical fiber and the nozzle to alter the angle of incidence of the center axis of the nozzle with respect to the fiber. Of course, more complicated positioning systems such as three-axis positioning systems or six-axis positioning systems can be used. Additionally, through the use of computer controller robotics, movement of the nozzle and/or the fixture can be programmed and implemented along any line or curve and translational movement can be integrated with pivotal movement to achieve more complicated processing operations.

Figure 9:
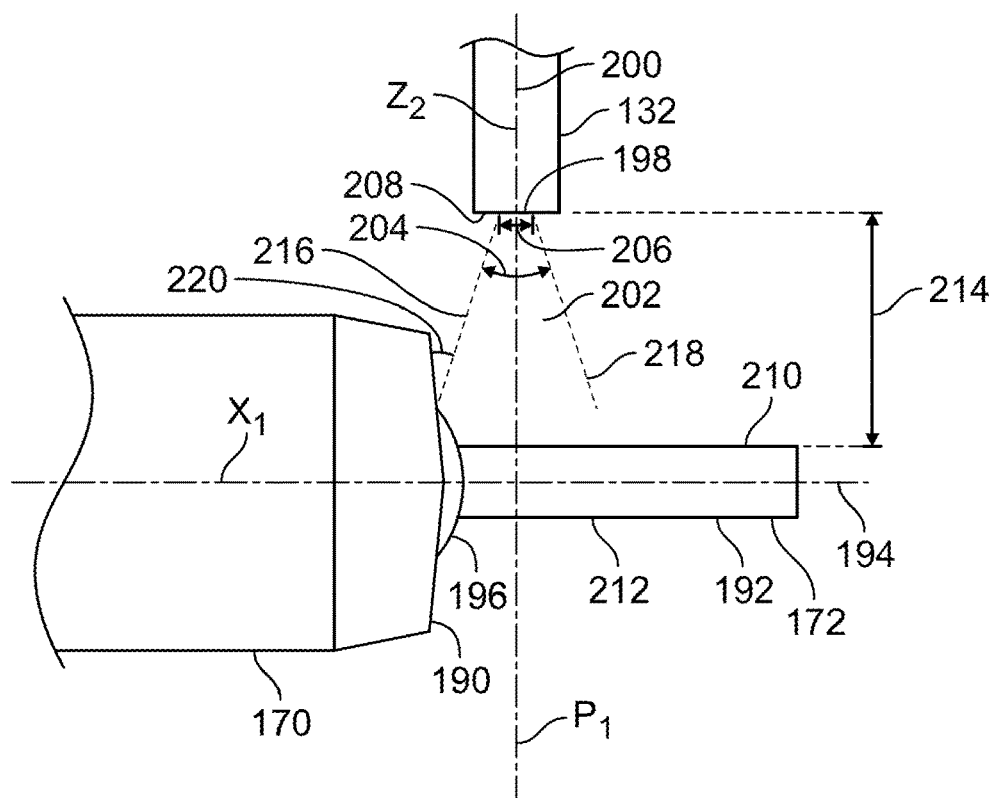
FIG. 9 schematically depicts an example first cleaving operation step.

FIGS. 9-12 illustrate a series of steps for cleaving an optical fiber 172 supported by a ferrule 170 using an abrasive jet system such as the abrasive of jet system 120. As shown at FIG. 9, the ferrule 170 supports the optical fiber 172. In one example, the ferrule 170 has a ceramic construction. In one example, the ferrule 170 is an LC ferrule. In one example, the optical fiber 172 is secured by epoxy within a central opening of the ferrule 170. As shown at FIG. 9, the ferrule 170 has a domed (e.g., curved with a radius of curvature) ferrule end face 190. In one example, the ferrule 170 can be pre-manufactured with the domed ferrule end face 190 prior to cleaving. For example, the ferrule 170 can be initially molded with the domed end face 190 present. Thus, a polishing or machining process is not needed after cleaving to provide the ferrule end face 190 with the desired domed shape. As shown at FIG. 9, a stub portion 192 of the optical fiber 172 projects outwardly beyond the ferrule end face 190. The stub portion 192 extends along a central axis 194 of the optical fiber 172. In one example, the ferrule 170 can be supported such that the central axis 194 extends along the axis $X_1$.

As indicated above, an adhesive material such as epoxy can be used to secure the optical fiber 172 within the bore of the ferrule 170. As shown at FIG. 9, excess or residue adhesive 196 (e.g., excess epoxy) is bonded to the ferrule end face 190 around a base of the stub portion 192 of the optical fiber 172. As part of the cleaving process, it is desirable to remove the excess adhesive 196 from the ferrule end face 190.

Referring still to FIG. 9, the abrasive jet nozzle 132 has a nozzle opening 198 aligned along a central nozzle axis 200. The nozzle 132 is configured to discharge an abrasive media stream 202 that includes air and abrasive material. The abrasive media stream 202 discharged from the nozzle opening 190 has a stream angle 204. The nozzle opening 198 has an exit cross-dimension 206. In the case of a circular nozzle opening 198, the exit cross-dimension 206 of the nozzle opening 198 is a diameter of the nozzle opening 198. In certain examples, the cross-dimension 206 is less than or equal to 0.05 inches, or less than or equal to 0.04 inches, or less than or equal to 0.03 inches, or less than or equal to 0.02 inches, or in the range of 0.01-0.04 inches.

The optical fiber stub portion 192 includes a first side 210 that faces toward the nozzle tip 208 and an opposite second side 212. The nozzle 132 and the stub portion 192 are preferably relatively positioned such that a spacing 214 exists between the nozzle tip 208 and the first side 210 of the stub portion 192.

In certain examples, the stream angle 204 is less than or equal to 12 degrees. In certain examples, the stream angle 204 is greater than 3 degrees. In certain examples, the stream angle 204 is in the range of 3-12 degrees, or 4-11 degrees, or 5-10 degrees, or 6-9 degrees. In one example, the stream angle is 7 degrees.

In the depicted example, the central nozzle axis 200 aligns with the axis $Z_2$ of the control system of FIG. 7. In one example, the central fiber axis 194 of the fiber stub portion 192 and the central nozzle axis 200 are perpendicular with respect to one another. In certain examples, the central fiber axis 194 and the central nozzle axis 200 are perpendicular with respect to one another within plus or minus 5 degrees. In certain examples, the central nozzle axis 200 is positioned within a plane P1 that is perpendicular with respect to the central fiber axis 194. In certain examples, the central nozzle axis 200 is positioned within a plane P1 that is perpendicular with respect to the central fiber axis 194 plus or minus 5 degrees.

Referring still to FIG. 9, the stream angle 204 of the abrasive media stream 200 extends between first and second stream edges 216, 218 that are angled relative to one another. During cleaving, it is preferred for the first stream edge 216 to impinge upon the ferrule end face and the excess adhesive 196. In certain examples, the first stream edge 216 defines an angle 220 with respect to the ferrule end face 190 that is less than or equal to 12 degrees. The relatively low impingement angle assists in ensuring the end face 190 is not damaged during the cleaving process. In certain examples, the central nozzle axis 200 is offset from the end face 190 of the ferrule 170 and does not intersect the end face 190 of the ferrule 170 during the cleaving process.

In certain examples, the spacing 214 between the nozzle tip 208 and the first side 210 of the fiber stub portion 192 is equal to or less than 10 mm, or equal to or less than 9 mm, or equal to or less than 8 mm, or equal to or less than 7 mm, or equal to or less than 6 mm.

In cleaving the optical fiber, the abrasive media stream 202 is initially directed at the first side 210 of the stub portion 192 as shown at FIG. 9. The abrasive action of the abrasive media stream 202 abrades away a portion of the stub portion 192 and also abrades away a portion of the excess adhesive 196. In certain examples, the abrasive media in the stream has an average particle size less than or equal to 8 microns, and the stream has an average velocity when exiting the nozzle in the range of 80 to 180 meters per second.

Figure 10:
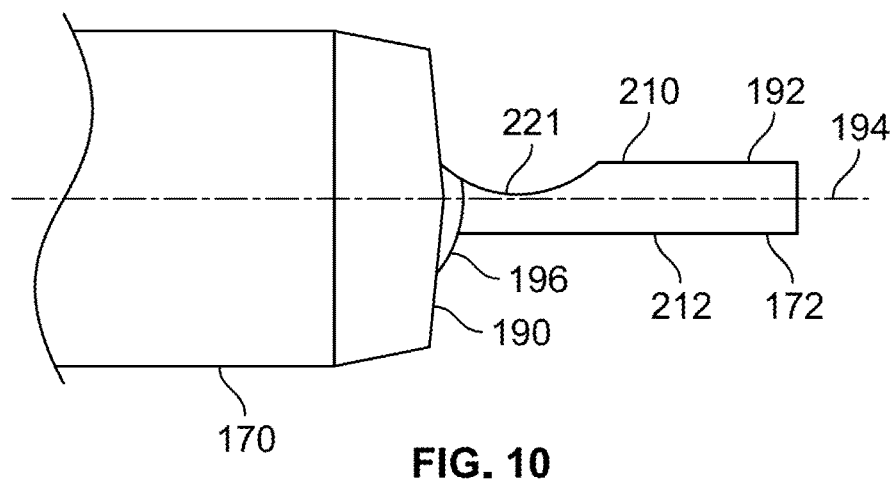
FIG. 10 illustrates an optical fiber after the first cleaving operation step after FIG. 9 has been completed.

FIG. 10 shows the stub portion 192 with an abraded region 221 caused by impingement of the abrasive media stream 202 on the first side 210 of the stub portion 192. After the abrasive media steam 202 has been directed at the first side 210 of the fiber stub portion 192, the abrasive jet nozzle 132 can be rotated 180 degrees or about 180 degrees about the central fiber axis 194 while maintaining the central nozzle axis 200 within the plane P1.

Figure 11:
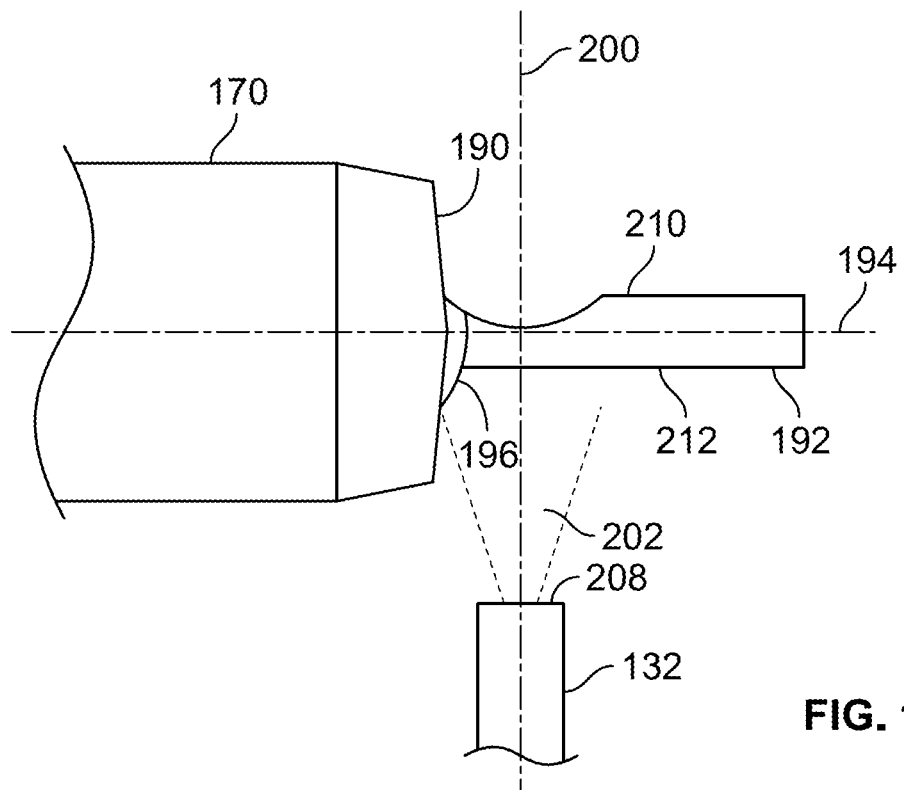
FIG. 11 illustrates a second cleaving operation step being applied to the optical fibers.

FIG. 11 shows the abrasive jet nozzle 132 after the abrasive jet nozzle 132 has been rotated about the central fiber axis 194 from the first position where the nozzle tip opposes the first side 210 of the fiber stub portion 192 to a second position where the nozzle tip 208 opposes the second side 212 of the fiber stub portion 192. Once the abrasive jet nozzle 132 is in the second position, the abrasive media stream 202 is again activated so as to impinge against the second side 212 of the fiber stub portion 192. As the abrasive media stream 202 impinges upon the fiber stub portion 192 and the ferrule end face 190, any remaining excess adhesive 196 is removed from the ferrule end face 190 and the second side 212 of the fiber stub portion 192 is abraded to complete the cleaving process.

Figure 12:
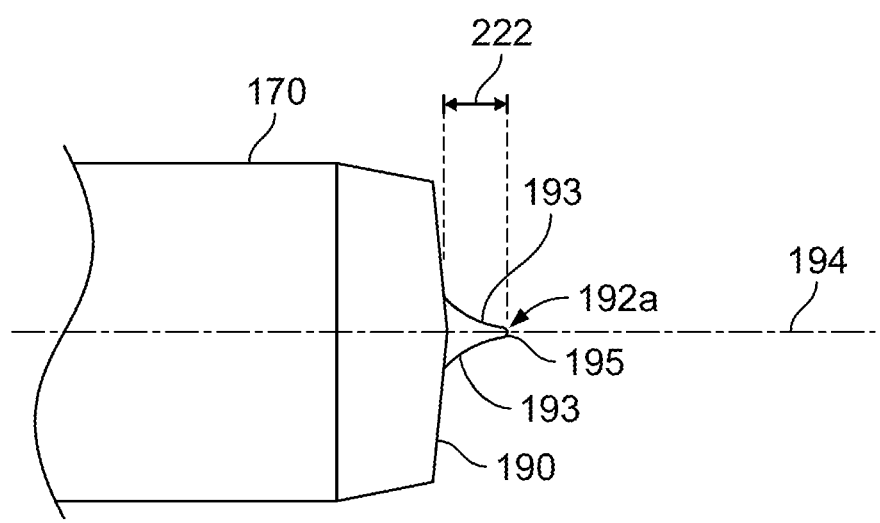
FIG. 12 is a side view showing the remaining fiber protrusion that exists after the optical fiber has been cleaved in accordance with the steps of FIGS. 9 and 11.

FIG. 12 shows a post-cleave stub portion 192a that remains after the cleaving process has been completed. After the cleaving process, the post-cleave stub portion 192a has a projection height 222 that in certain examples is between 2 and 60 microns. In other examples, the projection height 222 is in the range of 2-30 microns, or in the range of 2-20 microns or in the range of 2-10 microns. It is desirable for the projection height 222 to be sufficiently large such that enough glass of the optical fiber extends beyond the ferrule end face 190 to allow the projecting portion of the optical fiber to be effectively mechanically polished using a final polish process, and sufficiently small to avoid cracking the fiber during final polishing operations that may occur after cleaving or damaging a final polishing film during final polish operations that may occur after cleaving.

In certain examples, a final polish process that may occur after cleaving involves polishing the ferrule end face 190 and the post-cleave stub portion 192a using a final polishing film or lapping film. In certain examples, the polishing film includes an abrasive with a micron grade less than or equal to 1 micron, or less than or equal to 0.5 microns, or less than or equal to 0.4 microns, or less than or equal to 0.3 microns, or less than or equal to 0.1 microns, or less than or equal to 0.05 microns. In one example, the polishing film can be impregnated with an abrasive media such as silicon dioxide. In one example, the polishing film is supported on an elastomeric (e.g., rubber) polishing pad during the final polish. In one example, the polishing pad has a durometer in the range of 75-85 Shore A. In one example, water or other liquid is added to the film before or during polishing. In one example, the total polishing time is less than or equal to 120 seconds, or less than or equal to 90 seconds, or less than or equal to 60 seconds. In certain examples, the abrasive jet cleaving process prepares the optical fiber tip such that only a single final polish process having a relatively short duration (e.g., less than or equal to 120 seconds or less than or equal to 90 seconds or less than or equal to 60 seconds) is required to bring the optical fiber into compliance with pertinent insertion loss and return loss parameters. In certain examples, after the single final polish step, the optical fiber achieves a return loss of 50 decibels or better for UPC single mode fiber optic connectors and 65 decibels or better for APC singe mode fiber optic connectors.

It will be appreciated that the abrasive jet cleaving process provides a number of advantages. For example, the abrasive jet cleaving system effectively cleaves optical fibers without shattering the optical fibers. This is very advantageous because shattered fibers cannot be reworked. Thus, there is a total loss of material when fiber shattering occurs. Another advantage of the abrasive jet cleaving process is the ability to simultaneously remove excess epoxy that is normally present on the ferrule end face thereby reducing processing costs considerably. Additionally, the cleaving process assists in reducing costs scrap and labor and can assist in improving the quality of fiber optic terminations. Moreover, the abrasive jet cleaving process leaves sufficient glass of the optical fiber protruding from the ferrule end face to allow the protruding glass of the optical fiber to be effectively polished using only a final polish process. Thus, no additional, time consuming and more abrasive polishing steps are needed after the cleaving step. As compared to traditional operations where five different polishing steps are often required, the use of abrasive jet cleaving and a pre-domed ferrule allows the more abrasive polishing steps to be eliminated (e.g., bypassed). Instead, it is possible to proceed directly to final polish immediately after cleaving. It will be appreciated that final polish utilizes relatively small particle size abrasives (e.g., often on the sub-micron level).

Figure 13:
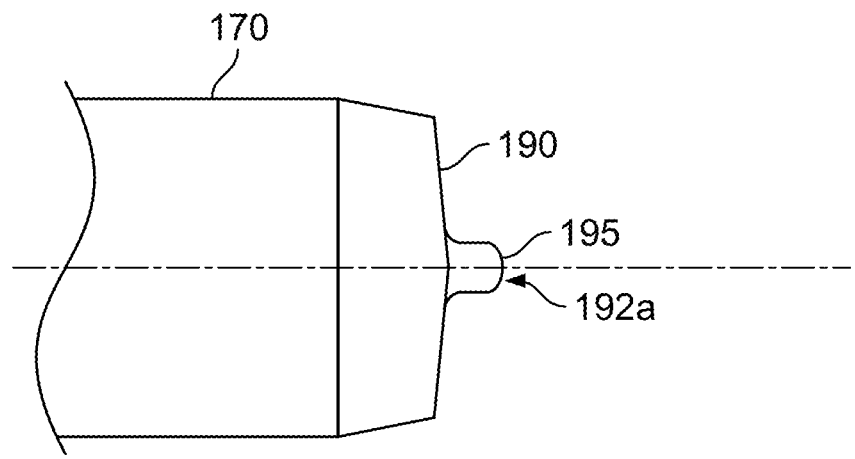
FIG. 13 is a top view showing the fiber protrusion of FIG. 12.

Referring to FIGS. 12 and 13, the post-cleave stub portion 192a of the optical fiber has a generally "duck-bill" appearance after abrasive jet cleaving. For example, opposite sides of the post-cleave fiber stub portion 192a each have concave curvatures 193 that converge toward an apex 195 at the central fiber axis 194. The concave surfaces 193 converge as the concave surfaces 193 extend away from the ferrule end face 190. The duck-bill appearance is the effect of the abrasive media steams eroding material at a relatively consistent rate volumetrically. Therefore, the point of greatest material thickness of the workpiece (e.g., the optical fiber) retains the largest cross-section. In addition, the abrasive media stream 202 spreads out at the stream angle 204. This, in conjunction with the mixing of still (non-moving) air at the stream edges 216, 218 causes the particle velocity and particle density to decrease adjacent the edges of the abrasive media stream 202.

Figure 14:
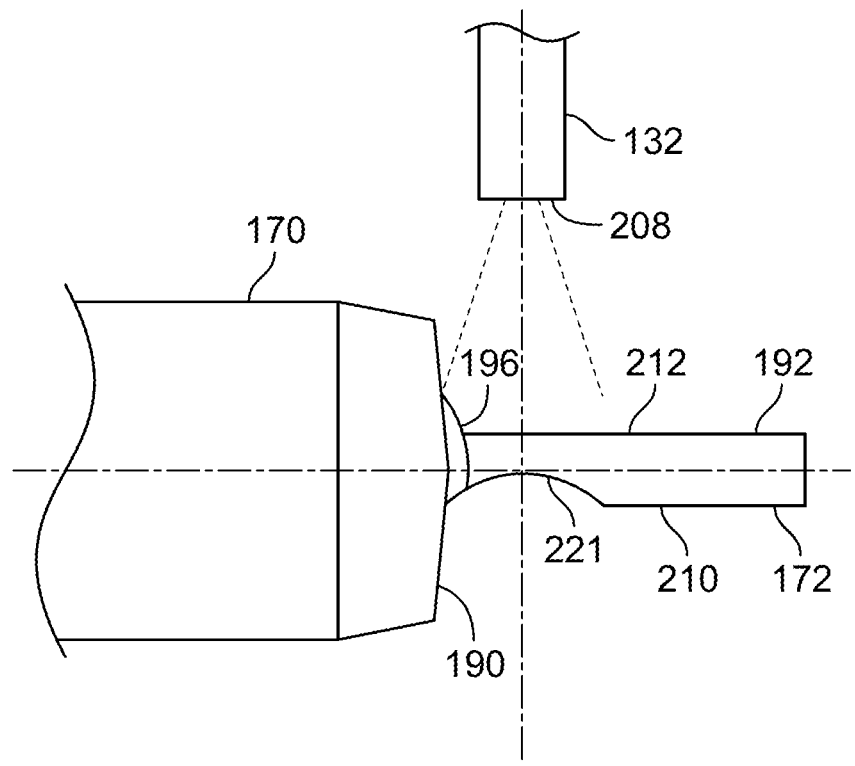
FIG. 14 illustrates another processing step for cleaving the optical fiber of FIG. 9.

In the example of FIGS. 9-11, the nozzle tip 208 was placed in opposition with respect to the second side 212 of the fiber stub portion 192 by rotating the nozzle 132 about the central fiber axis 194. FIG. 14 shows an alternative method for arranging the system such that the nozzle tip 208 opposes the second side 212 of the fiber stub portion 192. According to the method of FIG. 14, after the abrasive media stream 202 has been applied to the first side 210 of the fiber stub portion 192, the ferrule 170 is rotated about the central fiber axis 194 approximately 180 degrees until the second side 212 of the fiber stub portion 192 opposes the nozzle tip 208. Thereafter, the abrasive media stream 202 is directed at the second side 212 to achieve the cleaved configuration shown at FIGS. 12 and 13.

In conducting the abrasive jet cleaving process, the protrusion height of the post-cleave stub portion 192a after the cleaving process is important because there needs to be enough glass height protruding beyond the ferrule end face 190 so that the final polish step can remove surface pits and scratches which may remain after cleaving and which are sufficiently large to cause the optical fiber to not comply with pertinent insertion loss and/or return loss requirements.

The above described abrasive jet cleaving process involved a first operation where the abrasive media stream 202 is directed at the first side 210 of the fiber stub portion 192, and second operation where the abrasive media stream 202 is directed at the opposite second side 212 of the fiber stub portion 192. Thus, the process involves directing abrasive media stream at opposite sides of the optical fiber being cleaved. In other examples, abrasive media streams can be directed at more than just two opposite sides of the fiber. For example, media streams can be directed at three, four, five, six or more circumferential locations about the circumference of the optical fiber. In still other embodiments, an abrasive media stream can be applied continuously about the entire circumference of the optical fiber by turning the optical fiber about its central axis relative to the abrasive media stream or by turning the nozzle about the central fiber axis 194 while continuously applying the abrasive media stream to the optical fiber. It will be appreciated that one, two, three, four, five, six or more nozzles can be utilized.

In certain examples, when the abrasive media steam 202 is applied to the fiber stub portion 192, the stub portion 192 and the nozzle 132 can remain fixed and do not move relative to one another. In other examples, relative movement may be generated between the fiber stub portion 192 and the abrasive jet nozzle 132 as the abrasive media stream 202 is used to abrade the fiber stub portion 192. The relative motion can be generated by moving the nozzle 132 relative to the stub portion 192, by moving the stub portion 192 relative to the nozzle 132, or by concurrently moving both the stub portion 192 and the abrasive jet nozzle 132. It will be appreciated that motion control protocol, logic or recipes can be used to control the relative motion in a repeatable manner. The motion control recipes may include using different relative movement speeds, accelerations, decelerations and angular orientations. The recipes can include stopping the relative movement at one, two, three or more relative positioning arrangements such that extended dwell times are provided at such locations. It will be appreciated that dwell times allow for higher levels of abrasion at the locations where the relative movement is temporarily stopped. Similarly, slower relative velocities between the nozzle and the workpiece can result in higher removal rates when compared to faster relative velocities. It will be appreciated that other factors can also be varied or controlled as part of an overall control protocol/recipe. For example, in real time, the abrasive particle density in the abrasive media stream can be increased and decreased in real time to respectively increase and decrease removal rates. Similarly, the air speed of the abrasive media stream can be increased and decreased in real time to respectively increase and decrease removal rates. Additionally, the angle of incidence of the abrasive media stream 202 upon the work piece can be modified in real time to increase or decrease removal rates. In this regard, the more directly the abrasive media stream 202 impinges upon a surface, the higher the removal rate. Thus, by bringing the angle of the abrasive media stream closer to 90 degrees with respect to the surface being acted upon, the removal rate increases. In contrast, by adjusting the abrasive media stream away from perpendicular with respect to the surface being acted upon, the removal rate decreases.

In some examples, relative movement between the fiber stub portion 192 and the abrasive jet nozzle 132 can be in an orientation transversely oriented relative to the central fiber axis 194. This type of movement provides a scanning action where either the fiber stub portion 192 scans across the abrasive media stream 202 or the abrasive media stream 202 scans across the fiber stub portion 192. The scanning action can be linear or curved.

Figure 15:
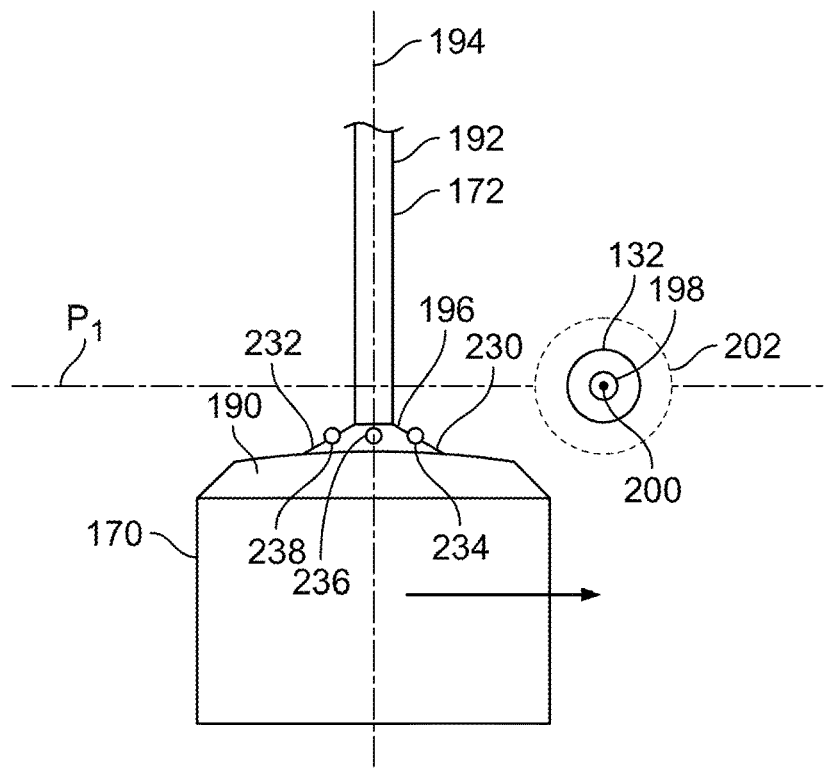
FIG. 15 schematically depicts a motion control protocol for controlling relative movement between an abrasive jet stream and a workpiece such as an optical fiber, the motion control protocol has three dwell locations.
Figure 16:
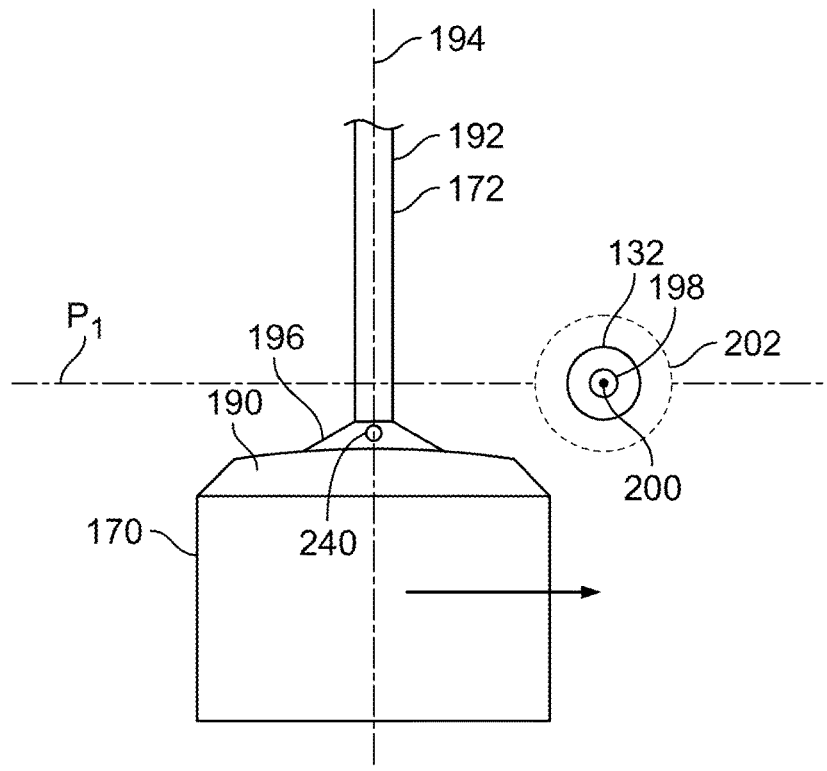
FIG. 16 illustrates another motion control protocol having only a single dwell point.
Figure 17:
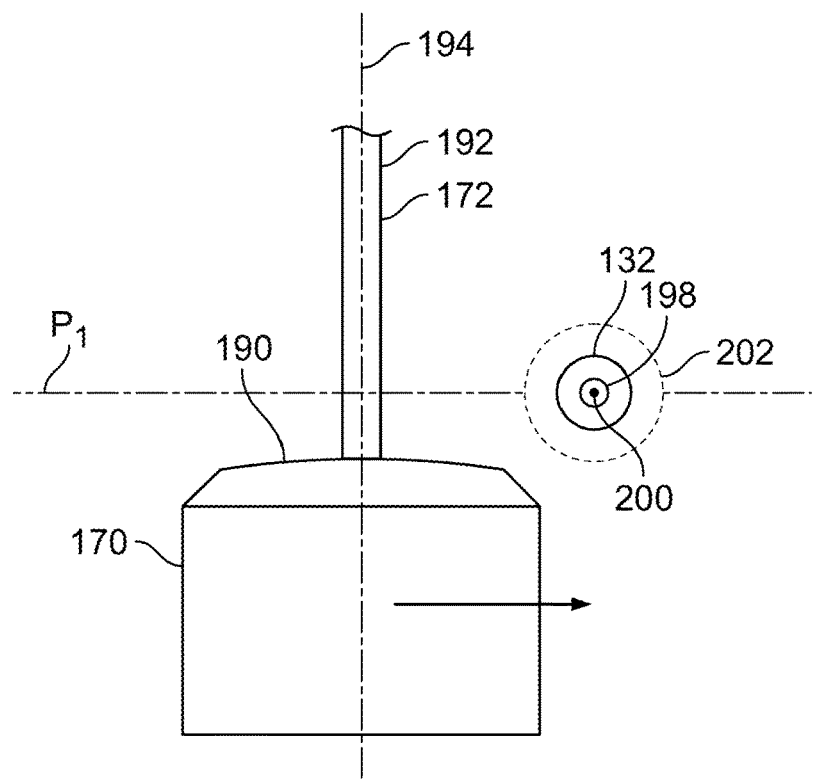
FIG. 17 illustrates a motion control protocol having no dwell points.

FIGS. 15-17 show three different motion control recipes involving scanning the fiber stub portion 192 linearly across the abrasive media stream 202 in an orientation generally transversely oriented relative to the central fiber axis 194. The views of FIGS. 15-17 are from the perspective of the abrasive jet nozzle looking toward the fiber or stub portion 192. The motion control recipes are adapted for cleaving an optical fiber. In one example, the central nozzle axis 200 is positioned within the plane P1 during scanning and the scanning motion of the stub portion 192 is along the plane P1. As indicated above, the plane P1 is preferably perpendicular relative to the central fiber axis 194. In other examples, the plane P1 can be within plus or minus 5 degrees of perpendicular relative to the central fiber axis. The orientation of the nozzle 132 with the central axis 200 along the plane P1 causes the abrasive stream to be directed such that the central axis 200 does not intersect the ferrule end face 190 or the residual adhesive 196 during scanning. In a typical motion sequence, the fiber stub portion 192 can be initially scanned across the abrasive media stream 202 along the plane P1 with the first side 210 facing the abrasive media stream 202 such that the first side 210 of the fiber stub portion 192 is abraded. Second, the fiber stub portion 192 can be scanned across the abrasive media stream 202 along the plane P1 with the second side 212 facing the abrasive media stream 202 such that the second side 212 is abraded.

FIG. 15 shows an example of a motion control recipe having a scanning motion across the abrasive media stream 202 where the stub portion 192 dwells at three locations during each of the first and second scans. As shown at FIG. 15, the excess adhesive 196 includes a first edge 230 and a second opposite edge 232. When the fiber stub portion 192 is scanned across the abrasive media stream 202 along the plane P1, the fiber stub portion 192 dwells at a first dwell location 234 where the central nozzle axis 200 is between the first edge 230 and the central fiber axis 194, a second dwell location 236 where the central nozzle axis 200 intersects the central fiber axis 194, and a third dwell location 238 where the central nozzle axis 200 is positioned between the central fiber axis 194 and the second edge 232. It will be appreciated that this same motion recipe can be used for directing the abrasive media stream 202 at both the first side 210 with the first scan and a second side 212 with the second scan. It has been determined that the three dwell locations are beneficial for effectively removing epoxy particularly where large amounts of epoxy are present.

FIG. 16 shows another motion recipe using a scanning motion across the abrasive media stream 202 having only one dwell location 240. The dwell location occurs when the central nozzle axis 200 intersects the central fiber axis 194. The scanning motion can be linear in a direction transverse with respect to the central fiber axis 194 (e.g., along the plane P1). The scanning motion can be used to direct the abrasive media stream 202 at the first side 210 of the fiber stub portion 192 and then can be repeated to apply the abrasive media stream 202 to the second side 212 of the fiber stub portion 192.

FIG. 17 shows another motion recipe including a scanning motion where the fiber stub portion 192 is scanned across the abrasive media stream 202. The motion recipe of FIG. 17 does not have any dwell locations. Instead, the fiber stub portion 192 is scanned across the abrasive media stream 202 along the plane P1 at a continuous speed to direct the abrasive media stream 202 to the first side 210 of the fiber stub portion 192, and then the same motion recipe is repeated to apply the abrasive media stream 202 to the second side 212 of the fiber stub portion 192. This type of motion strategy or recipe is particularly advantageous for cleaving fiber stub portions having little to no excess adhesive residue.

As indicated previously, the scanning motion can be linear, curved, rotational or angular. In the case of a rotational scan, in one example, the fiber stub portion 192 can be rotated about the central fiber axis 194 while the abrasive jet nozzle 132 and the fiber stub portion 192 are in the configuration of FIG. 9. While the stub portion 192 is rotated about the central fiber axis 194, the abrasive media stream 202 is continuously applied to the outer surface of the fiber stub portion 192 throughout the full 360 degree rotation of the fiber stub portion 192 about the central fiber axis 194. Thus, abrasive media stream 202 is applied fully about all 360 degrees of the outer circumference of the fiber stub portion 192. After completion of the rotational scan, the excess adhesive 196 has been fully removed from the ferrule end face 190 (see FIG. 18) and the fiber stub portion 192 has been cleaved thereby leaving a post-cleave stub portion 192b that projects outwardly from the ferrule end face 190. The post-cleave stub portion 192b has a generally conical shape (see FIG. 18) and preferably has a projection height in the range of 2-60 microns, or in the range of 2-30 microns, or in the range of 2-20 microns or in the range of 2-10 microns. The height of the post-cleave stub portion 192b is preferably sufficiently large such that imperfections or scratches present after the cleaving process can be removed by a subsequent final polish process. In one example, the final polish process is required to include only one final polishing operation to remove the imperfections and to bring the optical fiber into compliance with pertinent insertion loss and return loss requirements.

In an alternative example, to produce the rotational scan, the nozzle 132 can be rotated circumferentially about the stub portion 192. In this type of process, the nozzle 132 and the fiber stub portion 192 can be relatively positioned in the orientation of FIG. 9 with the stream central axis 200 aligned along the plane P1. The nozzle 132 can be rotated about the central fiber axis 194 while the abrasive media stream 202 continuously applies the abrasive media stream 202 about the full 360 degree circumference of the fiber stub portion 192. During rotation, the stream central axis 200 can remain in the plane P1 and the stream axis 200 can remain perpendicular to the central fiber axis 194.

It will be appreciated that abrasive jet systems can also be used to cleave optical fibers used in angle physical contact (APC) connectors. An APC connector has an optical fiber with an end face that is angled so as to be non-perpendicular relative to the central fiber axis of the fiber. In certain examples, the angled face of the cleaved optical fiber is angled 5 to 15 degrees from perpendicular relative to the central fiber axis. In other examples, the angle face of the APC connector optical fiber is angled 7 to 9 degrees from perpendicular relative to the central fiber axis. Typically, the angled end face of the optical fiber of an APC connector angled 8 degrees from perpendicular relative to the central fiber axis of the optical fiber of the connector.

Figure 19:
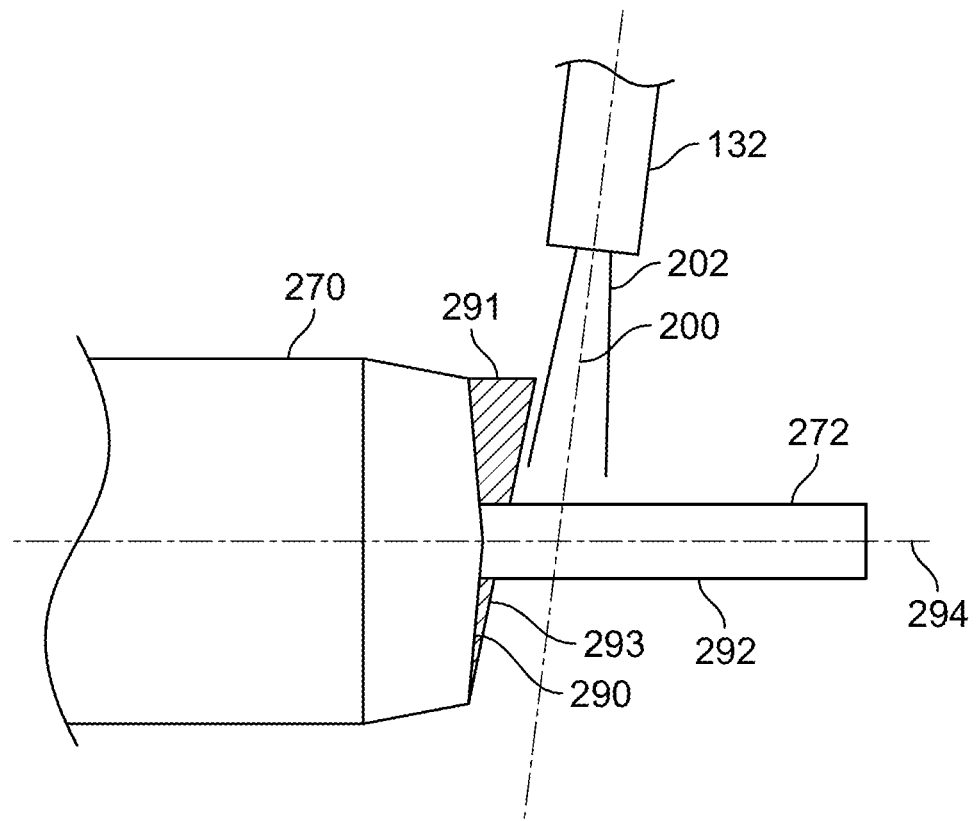
FIG. 19 illustrates an abrasive jet cleaving process for an APC connector that utilizes a mask.

FIG. 19 shows the abrasive jet cleaving system 120 arranged in a configuration suitable for providing an angled cleave. As shown at FIG. 19, a ferrule 270 is shown supporting an optical fiber 272. The ferrule includes a ferrule end face 290 which is pre-formed with an end face shape having dome. The optical fiber 272 can be secured within the ferrule 270 by an adhesive. A fiber stub portion 292 projects outwardly from the ferrule end face 290. A mask 291 made of abrasive resistant material has been positioned over the ferrule end face 290. The mask 291 has an angled end face 293 for forming an angled cleave. The angled end face 293 is typically oriented at an angle in the range of 75 to 85 degrees relative to the central fiber axis 294, or in the range of 78 to 84 degrees relative to the central fiber axis 294 or about 82 degrees relative to the central fiber axis 294. At the optical fiber 272, the mask 291 has a depth D that preferably corresponds generally with a desired post-cleave fiber height of the stub portion 292. The mask 291 is preferably made of abrasive resistant material such as a deposited metal film. The abrasive jet nozzle 132 is oriented with the central nozzle axis 200 aligned at a non-perpendicular angle relative to the central fiber axis 294. In one example, the central nozzle axis 200 oriented parallel with respect to the angled end face 293 of the mask 291. Thus, the angle of the central nozzle axis 200 relative to the central fiber axis 294 can have the same values previously set forth with respect to the angled mask end face 293. It will be appreciated that the mask 291 shields and protects the base portion of the fiber stub portion 292 corresponding to the depth D. Because the mask end face 293 is angled and the nozzle 132 is angled, the abrasive media stream 202 can be used to cleave the fiber stub portion 292 at an angle. In applying the abrasive media stream 202, motion recipes of the type previously described can be utilized. For example, opposite first and second sides of the optical fiber can be linearly scanned across the abrasive media stream 202 or the abrasive media stream 202 can be linearly scanned across opposite first and second sides of the fiber stub portion 292. Alternatively, the fiber stub portion 292 can be rotated about its central axis 294 while the abrasive media stream 202 is applied continuously about the full 360 degree circumference of the optical fiber. Alternatively, the nozzle 132 can be rotated 360 degrees about the central fiber axis 294 while continuously applying the abrasive media stream 202 to the outer circumference of the optical fiber 272. After cleaving, the post-cleave protrusion height that is higher at one side of the optical fiber as compared to the opposite side of the optical fiber. The higher protrusion height corresponds to the thicker portion of the mask while the smaller protrusion height corresponds to the thinner portion of the mask. After the cleaving process has taken place, processing of the fiber stub portion 292 can further include a final polish step where the end face of the fiber stub portion 292 is polished by a final polishing film. It will be appreciated that the mask 291 can be removed during final polishing by the final polishing film.

In other examples, an angled cleave may be implemented without the use of a mask or masks by relatively angling the optical fiber and the nozzle as described above such that the abrasive stream cuts across the optical fiber at an oblique angle relative to the central axis of the optical fiber.

Figure 20:
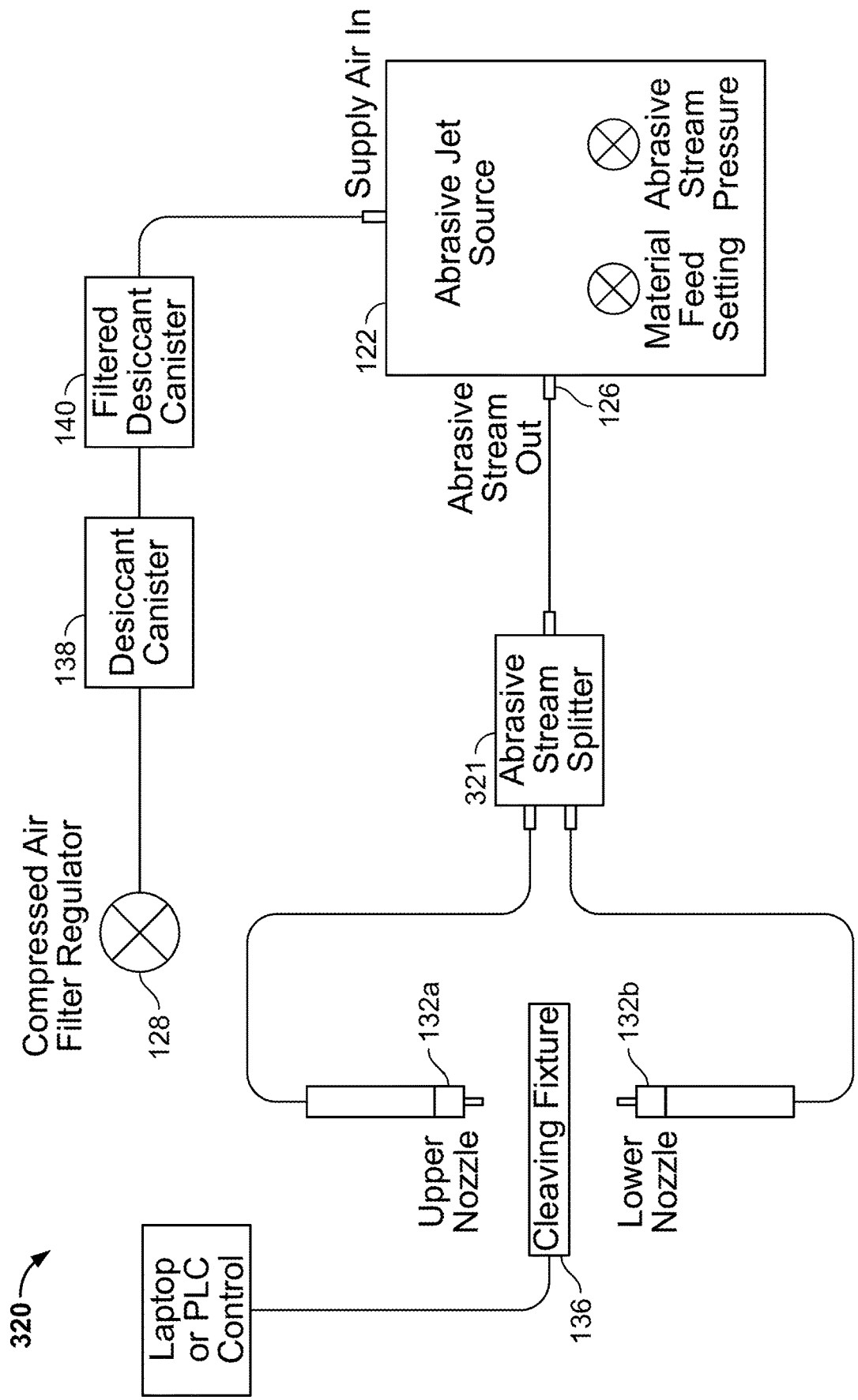
FIG. 20 schematically depicts another abrasive jet system in accordance with the principles of the present disclosure for processing optical fibers.

FIG. 20 shows another abrasive jet system 320 in accordance with the principles of the present disclosure. Preferably, the abrasive jet system 320 is configured for cleaving optical fibers using an abrasive media stream including a mixture of air and abrasive media. The abrasive jet system 320 includes many of the same basic components previously described with respect to the abrasive jet system 120 and such components are similarly numbered. The abrasive jet system 320 has been modified from the abrasive jet system 120 by including first and second abrasive jet nozzles 132a, 132b. The abrasive jet nozzles 132a, 132b can have the same configuration as the abrasive jet nozzle 132. However, the abrasive jet nozzles 132a, 132b are positioned in opposition with respect to one another. For example, the first and second nozzles 132a, 132b can be positioned on opposite sides (e.g., the nozzles 132a, 132b are rotationally offset 180 degrees relative to one another and the nozzle axes of the nozzles 132a, 132b can be coaxially aligned). The nozzle 132a is an upper nozzle and the nozzle 132b is a lower nozzle. The cleaving fixture 136 can be positioned to hold a stub portion of an optical fiber generally between the two nozzles 132a, 132b during cleaving operations. Thus, the nozzles are on diametrically opposite sides of the central fiber axis of the fiber stub being cleaved. In other examples, the nozzles 132a, 132b need not be coaxially aligned and/or diametrically opposed. Instead, the nozzles can be positioned at any intermediate position between the diametrically opposed positions.

Figure 18:
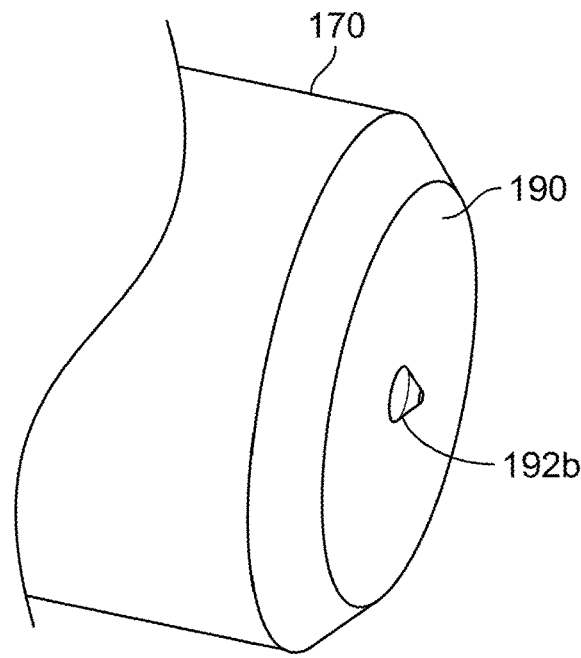
FIG. 18 illustrates another stub configuration that can be generated by cleaving a fiber in accordance with the principles of the present disclosure.
Figure 21:
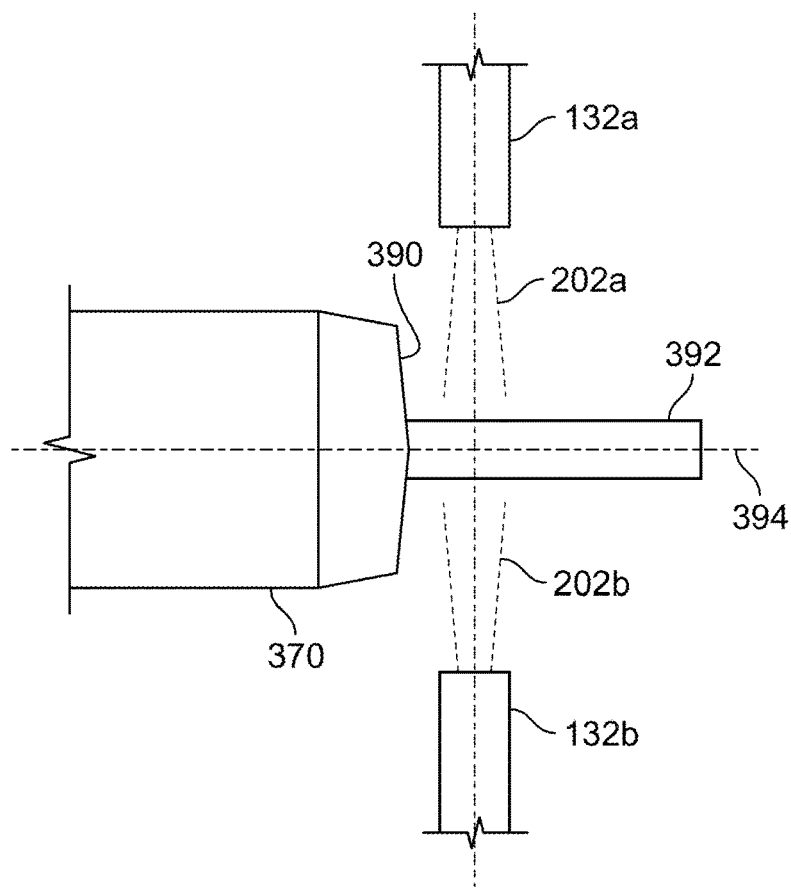
FIG. 21 is a schematic side view showing the abrasive jet system of FIG. 20 being used to cleave an optical fiber.

Referring to FIG. 21, the abrasive jet system 320 is shown in the process of cleaving an optical fiber stub portion 392 projecting from a ferrule end face 390 of a ferrule 370. Abrasive media streams 202a, 202b are simultaneously directed at opposite sides of the stub portion 392. Preferably, the nozzles 132a, 132b are positioned relative to the ferrule 370 such that edges of the abrasive media streams 202a, 202b impinge upon the ferrule end face 390, but the streams can also be offset from the ferrule end face 390 as shown. In some examples, the abrasive media streams 202a, 202b function to cleave the fiber stub portion 392 and concurrently remove the excess adhesive from the ferrule end face 390. After cleaving, processing of the cleaved stub portion of the optical fiber 372 can be accomplished by using only a single in a polish step. It will be appreciated that the same types of motion recipes previously described with respect to the abrasive jet system 120 can be used for the abrasive jet system 320. For example, during cleaving, the stub portion 392 can be linearly scanned through the simultaneous abrasive media streams 202a, 202b, or the abrasive media streams 202a, 202b can be simultaneously activated and scanned linearly across opposite sides of the stub portion 392. This type of processing would result in a duck-bill type post-cleave fiber stub protrusion similar to the post-cleave stub portion 192a shown at FIGS. 12 and 13. Alternatively, the stub portion 392 can be rotated about its central fiber axis 394 while the abrasive media streams 202a, 202b are simultaneously applied to the optical fiber to generate a post-cleave protrusion shape 192b as shown at FIG. 18. When the stub portion 392 is rotated relative to the nozzles 132a, 132b, only 180 degrees of rotation is required to provide full circumferential coverage of the outer circumference of the stub portion 392. The same shape could be generated by simultaneously applying the abrasive media streams 202a, 202b to the stub portion 392 while simultaneously rotating the nozzles 132a, 132b 180 degrees about the central fiber axis 394.

Figure 22:
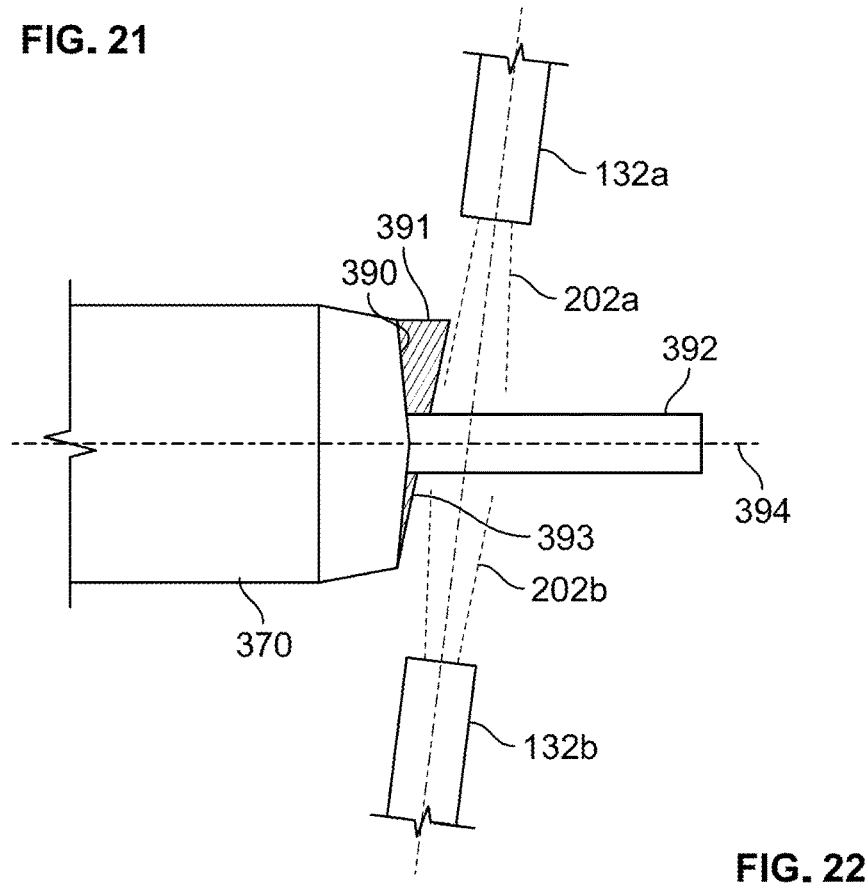
FIG. 22 shows the abrasive jet system of FIG. 20 used in combination with a mask to provide an angled cleave for use on an APC connector.

The abrasive jet system 320 can also be used in combination with masking to generate angled cleaves using air-based abrasive jet streams. For example, FIG. 22 shows the ferrule end face 390 protected by a mask 391 having an angled end face 393 corresponding to a desired angle of the cleave intended to be provided at the optical fiber. The nozzles 132a, 132b are positioned at diametrically opposite sides of the stub portion 392. Central nozzle axes of the nozzles 132a, 132b are aligned parallel with respect to the end face 393 of the mask 391. The abrasive media streams 202a, 202b are concurrently/simultaneously applied to the fiber stub portion 392 to cleave the optical fiber. The mask protects a portion of the optical fibers so that after cleaving the post-cleave fiber stub portion has a fiber height set generally by the thickness of the mask and the end face of the post-cleaved fiber stub has an angle that generally conforms or matches the angle of the mask end face. Of course, while the end face of the post-cleaved fiber stub may be generally angled, protrusions such as duck-bills or cones may still remain on the protrusion. It can be appreciated that such features are removed during the final polish process after cleaving. In performing the angled cleave, motion recipes of the type previously described can be used to control relative movement between the fiber stub portion 392 and the nozzles 132a, 132b. The relative movement can be linear or rotational and can provide a scanning action of the type previously described.

Referring back to FIG. 20, it is also noted that the system 320 has been more modified to include an abrasive stream splitter 321 that receives an abrasive media stream from the abrasive stream outlet 126 of the abrasive jet source 122 and divides the flow of the abrasive jet stream evenly such that half the flow is directed toward the first nozzle 132a and the other half of the abrasive jet flow is directed toward the second nozzle 132b. The abrasive stream splitter 321 has a two-to-one split ratio. In examples where more than two nozzles are used, stream splitters having higher split ratios can be used to provide flow to each of the nozzles. Additionally, it is preferred for the stream splitter to be symmetrical and to provide equal flow to each of the nozzles. However, in other examples, stream splitters having non-symmetrical splits can be used to provide more abrasive material to one nozzle as compared to the other.

Figure 23:
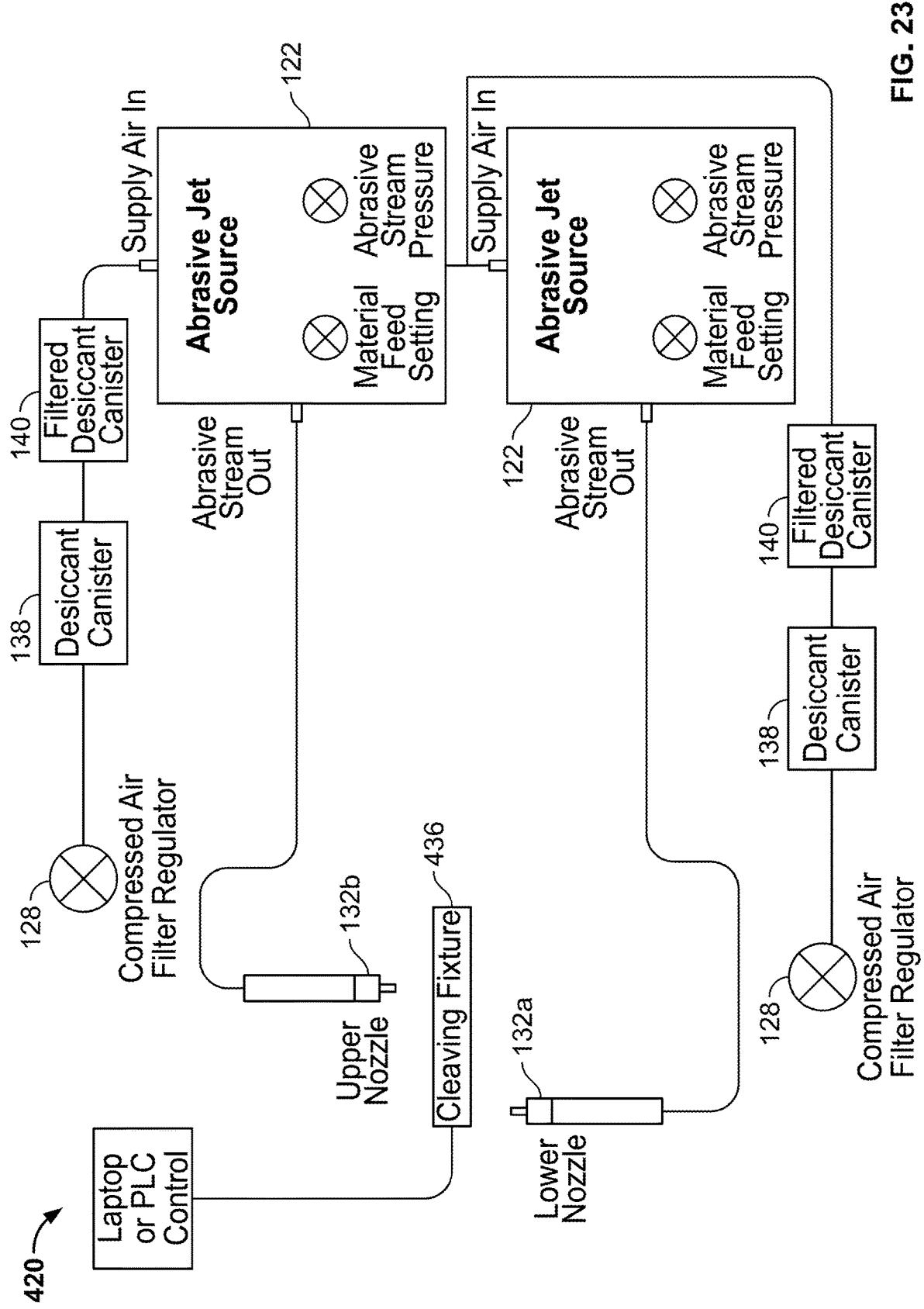
FIG. 23 schematically depicts a further abrasion jet system in accordance with the principles of the present disclosure for processing optical fibers.

FIG. 23 depicts another abrasive jet system 420 in accordance with the principles of the present disclosure. The abrasive jet system 420 is again configured for using air-based abrasive media streams to cleave or otherwise process optical fibers. The abrasive jet cleaning system 320 includes two abrasive jet nozzles 132a, 132b that face in opposite directions and that are offset from one another. Separate abrasive jet sources 122 are provided for each of the nozzles 132a, 132b so that the characteristics of the abrasive media stream provided to each of the nozzles 132a, 132b can be precisely controlled. In FIG. 23, like components that have been previously described in earlier systems have been labeled with the same reference numbers.

Figure 24:
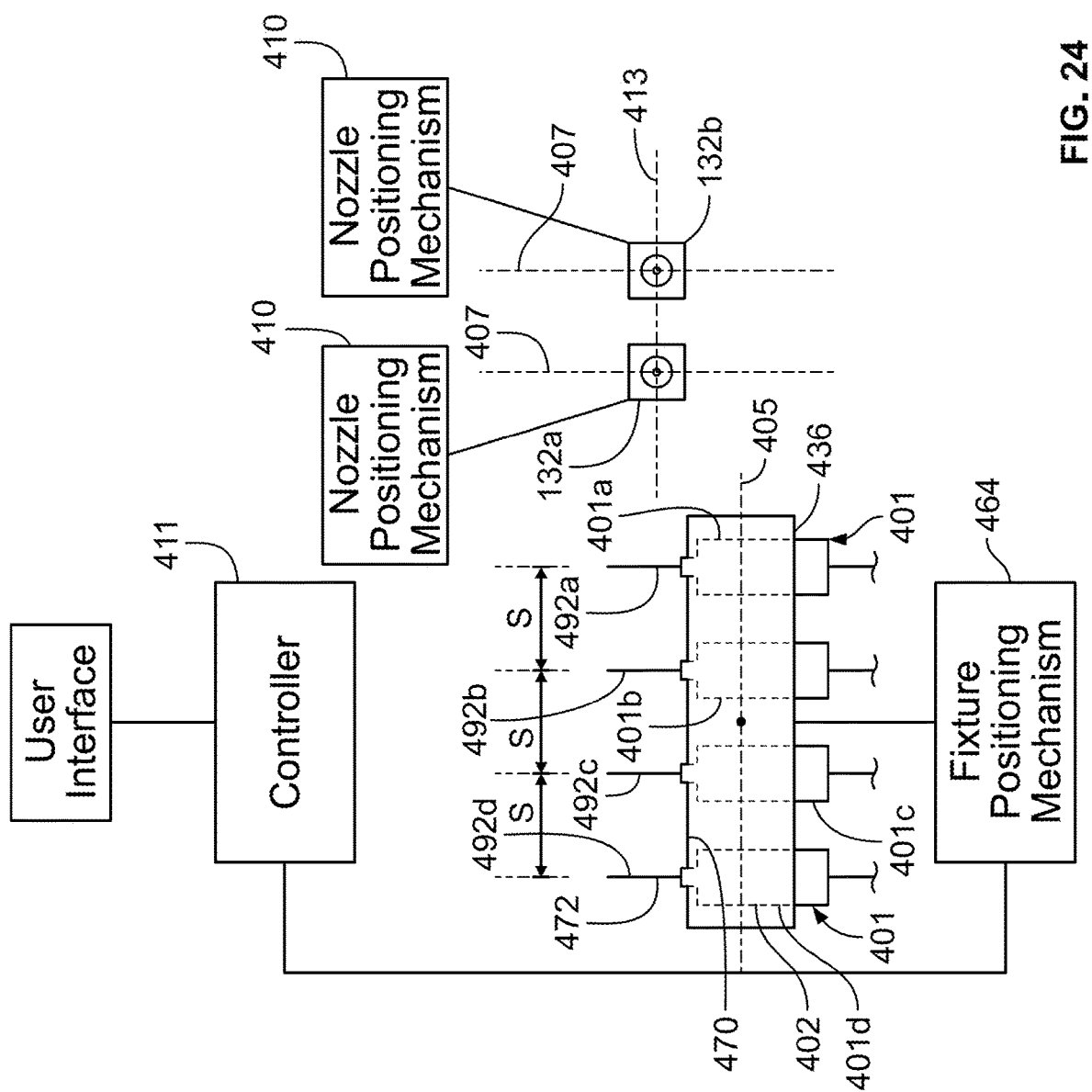
FIG. 24 is a schematic top view of an example motion control system for controlling movement of the abrasive jet system of FIG. 23.
Figure 25:
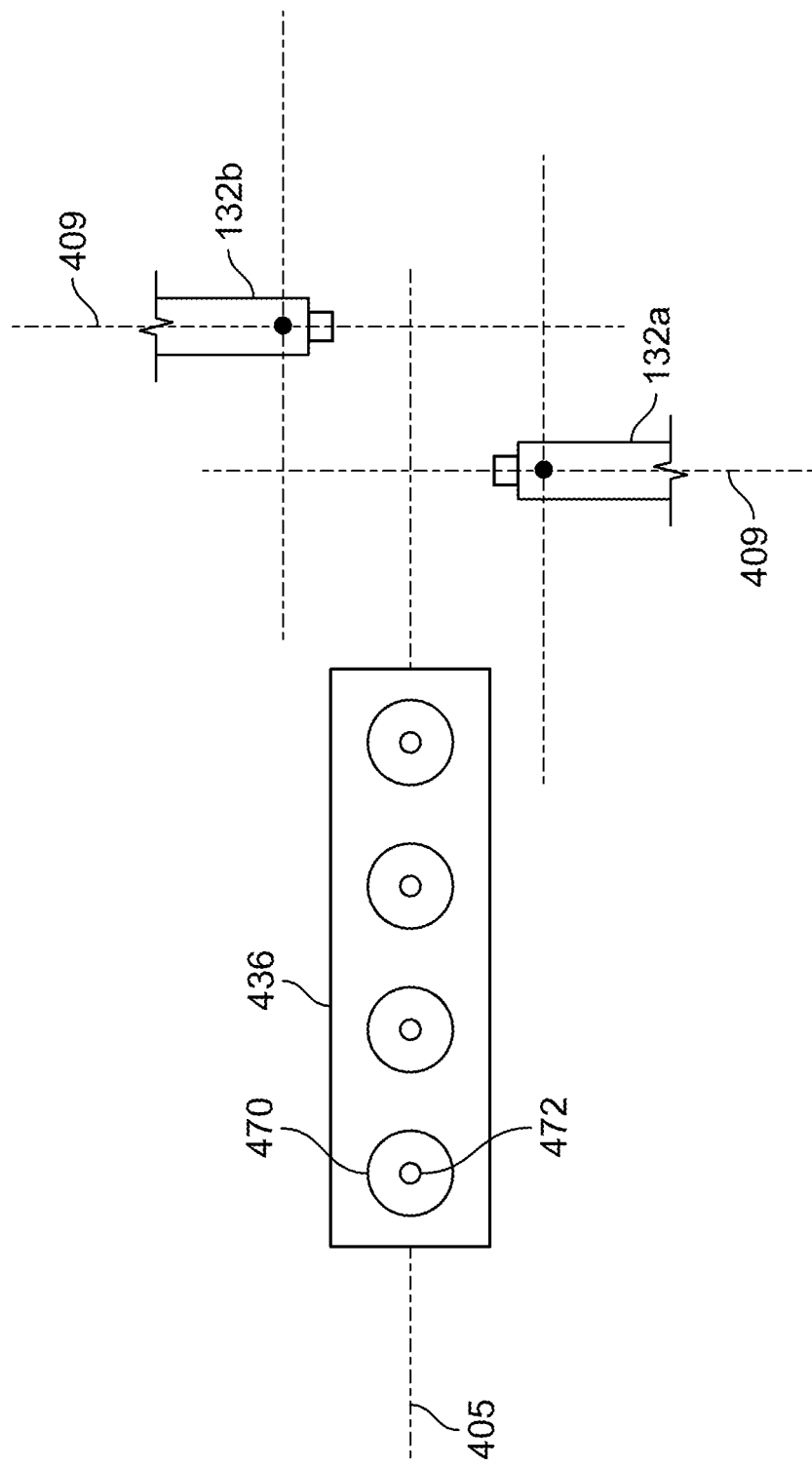
FIG. 25 is a side view of portions of the motion control system of FIG. 24.
Figure 31:
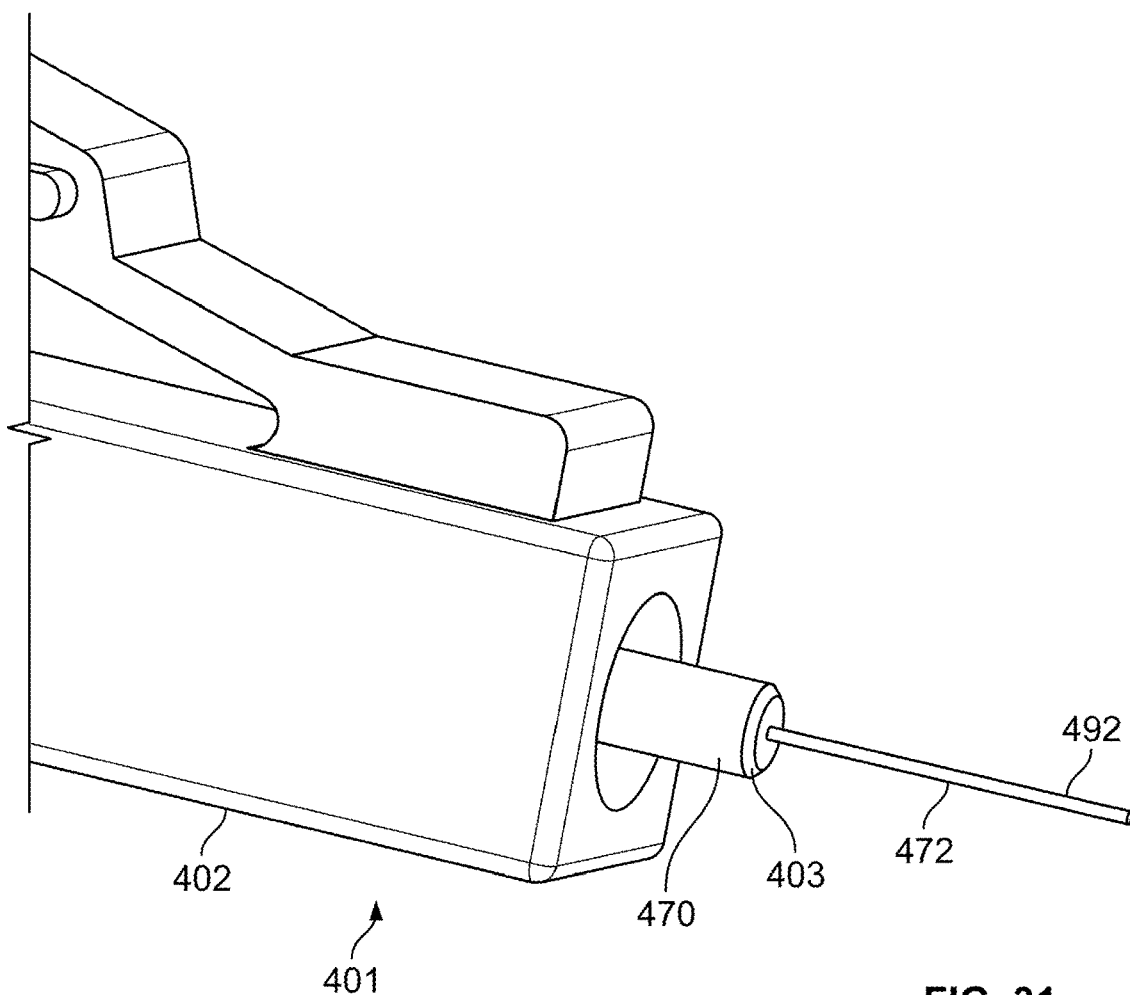
FIG. 31 is a perspective view showing an example fiber optic connector including an optical fiber stub that can be processed in accordance with abrasive jet cleaning processes of the type disclosed herein.

Referring to FIGS. 24 and 25, the abrasive jet system 420 includes a cleaving fixture 436 capable of holding a plurality of fiber optic connectors 401. In one example, connectors 401 can include connector bodies 402 (see FIG. 31) supporting ferrules 470 in which optical fibers 472 are secured. Stub-portions 492 of the optical fibers 472 project beyond end faces of the ferrules. It will be appreciated that the ferrules can be generally cylindrical and the optical fibers can be secured within the bores defined by the ferrules by adhesive. In the depicted example of FIG. 31, the connector is shown as an LC connector. As shown in FIG. 31, the depicted ferrule 470 has an end face with a chamfer 403.

Referring back to FIGS. 24 and 25, the cleaving fixture 436 can be configured to support the fiber optic connectors 401 along a row. As supported, the ferrule end faces 490 (see FIG. 33A) and the fiber stub portions 492 can project outwardly from the cleaving fixture 436. The fiber stub portions 492 can be separated by center-to-center spacing S.

In certain examples, a simplified motion scheme can be used to control movement between the cleaving fixture 336 and the abrasive jet nozzles 132a, 132b during cleaving or other processing operations. For example, a fixture positioning mechanism 464 for moving the cleaving fixture 436 can include a single-axis motion device such as a single-axis robot capable of reciprocating the fixture 436 along a linear axis of movement 405. In certain examples, the linear axis of movement 405 can be defined by a linear bearing such as a track or guide, and the cleaving fixture 436 can include a carriage that is moved by the fixture positioning mechanism along the track or guide. The abrasive jet nozzles 132a, 132b can be positioned along the axis of movement 405. The central nozzle axes of the nozzles 132a, 132b can be separated by a spacing S that corresponds to the spacing between the fiber stub portions 492 supported by the cleaving fixture 436. In one example, the nozzles 132a, 132b can be manually adjusted along axes 407 to set a desired cleave height, and can be manually adjusted along axes 409 coaxial with the central nozzle axes to adjust a spacing between the nozzles and the fiber stub portions 492. In one example, the nozzles can be pre-positioned before cleaving operations take place, and can remain stationery during the cleaving operations. Of course, in more complicated systems, automated nozzle positioning mechanisms 410 can be used to automatically control the positioning of the nozzles and the angling of the nozzles in real time through the use of an electronic controller 411. The nozzles can be moved along an axis 413 to set the spacing S between the central nozzle axes of the nozzles 132a, 132b.

In certain examples, the abrasive jet system 420 can be operated in a stepped sequence to cleave the optical fibers 472 of the fiber optic connectors 401 supported by the cleaving fixture 436. For example, once the nozzles 132a, 132b have been preset at the desired locations along the motion axis 405, the cleaving fixture 436 is moved along the axis 405 relative to the nozzles 132a, 132b. The fiber optic connectors 401 supported by the fixture 436 include four fiber optic connectors 401a-401d each having a fiber stub portion 492a-492d. The fiber stub portions 492a-492d are positioned consecutively along a row or line within the fixture 436. When the fixture 436 is moved along the axis 405, the nozzle 132a initially processes one side of the fiber stub portion 492a as the fixture 436 moves the fiber stub 492a across the abrasive media stream of the nozzle 132a. As the fixture 436 continues movement along the axis 405, the opposite second side of the stub portion 492a is processed by the abrasive stream of the abrasive jet nozzle 132b and the first side of the fiber stub portion 492b is processed by the abrasive jet stream directed from the nozzle 132a. Thus, processing of the second side of the fiber stub portion 492a can take place simultaneously with the processing of the first side of the fiber stub portion 492b. It will be appreciated this sequence is repeated for each of the fiber stub portions 492a-492d to provide full cleaving of each of the fiber stub portions 492a-492d.

Figure 26:
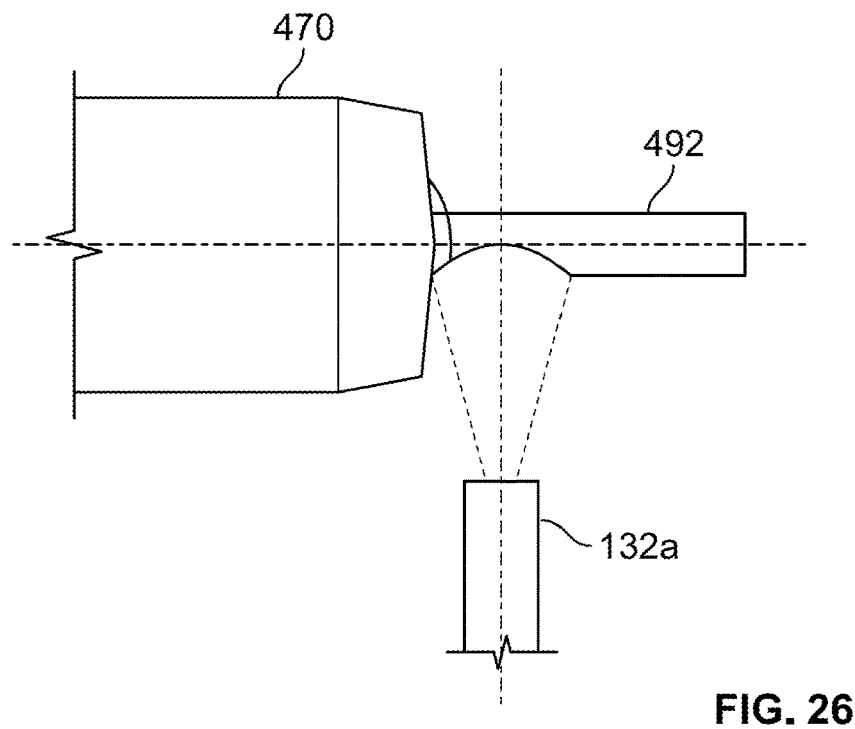
FIG. 26 is a side view schematically illustrating a first cleaving step of the abrasive jet system of FIG. 23.
Figure 27:
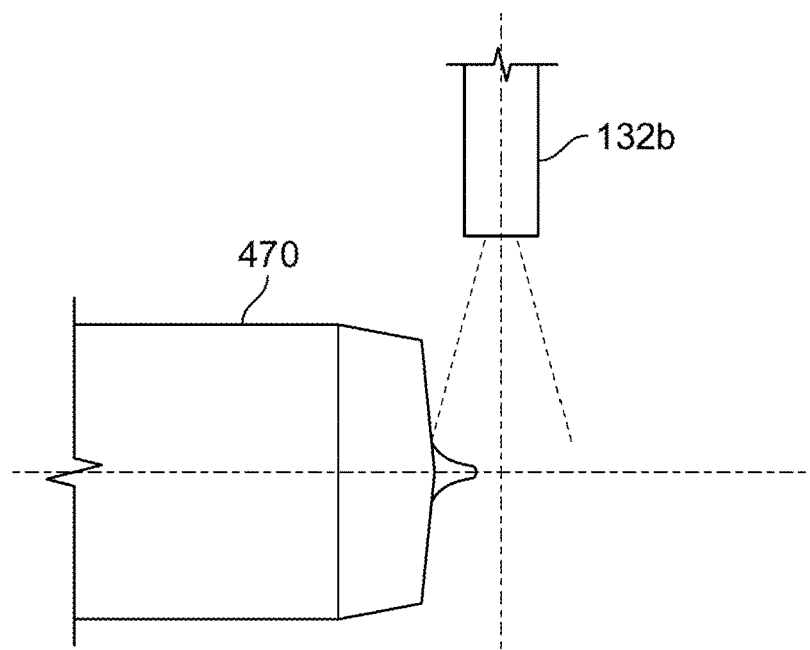
FIG. 27 depicts a second cleaving step of the abrasive jet system of FIG. 23.

FIG. 26 shows one of the fiber stub portions 492 being acted upon by an abrasive jet stream emitted from the first abrasive jet nozzle 132a. FIG. 27 shows the fiber stub portion 492 being acted upon by an abrasive jet stream emitted from the second abrasive jet nozzle 132b after the fiber stub portion 492 has previously been acted upon by the abrasive jet stream of the first abrasive jet nozzle 132a. Thus, the cleaving process has a two-step sequence in which the first abrasive jet stream acts upon a first side of each of the optical fibers and the second abrasive jet stream acts upon a second side of each of the optical fibers being cleaved. Because the abrasive jet nozzles 132a and 132b are offset from one another along the axis of movement 405 of the cleaving fixture 432, the abrasive jet stream of the first abrasive jet nozzle 132a does not interfere with the abrasive jet stream of the second abrasive jet nozzle 132b. As the cleaving fixture 436 moves or scans the fiber stub portions 492 across the abrasive jet streams of the first and second abrasive jet nozzles 132a, 132b, motion recipes of the type previously described can be used to control the abrasive action of the abrasive streams. For example, motion of the fixture 436 can be stopped at certain intervals to provide dwell times as needed to adequately remove epoxy from the end faces of the ferrule and to provide the desired cleave shape.

Figure 28:
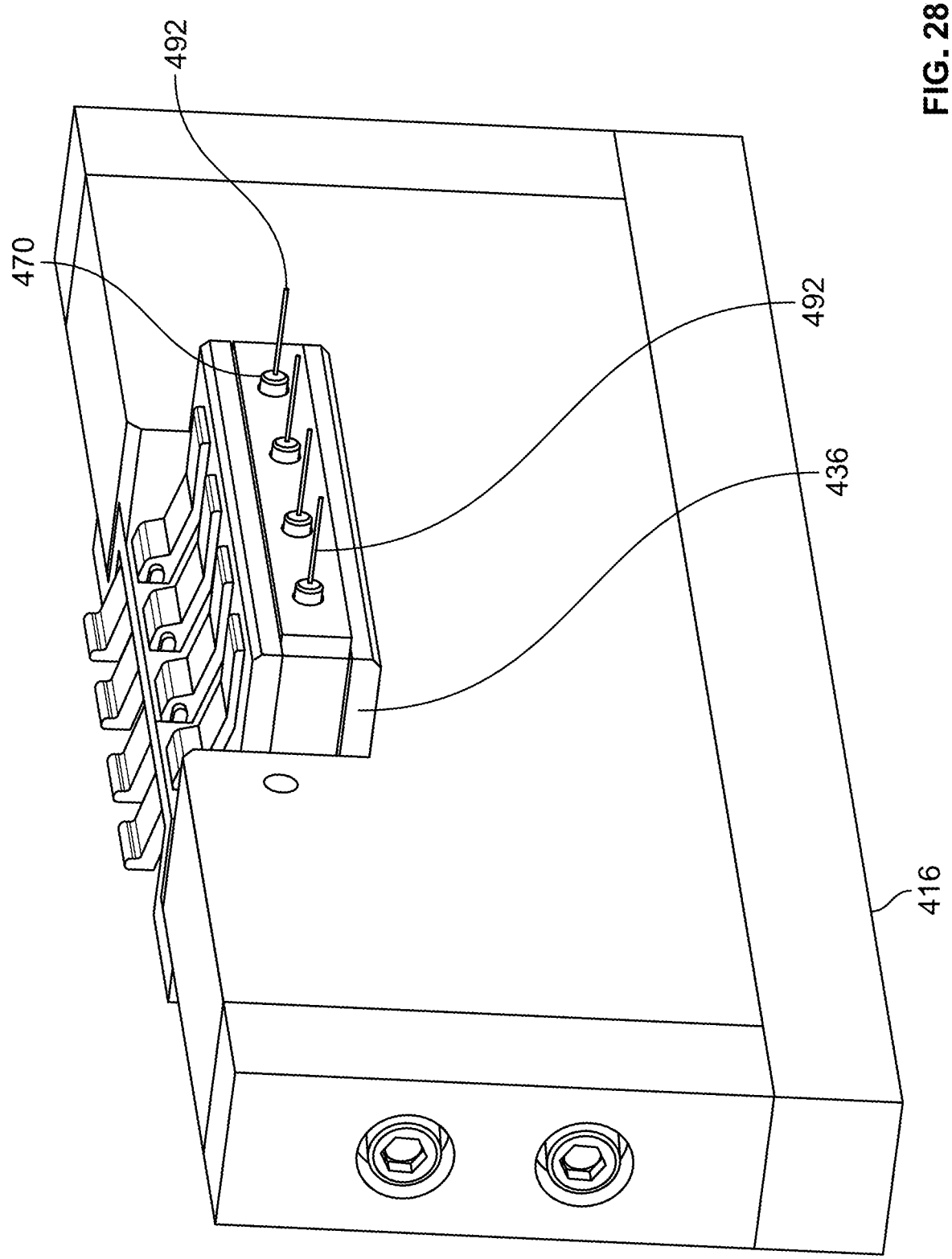
FIG. 28 is a more detailed view of a fixture that can be used with the abrasive jet system of FIG. 23 to hold fiber optic connectors during abrasive jet processing.
Figure 29:
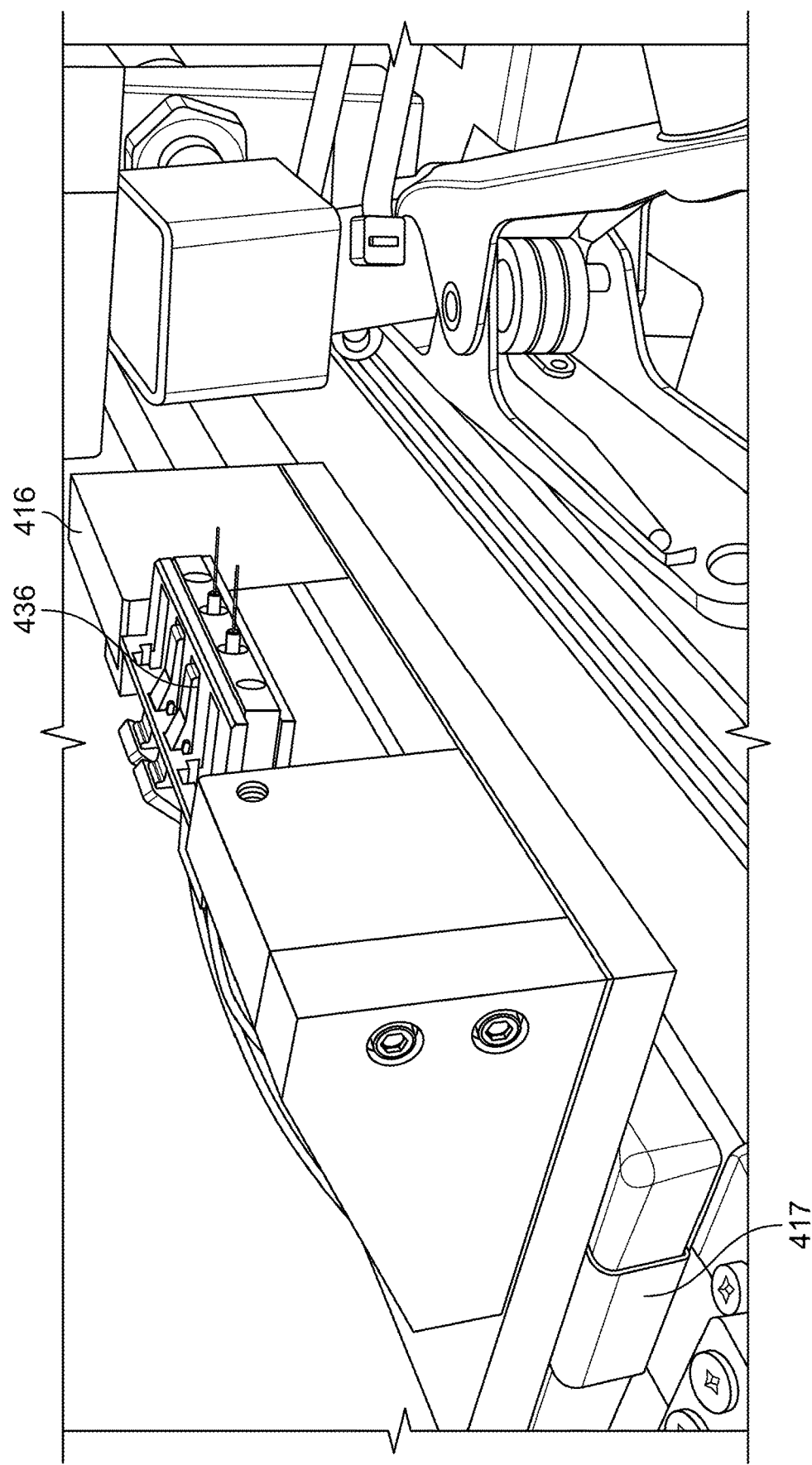
FIG. 29 is another view of the fixture of FIG. 28 shown mounted on a track.
Figure 30:
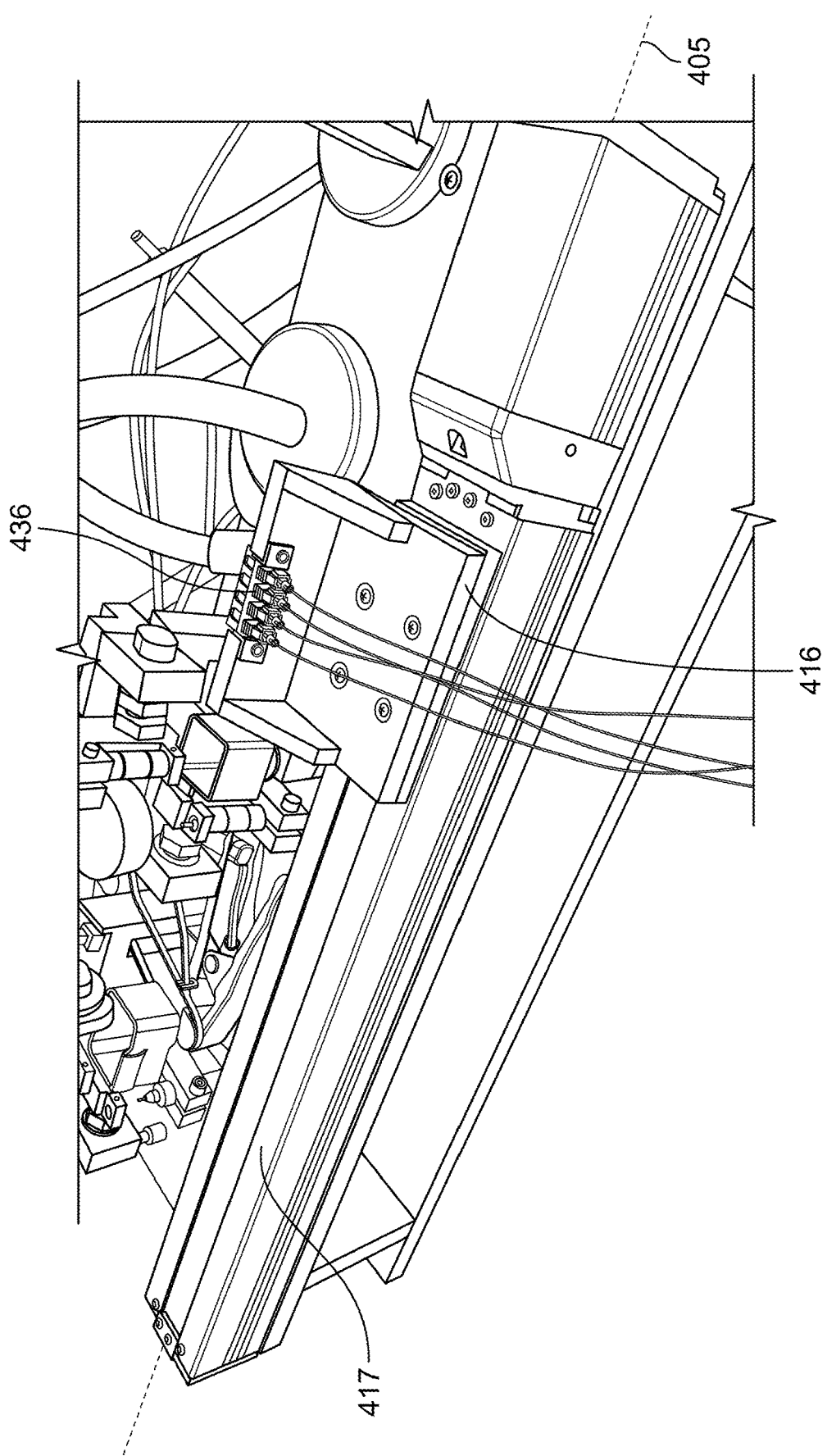
FIG. 30 is a further view of the fixture of FIG. 28 shown mounted on a track.
Figure 32:
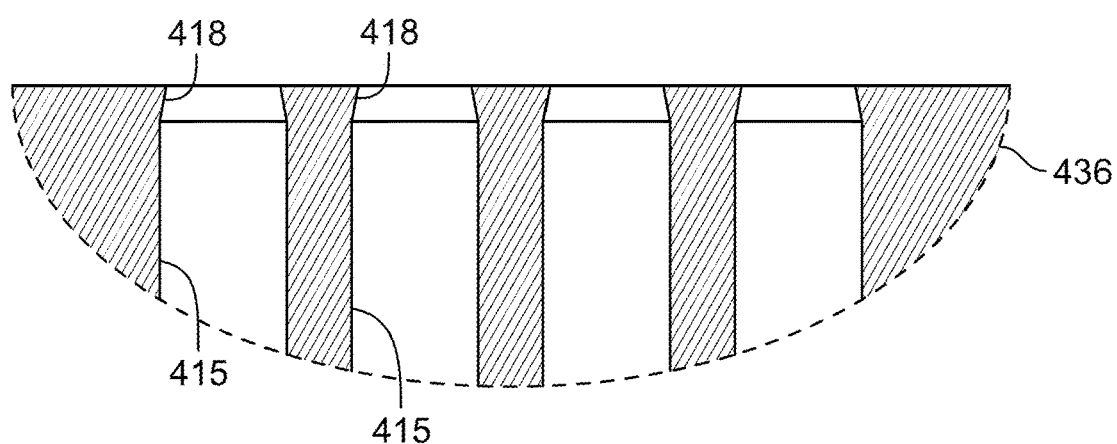
FIG. 32 is a partial cross-sectional view of a section of the fixture of FIG. 28.

FIG. 28 is a more detailed view of the cleaving fixture 436. The fixture 436 is configured to hold a plurality of the fiber optic connectors 401. The fixture can include pockets for receiving the connector bodies 402. The pockets can define openings 415 (see FIGS. 32 and 33) for receiving the ferrules 470 and for allowing the ferrules 470 to project outwardly from the fixture 436. In certain examples, the fiber optic connectors 401 can include springs for biasing the ferrules 470 axially outwardly from the connector bodies 402. The cleaving fixture 436 of FIG. 28 is shown mounted to a carriage 416. As shown at FIGS. 29 and 30, the carriage 416 mounts to a linear bearing structure such as a track or guide 417 that extends along the single axis of movement 405. The carriage 416 can be moved linearly back and forth along the guide 417 by a linear actuator such as a cylinder, a rack and pinion drive, or the like.

It is preferred for the end faces of the ferrules 470 to be precisely positioned relative to the fixture 436. In this regard, the fixture 436 can include a positioning structure such as a positive stop or other engagement feature that engages a particular feature on the ferrule to ensure the ferrule protrudes a predetermined amount from the end face of the fixture. In the depicted example, the fixture 436 can include angled stop surfaces 418 (see FIGS. 32 and 33) that engage the chamfers 403 of the ferrules 470 to ensure proper positioning of the ferrules relative to the fixture. It will be appreciated that the springs of the fiber optic connectors bias the chamfer 403 against the angled stop surfaces 418 to hold the ferrules at the desired cleaving positions. In other examples, other structures in the ferrules such as a step in the ferrule or the dome shape of the ferrule may be used for ferrule positioning. All such features can be used by a fixture designed to hold the end face of the ferrule in the position required for successful processing. Also, in other examples, an automated, active system using sensors can be used to move each connector end face to the correct position for processing.

Figure 33:
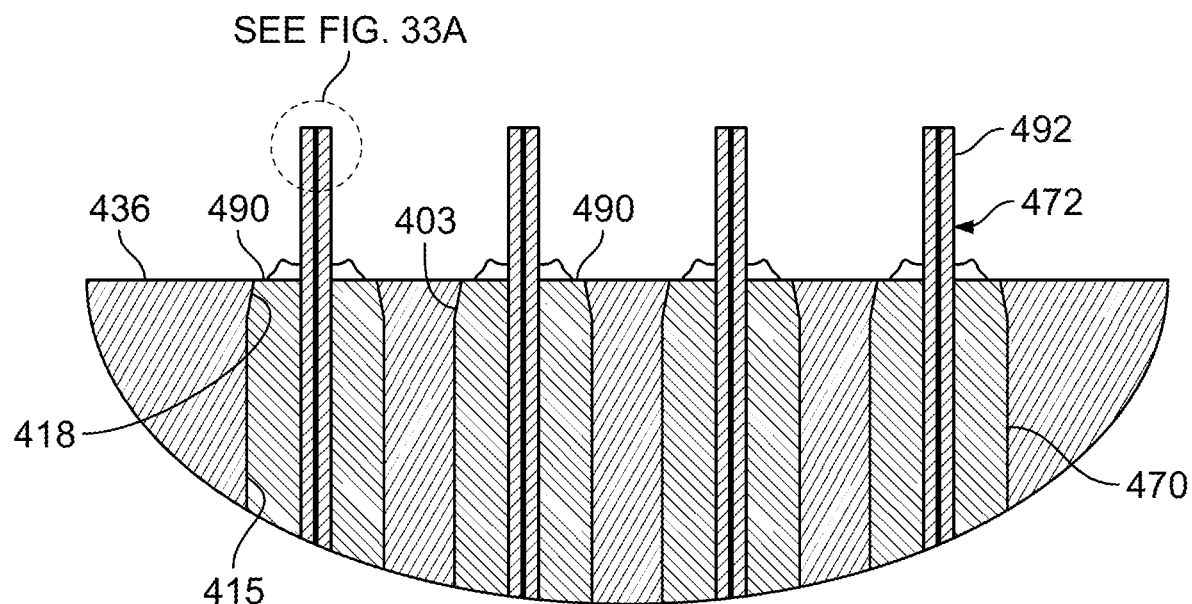
FIG. 33 shows the cross-sectional view of FIG. 32 with ferrules having stub fibers loaded into corresponding openings defined by the fixture.
Figure 33A:
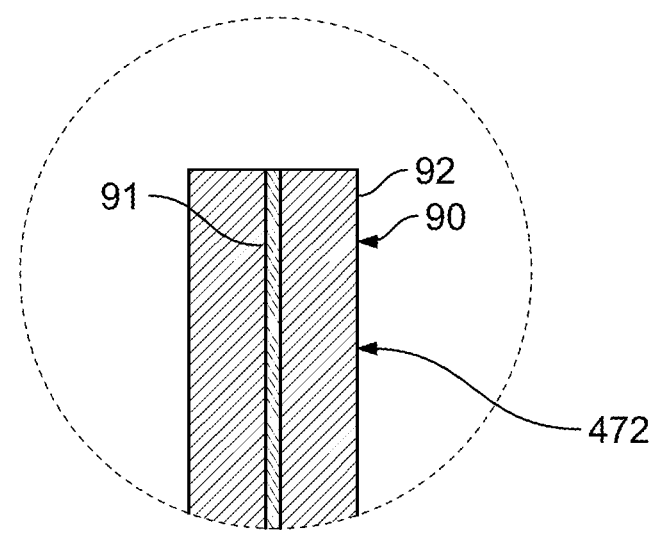
FIG. 33A is an enlarged portion of FIG. 33 showing one stub fiber having a core surrounded by a cladding layer.
Figure 34:
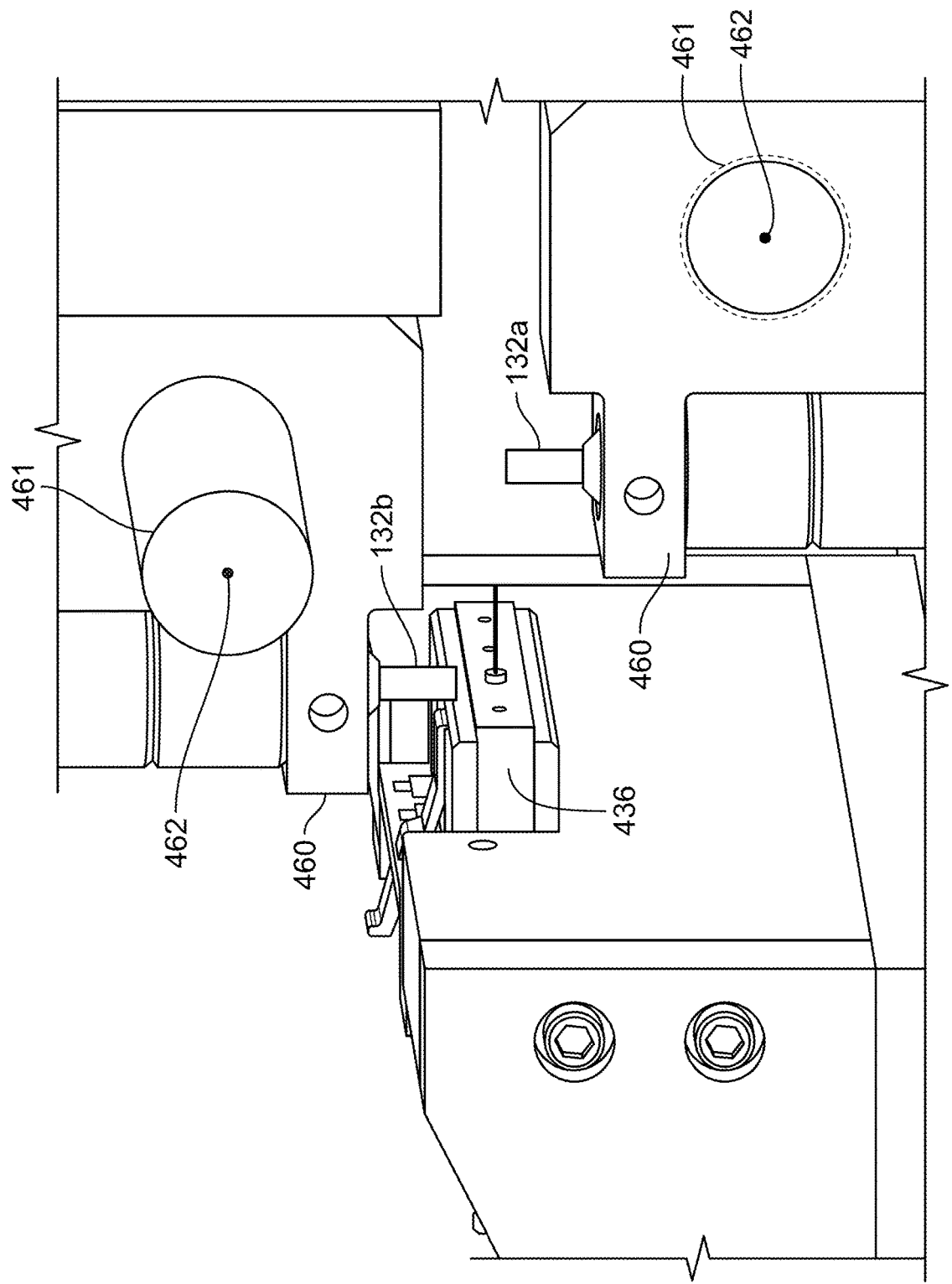
FIG. 34 depicts example nozzle fixture arrangement that can be used in the abrasive jet system of FIG. 23.
Figure 35:
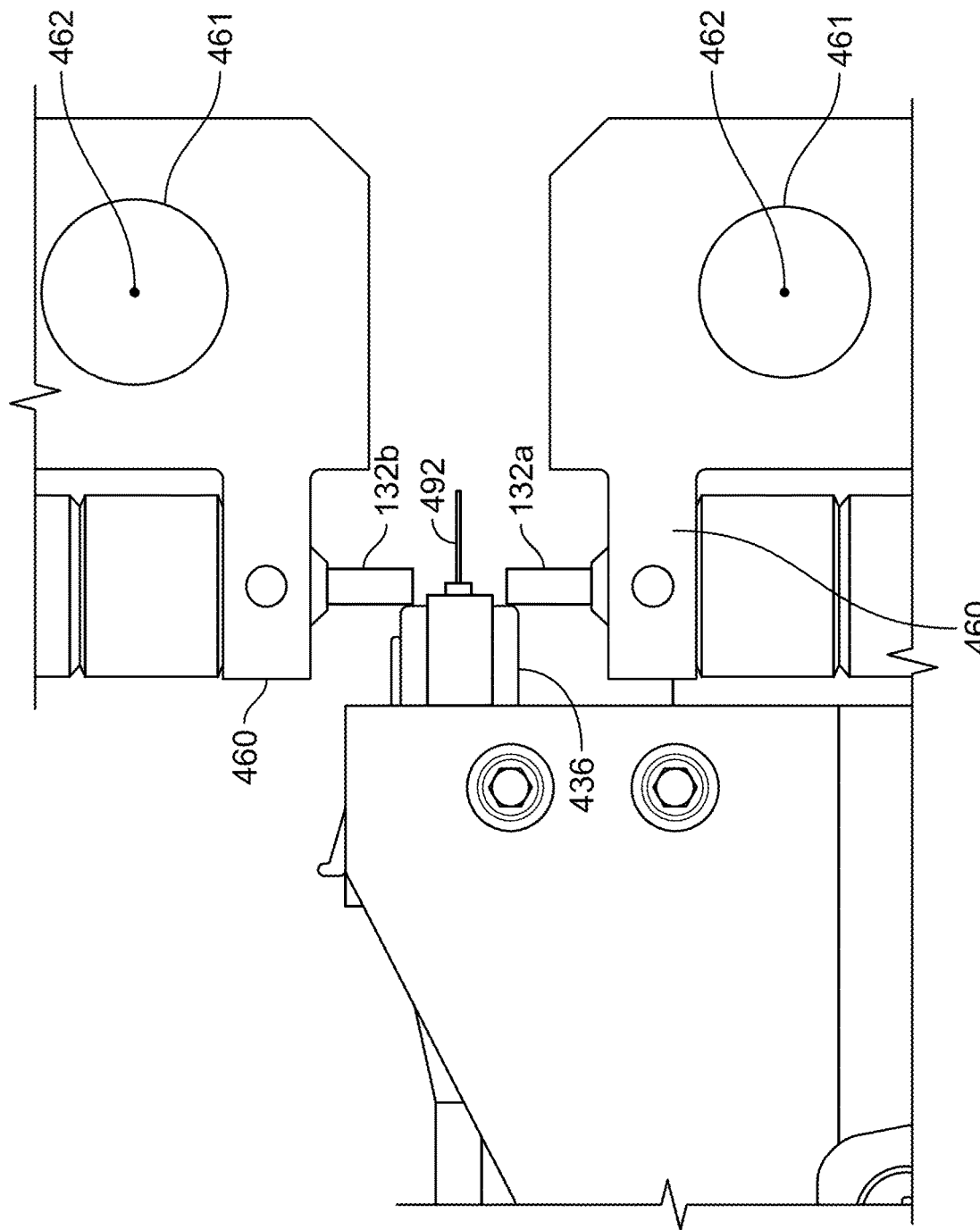
FIG. 35 is an end view of the nozzle fixture arrangement of FIG. 34.

As shown at FIG. 33, the end faces of the ferrules project outwardly beyond a corresponding end face of the fixture. Similarly, the fiber stub portions 492 project outwardly from the fixture. The fiber stub portions 492 are each shown including a fiber core 91 and a fiber cladding 92.

Figure 36:
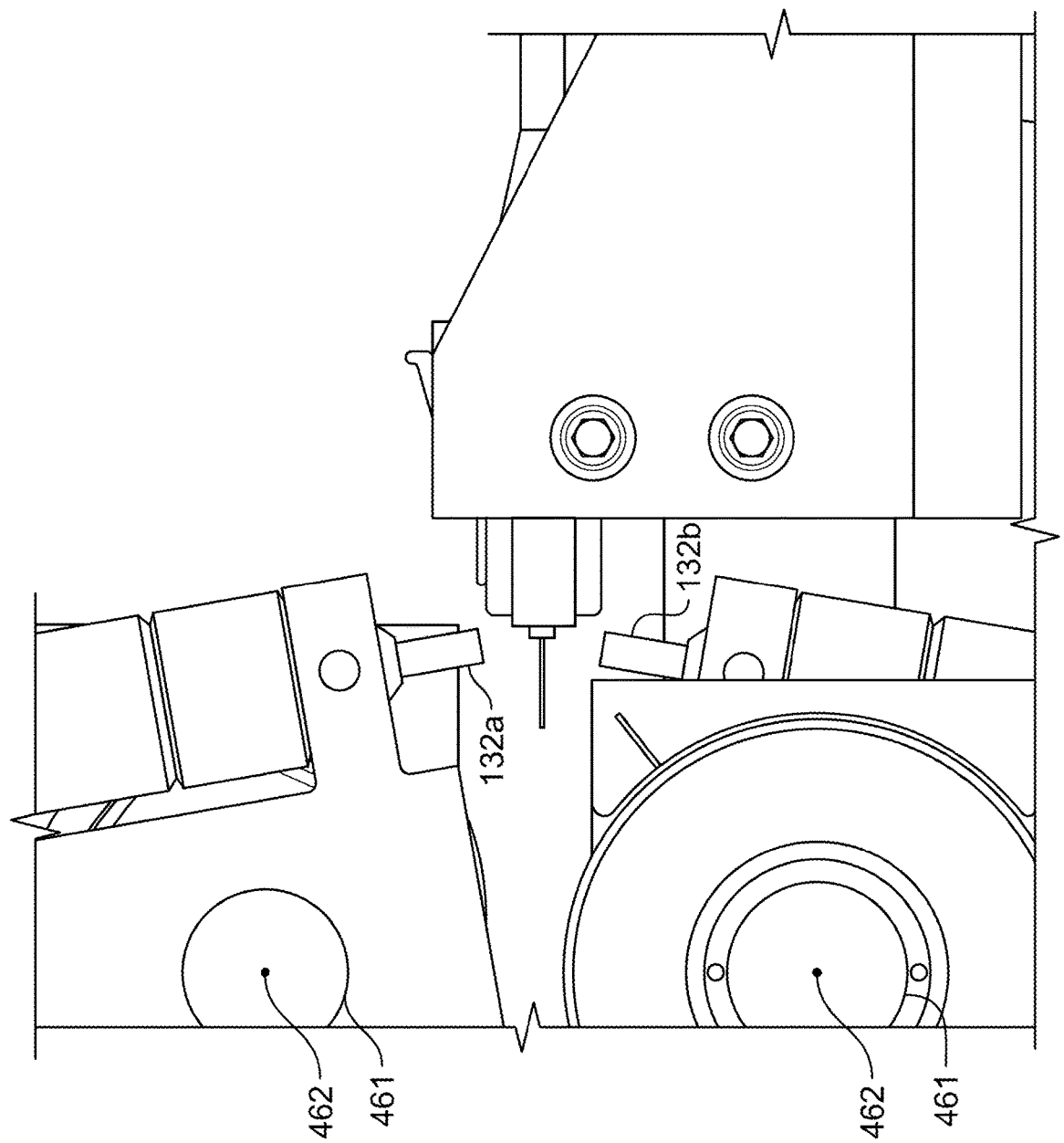
FIG. 36 is another end view of the nozzle fixture arrangement of FIG. 34 with the nozzles oriented in an angled configuration.

FIGS. 34-37 depict example fixtures 460 for holding and positioning the nozzles 132a, 132b at precise locations along the axis of movement 405 of the cleaving fixture 436. As shown at FIG. 36, the fixtures 460 can include pivot mounts 461 defining pivot axes 462 for pivoting (e.g., angling, tilting, skewing) the nozzles 132a, 132b relative to the central fiber axes of the fiber stub portions 492. Thus, the pivot mounts allow the abrasive jet nozzles 132a, 132b to be oriented with their central nozzle axes perpendicular relative to the stub portions 492 (see FIGS. 34 and 35) or oriented at oblique angles relative to the stub portions 492 (see FIG. 36). By staggering the abrasive jet nozzles 132a, 132b along the axis of movement 405 of the fixture 436, the abrasive streams of the nozzles 132a, 132b are prevented from interfering with each other during the cleaving and cleaning operations. The cleaning and cleaving operations can include cleaving the optical fiber and cleaning any residual adhesive from the end faces of the ferrules.

Figure 37:
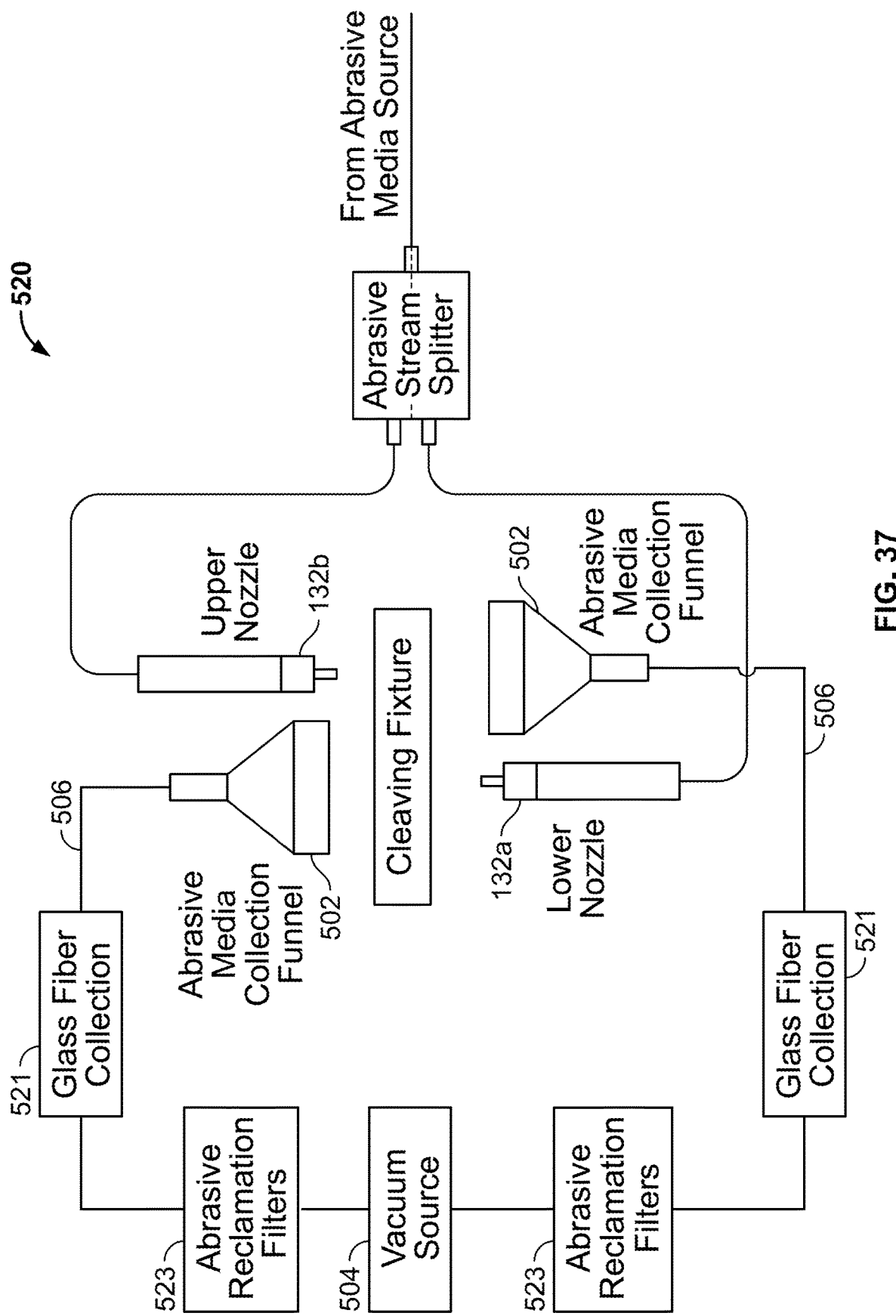
FIG. 37 schematically depicts a further abrasive jet system in accordance with the principles of the present disclosure for processing optical fibers.

FIG. 37 shows another abrasive jet cleaving system 520 in accordance with the principles of the present disclosure. The system 520 includes abrasive jet nozzles 132a, 132b that are offset from one another along a line of motion of the cleaving fixture. The system 520 also includes an arrangement for capturing spent abrasive media and for capturing the pieces of fiber optic glass that are cut from the ends of the fiber stubs during cleaving operations. In certain examples, the system can include collection funnels 502 positioned opposite from the nozzles 132a, 132b. The offset configuration of the nozzles 132a, 132b provides clearance for positioning the collection funnels 502 opposite from the nozzles 132a, 132b. The collection funnels 502 can be in fluid communication with a vacuum source 504 that creates negative pressure within the funnels for drawing air and spent abrasive media into the funnels 502. Flow lines 506 can extend from the collection funnels 502 to the vacuum source 504. Glass fiber collection structures 521 (e.g., filters) can be provided along the flow lines 506 for capturing the tips of the fiber stub portions that are cleaved off during the cleaving process. Abrasive reclamation filters 523 can also be provided along the flow lines 406 for capturing the abrasive media thereby optionally allowing the abrasive material to be reused. The vacuum collection system prevents abrasive media from being blown out into the environment. In other examples, a housing or shroud can additionally be installed over the cleaving system with a vacuum applied to the volume within the housing for capturing any abrasive media that is not initially drawn into the funnels.

Figure 38:
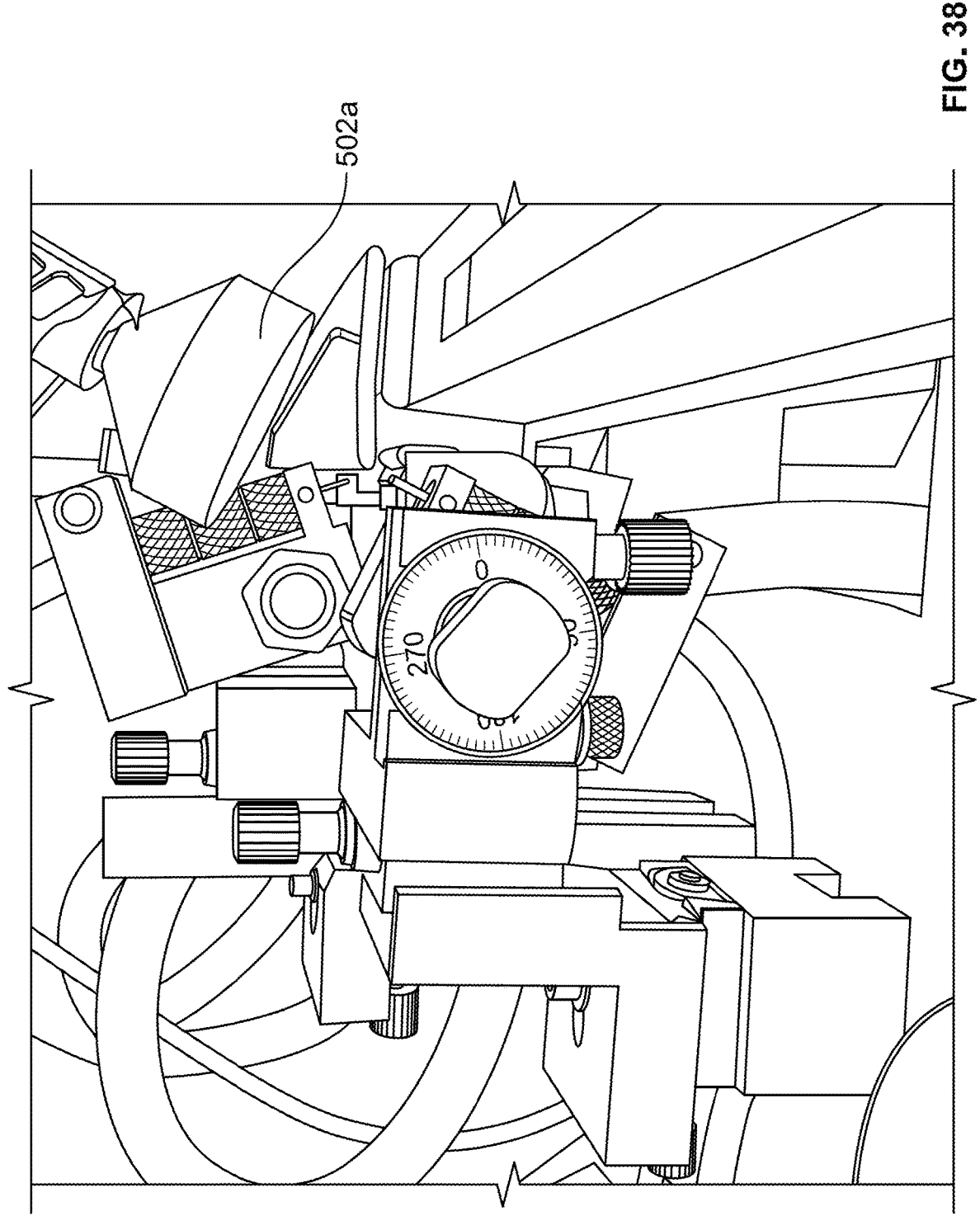
FIG. 38 depicts example nozzle fixture arrangement and funnels that can be used by the abrasive jet system of FIG. 37.
Figure 39:
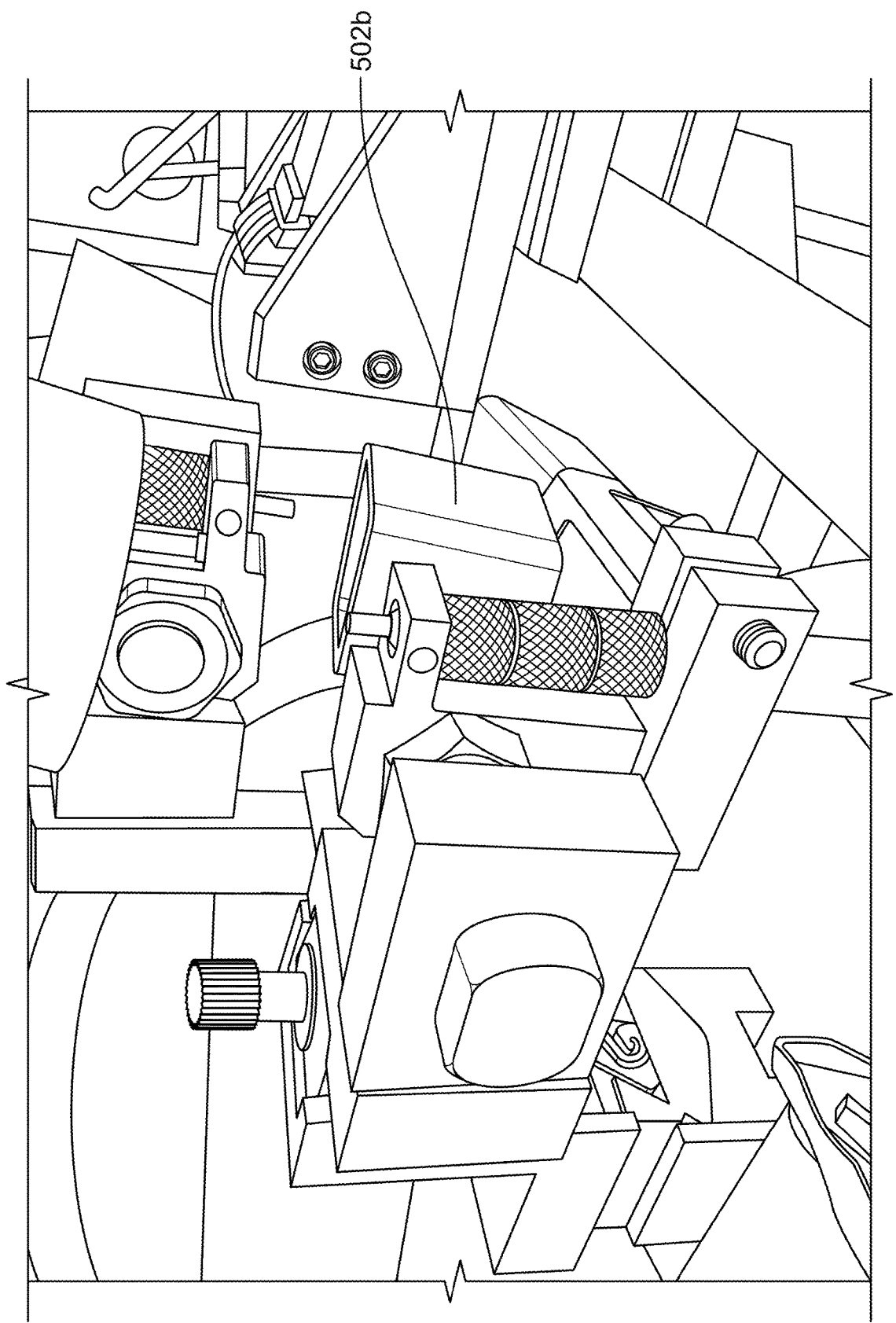
FIG. 39 is another view of the fixture arrangement and funnels of FIG. 38.

It will be appreciated that the funnels can have different shapes to provide different collection characteristics. In one example, the funnels can define generally circular openings. In other examples, the funnels can define square or rectangular openings. It will be appreciated that funnels having openings with other polygonal shaped profiles can also be used. FIGS. 38 and 39 depict an upper funnel 502a having an opening with a generally circular cross-sectional profile while FIG. 39 shows a lower funnel 502b having an opening with a generally rectangular transverse cross-sectional profile. The system also effectively collects the optical fiber ends that are cleaved from the fiber optic connectors during the cleaving process.

During operation of the system, cleaved fibers along with the abrasive media are drawn into the funnels of the vacuum collection system. As the collected material flows through the collection system, the collected material encounters an optical fiber collection module that can include a removable filter that is sized to capture glass optical fiber but to allow the abrasive media to easily pass through. During times when the cleaving process is stopped or at daily maintenance times, the filter can be removed and the collected fibers can be discarded. The filters can then be reinstalled to be ready for future cleaving operations. As the abrasive material that passes through the fiber collection module flows down the vacuum line, it can enter the material reclamation module which can include the material filters or sieves that function to separate the material into different particle size ranges. In certain examples, some of the material sizes segregated by the material sieves can be collected from future use, while other sizes may be discarded.

As indicated above, in addition to the vacuum collection system, an additional housing or shroud can be positioned over or around the abrasive jet cleaving system. Negative pressure can be applied to the interior of the housing or shroud. The negative pressure can be provided by the same vacuum system used to generate negative pressure within the funnels or a separate vacuum system. In this way, any abrasive material not captured within the funnels can be prevented from being released into the environment.

Figure 40:
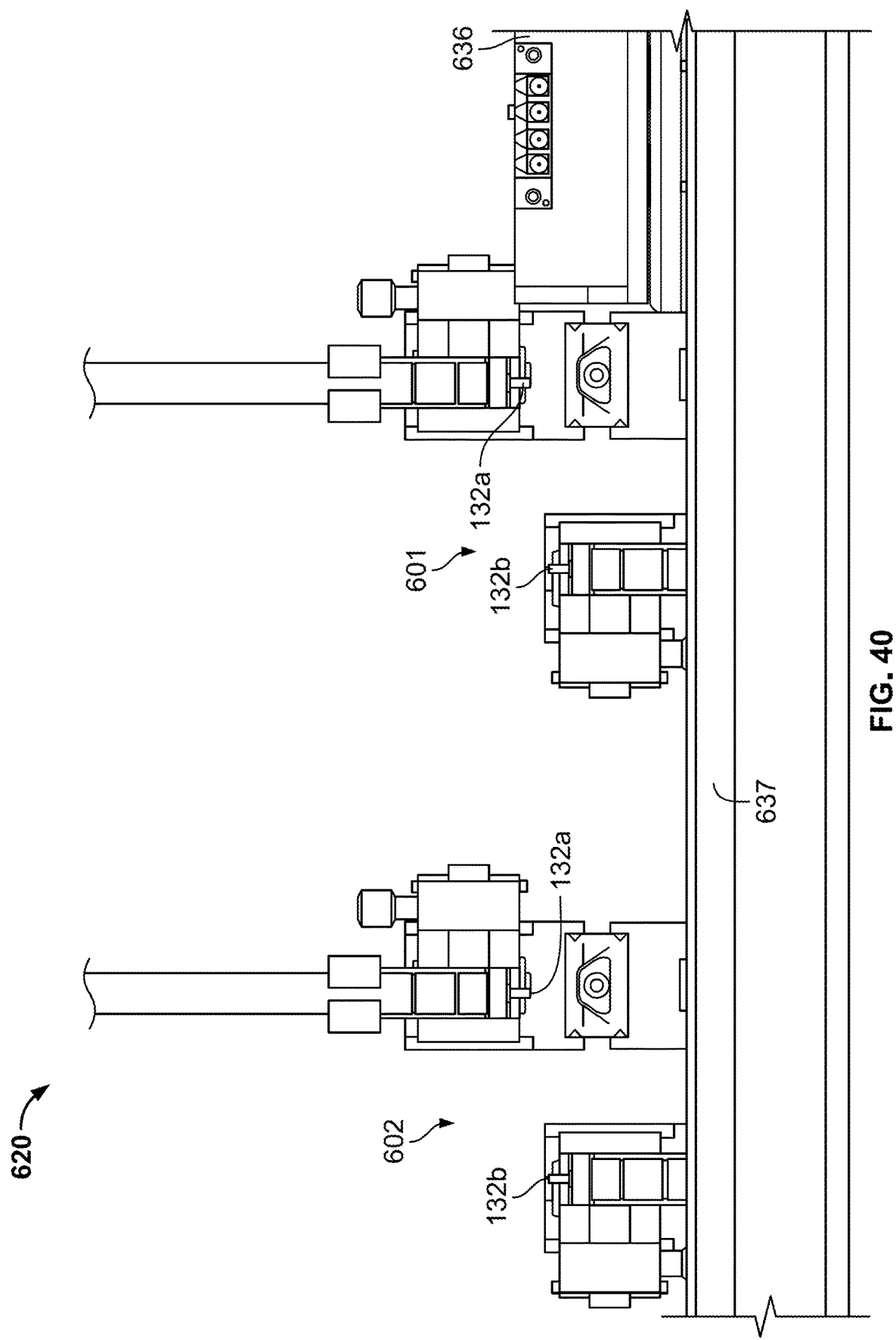
FIG. 40 depicts a multi-station abrasive jet system in accordance with the principles of the present disclosure.
Figure 41:
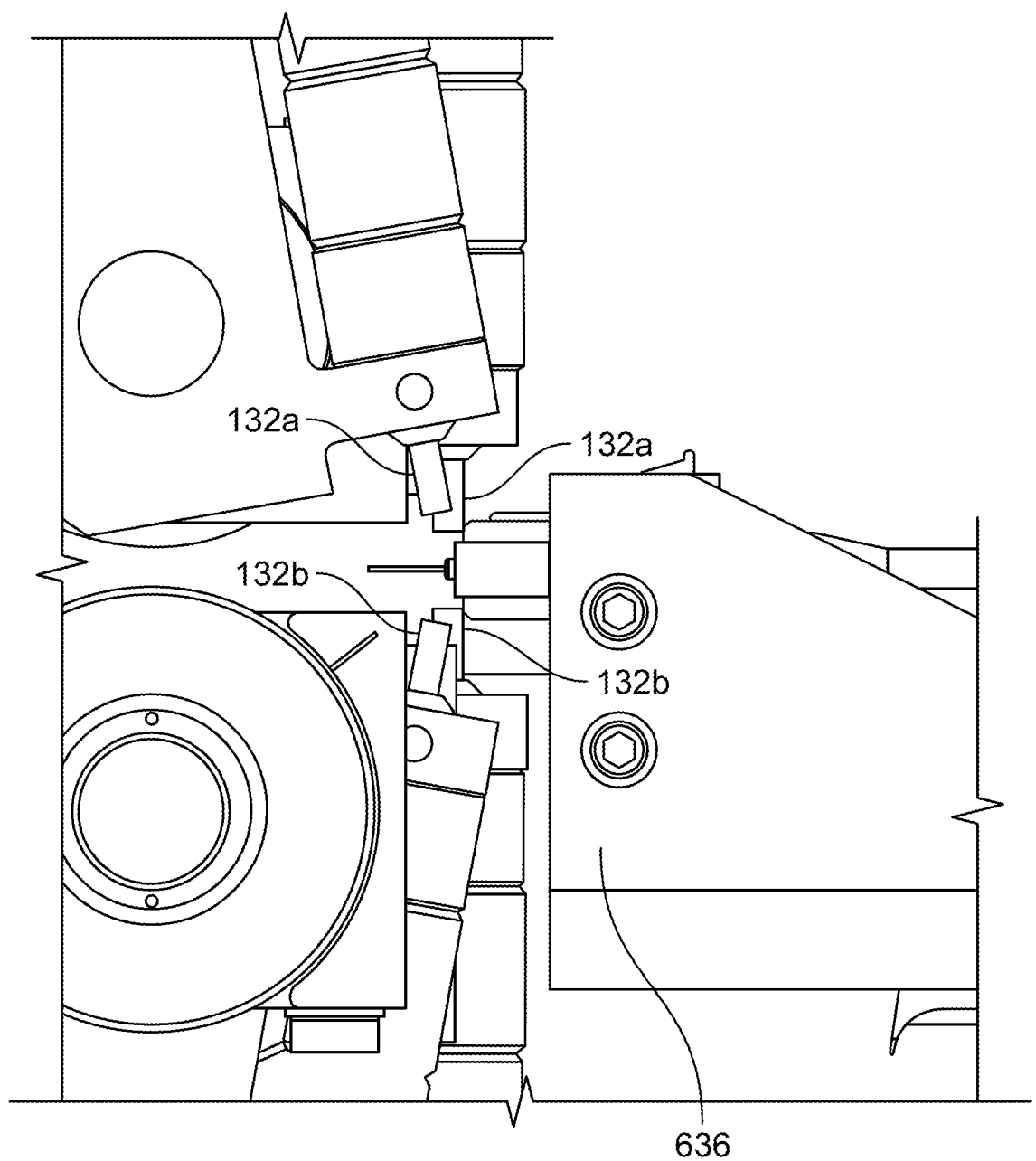
FIG. 41 is an end view of the abrasive jet system of FIG. 40.

FIGS. 40 and 41 depict another abrasive jet system 620 in accordance with the principles of the present disclosure. The abrasive jet system uses streams of pressurized air containing abrasive material to perform processing operations on optical fibers. In certain examples, the optical fibers can be supported by ferrules and processing can also be accomplished on end faces of the ferrules. For example, in one example, the jet air stream containing abrasive material is used to concurrently cleave an optical fiber and remove adhesive from the end face of a ferrule supporting the optical fiber. The abrasive jet system 620 includes a first processing station 601 and a second processing station 602. A fixture 636 adapted for holding a plurality of fiber optic connectors is movable between the first and second stations 601, 602. In one example, the fixture 636 is moved along a track 637 or other linear bearing structure between the first and second stations 601, 602. In one example, the first station 601 is adapted for cleaving an optical fiber and can include first and second abrasive jet nozzles 132a, 132b. At the first station 601, optical fibers projecting from the fiber optic connectors held by the cleaving fixtures 636 can be cleaved by abrasive jet streams containing abrasive matter dispensed from the abrasive jet nozzles 132a, 132b. The cleaving protocol or processing can follow any of the example processes or recipes previously disclosed herein. Preferably, during cleaving, any epoxy on the end faces of the ferrules of the fiber optic connector s is simultaneously removed. Additionally, after cleaving, the optical fibers of the fiber optic connectors each have a post-cleaved fiber protrusion that projects outwardly from the end face of the corresponding ferrule.

It will be appreciated that the second processing station 602 also can include one or more abrasive jet nozzles 132a, 132b for directing streams of pressurized air containing abrasive material at the optical fibers that were previously cleaved at the first station 601. As depicted, the nozzles 132a, 132b at each of the stations 601, 602 are offset from one another and face in opposite directions. In one example, the station 602 is configured for further processing the previously cleaved optical fibers to further refine the surface geometry and/or the smoothness of the previously cleaved optical fibers. In certain examples, the first and second stations 601 and 602 have different operating parameters or mechanical characteristics that yield different processing results. For example, the different stations 601, 602 can utilize different nozzles having different sized and/or shaped discharge openings. Also, the different stations 601, 602 can utilize different abrasive materials in the pressurized air streams, can use materials having different particulate sizes in the pressurized air streams, can use different material loading densities in the pressurized air streams, and can use different air or particle speeds in the pressurized air streams. Additionally, different motion recipes and different nozzle or fixture angling orientations can be utilized at each of the stations. The different stations can have different spacing between the nozzles and the workpieces to vary the aggressiveness of the abrasion action. Additionally, the relative angle between the center axis of the nozzles and the workpiece surfaces can be varied from station to station to vary the degree of aggressiveness of the abrasion.

In one example, the first station 601 includes a cleaving operation of the type previously described and the second station 602 provides an enhanced polishing operation. In certain examples, the second station 602 is configured to process the end face of the ferrule and the pre-cleaved optical fiber to remove or reduce any surface imperfections such as scratches that may be present. In certain examples, the second station 602 is configured to further refine the surface geometry of the pre-cleaved optical fiber by applying abrasive jet streams having smaller particle sizes than were used during the cleaving operation or abrasives that are softer or more friable. Friable abrasives can destroy themselves upon impact thereby removing material but reducing the amount of damage they cause to the remaining surface. In certain examples, the second station can be adapted to increase the surface finish quality of the pre-cleaved optical fiber to the point that a final polish using a final polish film is no longer needed. In certain examples, the abrasive used in the abrasive jet stream can be very similar to the abrasive used in final polishing films such as silicon dioxide, cerium oxide, or even highly friable materials such as sodium bicarbonate.

In certain examples, achieving a final polish with an abrasive jet treatment process may involve utilizing multiple abrasive jet treatment stations after the initial cleaving station. In certain examples, the optical fibers processed by this process can include multi-mode optical fibers as well as single-mode optical fibers. In certain examples, to achieve a better surface finish quality after the initial cleave, the abrasive used in the second processing station 602 can utilize abrasive media having smaller particle sizes than the abrasive material used in the abrasive jet stream or streams of the first station 601. For example, the abrasive media can be submicron or near submicron in particle size. In certain examples at the second station, the average particle sizes can be less than or equal to one micron, or less than or equal to 0.5 microns, or less than or equal to 0.25 microns, or less than or equal to 0.075 microns, or less than or equal to 0.05 microns. Example materials having relatively small particle sizes for achieving a final polish with an abrasive jet stream can include silicon dioxide, cerium oxide and sodium bicarbonate. In other examples, the final finish process can include using abrasive material in the air stream that is sized larger than the abrasive material used in the initial cleaving process. In this example, the jet stream at the second station can be operated at a lower velocity than the jet stream at the first station to achieve more of a final polish. Thus, to achieve the final polish, a variety of operational parameters such as abrasive material particle size, abrasive material type, impingement angle, motion protocol, air stream velocity, abrasive material hardness, abrasive material friability, abrasive material density in the jet stream, and other factors can be varied to provide and enhance surface finish to the optical fibers being processed.

Figure 42:
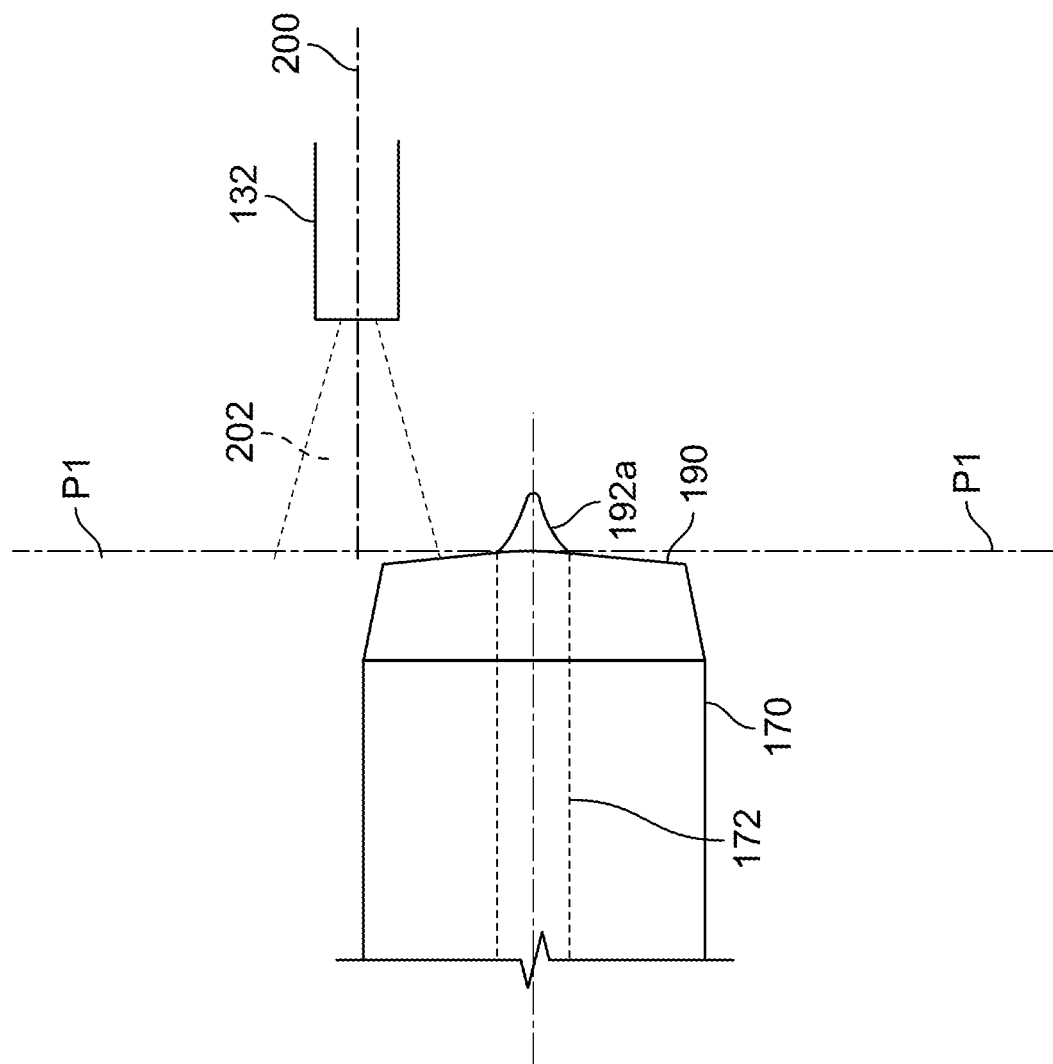
FIG. 42 depicts another abrasive jet fiber processing configuration in accordance with the present disclosure.

FIG. 42 depicts an abrasive jet arrangement for polishing a cleaved optical fiber (e.g., a fiber cleaved at the first station 601) such as the post-cleave optical fiber stub 192a of the optical fiber 172. The optical fiber 172 is supported by the ferrule 170 and the post-cleave fiber stub 192a protrudes from the end face 190 of the ferrule 170. The abrasive jet nozzle 132 is oriented such that during processing of the ferrule end face 190 and the post-cleave optical fiber stub 192a, the central nozzle axis 200 intersects the ferrule end face 190. In one example, the central nozzle axis 200 is oriented parallel to the central fiber axis 194, but the central nozzle axis 200 can also be oriented at an oblique angle relative to the central fiber axis 194. In one example, the ferrule 170 securing the fiber stub 192a is moved across the abrasive jet stream 202 of the nozzle 132. In one example, the ferrule 170 securing the fiber stub 192a is moved/scanned across the abrasive jet stream 202 of the nozzle 132 along a linear path that coincides with the plane P1. The plane P1 is preferably perpendicular to the central nozzle axis 200, but can be obliquely oriented as well. In one example, the plane P1 can be within plus or minus 5 degrees of perpendicular relative to the central nozzle axis 200. As the ferrule 170 securing the fiber stub 192a is moved/scanned across the abrasive jet stream 202 of the nozzle 132, the central axis 200 of the stream 202 can intersect the ferrule end face 190. In certain examples, the ferrule 170 can dwell with the central axis 200 at the fiber stub 192a to provide higher removal rates at the stub 192a. In certain examples, the jet stream velocity can be increased when the central axis 200 is at the fiber stub 192a to increase removal rates. In certain examples, the particle density in the jet stream can be increased when the central axis 200 is at the fiber stub 192a to increase removal rates. In certain examples, the angle of incidence of the central axis 200 of the jet stream 202 can be varied during the scanning process to vary the aggressiveness of the removal rate of the jet stream. In certain, the nozzle 132 can have a round or oval exit opening to enhance uniform machining coverage and polishing action. In certain examples, the ferrule 170 securing the fiber stub 192a is moved/scanned multiple times across the abrasive jet stream 202 of the nozzle 132. In a preferred example, the abrasive jet stream at the second station 602 uses an abrasive material having a finer grit size than the grit size of the abrasive material used for cleaving the optical fiber at the first station 601. The coarser grit size material at the first station allows for the faster removal of material. The finer grit size at the second station assists in providing the tip of the optical fiber being processed with a final polished surface.

Figure 43:
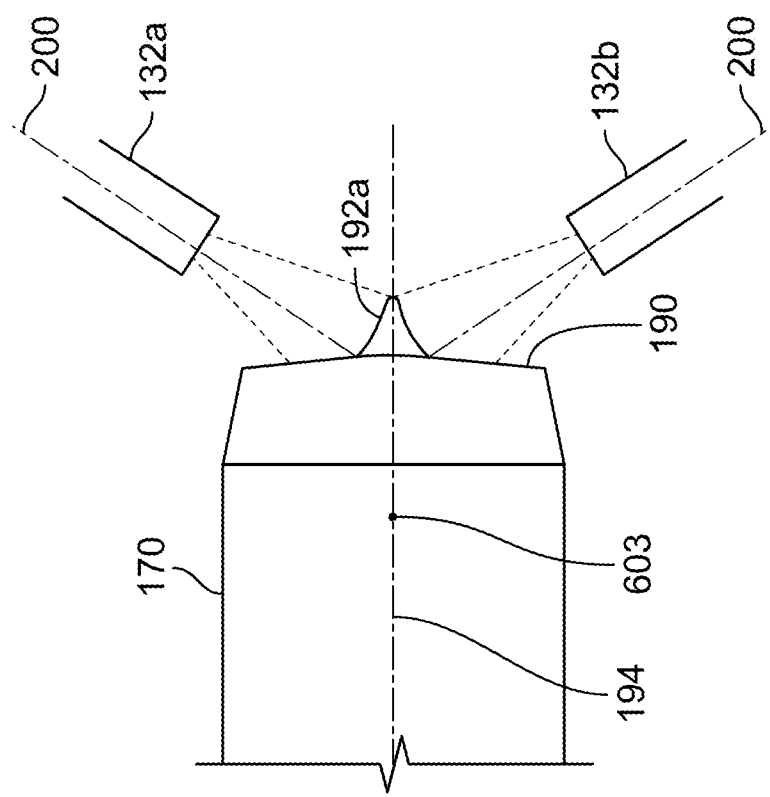
FIG. 43 depicts a further abrasive jet fiber processing configuration in accordance with the present disclosure.

FIG. 43 shows nozzles 132a, 132b of the second station 602 angled such that the central axes 200 of the jet streams will intersect the ferrule end face 190 and the stream will act more directly on the end face of the cleaved fiber stub 192a as the ferrule 170 moves across the jet streams along axis 603 which corresponds to a direction of movement of a fixture 636 along the track 637. Once again, the abrasive jet stream at the second station 602 preferably uses an abrasive material having a finer grit size than the grit size of the abrasive material used for cleaving the optical fiber at the first station 601 such that final polishing can be provided at the second station 602.

Figure 44:
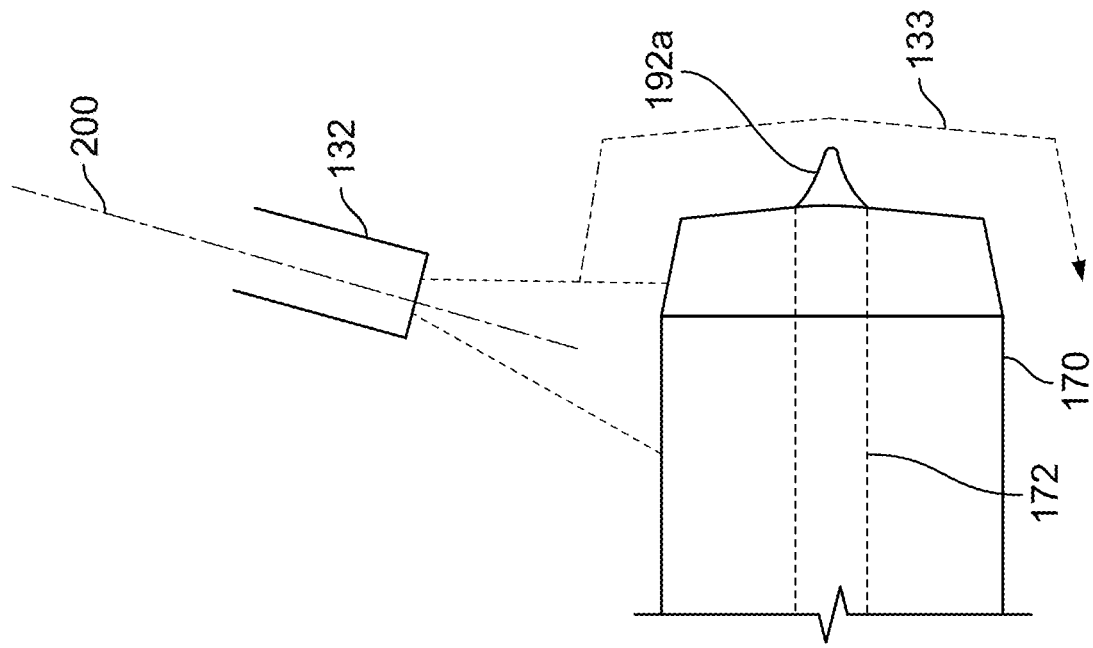
FIG. 44 depicts an additional abrasive jet fiber processing configuration in accordance with the present disclosure.

FIG. 44 depicts another abrasive jet arrangement for polishing a cleaved optical fiber (e.g., a fiber cleaved at the first station 601) such as the post-cleave optical fiber stub 192a of the optical fiber 172. The optical fiber 172 is supported by the ferrule 170 and the post-cleave fiber stub 192a protrudes from the end face 190 of the ferrule 170. The abrasive jet nozzle 132 is moved along a conformal path 133 that conforms generally to the shape of the end face of the ferrule 170. The conformal path can include linear path segments angled relative to each other, curved path segments, or combinations of curved and linear segments. The abrasive jet stream can clean, provide a final polish and provide final shaping/contouring to the ferrule end face 190 and the post-cleave optical fiber stub 192a. In one example, the nozzle 132 can pivot as the nozzle 132 moves along the conformal path to maintain the central nozzle axis 200 generally perpendicular to the work piece. In other examples, the angle can be varied from perpendicular to modify the abrasive aggressiveness of the abrasive stream at desired locations. In other examples, the fixture holding the ferrule 170 can be moved along a similar conformal path rather than moving the nozzle 132, the fixture can also pivot to keep the nozzle axis 200 perpendicular to the work piece or to vary the angle of incidence on the work piece. In other examples, the nozzle 132 can be moved along a convex path relative the optical fiber or the optical fiber can be moved along a convex path relative to the nozzle 132 to provide a convex shape at a tip of the fiber. Similarly, the nozzle 132 can be moved along a concave path relative the optical fiber or the optical fiber can be moved along a concave path relative to the nozzle 132 to provide or finalize a concave shape at a tip of the fiber.

In another example, the second station 602 can be adapted to provide specialty processing of the optical fibers that have been previously cleaved at the first station 601. In certain examples, specific features (e.g., channels, facets, etc.) can be abraded into the surface of the optical fibers. This can be accomplished by using secondary structures such as stream masks for allowing abrasion at particular areas and preventing abrasion at other areas. This can be useful in creating diffraction gratings where slits/grooves are cut into the end of the optical fiber. Masks for such applications an include strips of masking material applied to the fiber tip which are separated by unmasked strips. When the abrasive stream is applied to the fiber tip, channels are cut at the unmasked regions while the masked regions are left uncut or are cut at a reduced level. Light polarizers and filters can also be integrated into the fiber tip. This type of machining can be accomplished by using nozzles having specialized shapes and/or nozzles having discharge openings with smaller cross-sectional areas (e.g., nozzle opening with cross-dimensions less than 0.005 inches) as compared to the nozzles used during the cleaving step at the first station 601. The relatively small nozzles are preferably used in combination with abrasive resistant masks applied to the end face of the optical fiber being processed. In certain examples, nozzles having rectangular discharge openings can be used for straight cuts, and nozzles having fan-shaped discharge openings can be used for more uniform surface texturing as may be used for attenuators. Once again, the particulate size of the material in the abrasive air stream can be modified. For example, depending on the desired application, the secondary station 602 can use abrasive jet streams loaded with abrasive media having smaller or larger particulate sizes than the abrasive media used in the first station. Additionally, the abrasive jet streams used at the second station 602 can have abrasive media that is harder or softer than the abrasive media used in the abrasive jet streams of the first station 601. Moreover, the abrasive media used in the abrasive jet streams at the second station 602 can be more friable than the abrasive materials used at the first station 601. Additionally, the abrasive jet streams used at the second station 602 can have different particle speeds and/or different abrasive media loading densities as compared to the abrasive jet streams used at the first station 601. Different motion protocols can also be used at the second station 602 as compared to the first station 601.

In certain examples, the optical fiber can be shaped to produce concave features, flat features, convex features, diffraction gratings, attenuators, filters, or other structures. In certain examples, the second processing station 602 can be configured to provide surface texturing (e.g., surface imperfections which are preferably uniformly distributed) on the fiber for use as an optical attenuator or for preparing the surface for different optical coatings or other treatments. The station can also be used to provide concave, flat and convex lens geometries. In certain examples, relative movement between the optical fiber and the nozzle can be adapted to cause the abrasive action to follow a contour of a tip of the fiber. In other examples, the scanning action can create a desired contour at the tip of the fiber. In certain examples, the operating parameters of the jet stream can be varied dependent upon the type of material being impinged upon at the workpiece. For example, the abrasive jet stream can be varied to be more aggressive adjacent the cladding region of an optical fiber as compared to the core region of an optical fiber. As indicated previously, the degree of aggressiveness can be varied by varying parameters such as the impingement angle of the abrasive jet stream, the particle velocity of the particles within the abrasive jet stream, the particle densities of the abrasive media loaded into the abrasive air stream, the scanning speed and the use of dwell times. Masking can also be used to form features such as diffraction gratings.

As shown at FIG. 41, the nozzles 132a, 132b at the first station 601 are oriented generally perpendicular relative to the fiber axis of the optical fiber being cleaved, and the nozzles of the second station 602 are oriented at oblique angles relative to the fiber axis of the optical fiber being processed.

While one aspect of the present disclosure is for cleaving ferruled optical fibers, it will be appreciated that the abrasive jet system 120 can also be used to remove residual adhesive (e.g., excess epoxy, adhesive) from the end face of the ferrule without cleaving (e.g., ablating) the optical fiber. In certain examples, characteristics of the abrasive media stream 202 are selected such that the abrasive media stream 202 is configured to remove the residual adhesive from the ferrule end face 190, 290, 390, 490 without changing the optical fiber held within the ferrule 170, 270, 370, 470 or changing the ferrule end face 190, 290, 390, 490.

In certain examples, the abrasive media stream 202 includes a mixture of air and sodium bicarbonate, although alternatives are possible. The sodium bicarbonate is softer than the glass construction of the optical fiber and is a naturally friable abrasive. When the abrasive jet stream of sodium bicarbonate and air is dispensed from the abrasive jet nozzle 132, the sodium bicarbonate will be broken into smaller particles upon impact. As such, the mixture of sodium bicarbonate and air can be utilized to remove the residual adhesive while leaving the optical fiber intact (e.g., unchanged). In this way, the residual adhesive on the ferrule end face 190, 290, 390, 490 can be removed without damaging the optical fiber.

The ferrule end face 190, 290, 390, 490 may be polished in a subsequent final polishing step. The final polishing process will have less impact on the shape of the ferrule end face 190, 290, 390, 40 because removing the excess epoxy is no longer needed. In certain examples, the final polishing process involves polishing the optical fiber using a final polishing film or lapping film.

The various examples described above are provided by way of illustration only and should not be construed to limit the scope of the present disclosure. Those skilled in the art will readily recognize various modifications and changes that may be made without following the example examples and applications illustrated and described herein, and without departing from the true spirit and scope of the present disclosure.

What is claimed is:

1. A process for terminating an optical fiber with a ferrule; comprising the steps of:

(a) providing an optical fiber and a ferrule, the ferrule defining a bore for receiving the optical fiber therein, with an end of the optical fiber extending beyond a surface of the ferrule; and
(b) directing a jet comprising an air-abrasive mixture at the end of the optical fiber to cleave the end of the optical fiber from the remainder of the optical fiber and concurrently remove adhesive from a face of the ferrule;
wherein the jet is directed at a velocity of between about 80 and 180 m/s.

2. The process defined in claim 1, wherein step (b) is performed for a sufficient time to polish a remaining end of the optical fiber in the ferrule.

3. The process defined in claim 1, wherein the air-abrasive mixture comprises a material selected from the group consisting of silicon carbide, aluminum oxide, cerium oxide, tungsten, garnet, silicon dioxide, and glass beads.

4. The process defined in claim 1, wherein the air-abrasive mixture comprises particles having a size between about 1 and 27 μm.

5. The process defined in claim 1, wherein the jet is directed at an impact angle of between about 0 and 90 degrees.

6. The process defined in claim 1, wherein the optical fiber is formed of a material selected from the group consisting of glass, polymer and ceramic.

7. The process defined in claim 1, wherein step (b) removes excess epoxy from the optical fiber and/or ferrule.

8. A process for terminating an optical fiber with a ferrule; comprising the steps of:
(a) providing an optical fiber and ferrule, with an end of the optical fiber extending beyond a surface of the ferrule; and
(b) directing a jet comprising an air-abrasive mixture at the end of the optical fiber to cleave the end of the optical fiber from the remainder of the optical fiber, wherein the jet is directed at a velocity of between about 80 and 180 m/s and at an impact angle of between about 0 and 90 degrees.

9. The process defined in claim 8, wherein step (b) is performed for a sufficient time to polish a remaining end of the optical fiber in the ferrule.

10. The process defined in claim 8, wherein the air-abrasive mixture comprises a material selected from the group consisting of silicon carbide, aluminum oxide, cerium oxide, tungsten, garnet, silicon dioxide, and glass beads.

11. The process defined in claim 8, wherein the air-abrasive mixture comprises particles having a size between about 1 and 27 μm.

12. The process defined in claim 8, wherein the optical fiber is formed of a material selected from the group consisting of glass, polymer and ceramic.

13. The process defined in claim 8, wherein step (b) removes excess epoxy from the optical fiber and/or ferrule.

14. A process for terminating an optical fiber with a ferrule; comprising the steps of:
(a) providing an optical fiber and ferrule, with an end of the optical fiber extending beyond a surface of the ferrule; and
(b) directing a jet comprising an air-abrasive mixture at the end of the optical fiber to cleave the end of the optical fiber from the remainder of the optical fiber;
wherein the jet is directed at a velocity of between about 80 and 180 m/s.

* * * * *